US012563478B2

(12) United States Patent
Yang et al.

(10) Patent No.: US 12,563,478 B2
(45) Date of Patent: Feb. 24, 2026

(54) PAGING METHOD AND APPARATUS

(71) Applicant: HUAWEI TECHNOLOGIES CO., LTD., Guangdong (CN)

(72) Inventors: Chenchen Yang, Ottawa (CA); Huan Li, Shenzhen (CN); Yinghao Jin, Boulogne Billancourt (FR); Feng Han, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 439 days.

(21) Appl. No.: 17/673,523

(22) Filed: Feb. 16, 2022

(65) Prior Publication Data

US 2022/0174583 A1 Jun. 2, 2022

Related U.S. Application Data

(63) Continuation of application No. PCT/CN2020/109632, filed on Aug. 17, 2020.

(30) Foreign Application Priority Data

Aug. 16, 2019 (CN) .......................... 201910760504.6

(51) Int. Cl.
*H04W 48/16* (2009.01)
*H04W 68/12* (2009.01)

(52) U.S. Cl.
CPC ........... *H04W 48/16* (2013.01); *H04W 68/12* (2013.01)

(58) Field of Classification Search
CPC ..... H04W 28/08; H04W 48/16; H04W 48/20; H04W 68/00; H04W 68/005; H04W 68/02; H04W 68/12; H04W 74/0833; H04W 74/0836; H04W 74/0838; H04W 76/10; H04W 84/045; H04W 88/085
See application file for complete search history.

(56) References Cited

U.S. PATENT DOCUMENTS 12,250,598 B2 * 3/2025 Wang ................ H04W 36/0011
2018/0376380 A1 * 12/2018 Leroux ................... H04W 4/70
(Continued)

FOREIGN PATENT DOCUMENTS

CN 102067692 A 5/2011
CN 107872876 A 4/2018
(Continued)

OTHER PUBLICATIONS

3GPP TS 38.300 V15.6.0 (Jun. 2019), "3rd Generation Partnership Project; Technical Specification Group Radio Access Network; NR; NR and NG-RAN Overall Description; Stage 2(Release 15)," Jun. 2019, 99 pages.
(Continued)

*Primary Examiner* — Kan Yuen
(74) *Attorney, Agent, or Firm* — Fish & Richardson P.C.

(57) ABSTRACT

The present disclosure relates to paging methods and apparatus. One example method includes sending, by a distributed unit (DU), first signaling to a centralized unit (CU), where the first signaling is used to indicate a network that can be accessed by the DU, and receiving, by the DU, second signaling from the CU, where the second signaling is used to send an auxiliary configuration parameter of the CU for the DU, and the second signaling comprises a non-public networks (NPN) identifier.

20 Claims, 16 Drawing Sheets

(56) References Cited

U.S. PATENT DOCUMENTS

| | | | | |
|---|---|---|---|---|
| 2019/0069333 A1* | 2/2019 | Kim | .................. | H04W 36/0033 |
| 2019/0150220 A1* | 5/2019 | Byun | .................... | H04W 76/11 |
| | | | | 370/329 |
| 2019/0182800 A1 | 6/2019 | Park et al. | | |
| 2019/0191409 A1 | 6/2019 | Stojanovski et al. | | |
| 2019/0253966 A1 | 8/2019 | Park et al. | | |
| 2019/0350031 A1* | 11/2019 | Bedekar | ................ | H04W 76/10 |
| 2020/0305128 A1* | 9/2020 | Abedini | .............. | H04W 72/046 |
| 2020/0367109 A1* | 11/2020 | Chen | ..................... | H04W 28/18 |
| 2021/0219182 A1* | 7/2021 | Yuan | ................. | H04W 28/0983 |
| 2022/0086705 A1* | 3/2022 | Wang | .................... | H04W 48/16 |
| 2022/0132626 A1* | 4/2022 | Xu | ......................... | H04W 76/11 |
| 2022/0167228 A1* | 5/2022 | Li | ......................... | H04W 48/14 |
| 2022/0191961 A1* | 6/2022 | Qiu | ....................... | H04B 7/0695 |
| 2022/0201592 A1* | 6/2022 | Lindheimer | .......... | H04W 48/10 |
| 2022/0201777 A1* | 6/2022 | Teyeb | ................... | H04W 76/11 |
| 2022/0322182 A1* | 10/2022 | Lee | ....................... | H04W 36/08 |

FOREIGN PATENT DOCUMENTS

| | | | |
|---|---|---|---|
| CN | 108632949 A | 10/2018 | |
| CN | 109150451 A | 1/2019 | |
| CN | 109246746 A | 1/2019 | |
| CN | 109587756 A | 4/2019 | |
| CN | 109803272 A | 5/2019 | |
| CN | 109076489 B | 8/2020 | |
| WO | 2016104897 A1 | 6/2016 | |
| WO | 2018080218 A1 | 5/2018 | |
| WO | 2018121644 A1 | 7/2018 | |
| WO | 2018227473 A1 | 12/2018 | |
| WO | 2019059836 A1 | 3/2019 | |
| WO | 2019097481 A1 | 5/2019 | |
| WO | 2019138359 A1 | 7/2019 | |
| WO | 2019153928 A1 | 8/2019 | |

OTHER PUBLICATIONS

3GPP TS 38.401 V15.6.0 (Jul. 2019), "3rd Generation Partnership Project; Technical Specification Group Radio Access Network; NG-RAN; Architecture description(Release 15)," Jul. 2019, 46 pages.

3GPP TS 38.413 V15.4.0 (Jul. 2019), "3rd Generation Partnership Project; Technical Specification Group Radio Access Network; NG-RAN; NG Application Protocol (NGAP)(Release 15)," Jul. 2019, 328 pages.

3GPP TS 38.473 V15.6.0 (Jul. 2019), "3rd Generation Partnership Project; Technical Specification Group Radio Access Network; NG-RAN; F1 application protocol (F1AP)(Release 15)," Jul. 2019, 220 pages.

China Telecom, Huawei, Nokia, Nokia Shanghai Bell, ZTE, "Way Forward on Scope of Private Network for NG-RAN," 3GPP TSG RAN W Meeting #83, RP-190656, Shenzhen, China, Mar. 18-21, 2019, 5 pages.

Ericsson, "Submission for information on Commonalities in solutions for Non-Public Network deployments," 3GPP TSG-RAN WG2 #106, R2-1907313, Reno, Nevada, USA, May 13-17, 2019, 8 pages.

Huawei, China Telecom, "Remaining issues on support of NPN over F1," 3GPP TSG-RAN3 Meeting #105bis, R3-195771, Chongqing, China, Oct. 14-18, 2019, 4 pages.

Nokia, Nokia Shanghai Bell, "(TP for NPN BL CR 38.300) Configuration aspects of NPN," 3GPP TSG-RAN WG3 #105bis, R3-195179, Chongqing, China, Oct. 14-18, 2019, 4 pages.

Office Action issued in Chinese Application No. 202011456552.5 on Jul. 21, 2021, 13 pages (with English translation).

PCT International Search Report and Written Opinion issued in International Application No. PCT/CN2020/109632 on Nov. 20, 2020, 20 pages (with English translation).

Office Action issued in Chinese Application No. 202011456552.5 on Apr. 8, 2022, 4 pages.

Office Action in Japanese Appln. No. 2022-510212, dated May 15, 2023, 7 pages (with English translation).

3GPP TR 23.734 V16.1.0 (Mar. 2019), "3rd Generation Partnership Project; Technical Specification Group Services and System Aspects; Study on enhancement of 5G System (5GS) for vertical and Local Area Network (LAN) services (Release 16)," Mar. 2019, 111 pages.

Extended European Search Report issued in European Application No. 20854563.2 on Aug. 18, 2022, 9 pages.

Qualcomm Incorporated et al., "TS 23.501: Introducing Non-public network," 3GPP TSG-SA2 Meeting #131, 82-1902674, Santa Cruz—Tenerife, Spain, Feb. 25-Mar. 1, 2019, 11 pages.

Office Action in Chinese Appln. No. 201910760504.6, dated May 13, 2023, 12 pages.

Huawei et al., "Update of Solution#22 with the standalone NPN architecture," SA WG2 Meeting #129bis, S2-1812356, West Palm Beach, Florida, US, Nov. 26-30, 2018, 10 pages.

Ericsson, "Discussion on the need for Human Readable Network Name (HRNN) in broadcast," 3GPP TSG-RAN WG2 #107, R2-1908981, Prague, Czech Republic, Aug. 26-30, 2019, 5 pages.

Office Action in Korean Appln. No. 10-2022-7008270, mailed on Nov. 6, 2024, 13 pages (with English translation).

3GPP TSG RAN Meeting #84, RP-191563, "Revised WID: Private Network Support for NG-RAN," China Telecom, Nokia, Vodafone, Jun. 3-6, 2019, 5 pages.

3GPP TSG RAN WG2 Meeting# 107, R2-1909912, "Cell selection/reselection with NPN cells", Sony, Prague, Czech Republic, Aug. 26-30, 2019, 2 pages.

3GPP TSG-SA WG2 Meeting #132, S2-1903207, "Discussion on MCC for SNPNs," OPPO, Apr. 8-12, 2019, 2 pages.

SA WG2 Meeting #132, S2-1903572, "NW selection considering RAN sharing for NPNs," Samsung, Apr. 8-12, 2019, 4 pages.

3GPP TSG-SA WG2 Meeting #132, S2-1903384, "Harmonized solution for support of Non-Public Networks," Ericsson, Apr. 8-12, 2019, 6 pages.

SA WG2 Meeting #132, S2-1903566, "SNPN deployment scenarios," Samsung, Apr. 8-12, 2019, 3 pages.

3GPP TSG-RAN WG3 #122, R3-23xxxx, "Agenda," RAN3 Chair, Nov. 13-17, 2023, 178 pages.

Notice of Allowance in Korean Appln. No. 10-2022-7008270, dated Jul. 29, 2025, 6 pages (with English translation).

* cited by examiner

FIG. 7

PAGING METHOD AND APPARATUS

CROSS-REFERENCE TO RELATED APPLICATIONS

This application is a continuation of International Application No. PCT/CN2020/109632, filed on Aug. 17, 2020, which claims priority to Chinese Patent Application No. 201910760504.6, filed on Aug. 16, 2019. The disclosures of the aforementioned applications are hereby incorporated by reference in their entireties.

TECHNICAL FIELD

This application relates to the communications field, and more specifically, to a paging method and apparatus.

BACKGROUND

With development of communications technologies, a concept of a shared radio access network (share radio access network, shared-RAN) device is proposed, that is, user equipment may access different networks over one shared-RAN, and the user equipment may further access different networks in a dual radio (dual radio) manner or by using a subscriber identity module (subscriber identity module, SIM) card. User equipment with a dual radio capability may access different networks through two Uu interfaces, and user equipment with a plurality of SIM cards may access different networks by using different SIM cards. Different networks are identified by using different public land mobile network (public land mobile network, PLMN) identifiers (identify, ID), and normal paging of different networks in a shared-RAN scenario needs to be ensured.

SUMMARY

This application provides a paging method and apparatus, to ensure normal paging in a shared radio access network scenario.

According to a first aspect, a paging method is provided, including: User equipment receives a first message from an access apparatus over a first network, where the first message is used to indicate that the user equipment is paged by at least a second network. The user equipment accesses the second network by using the access apparatus.

According to the paging method provided in this embodiment of this application, the user equipment may receive, over the first network, the first message indicating that the user equipment is paged by at least the second network, to respond to the paging of the second network, and access the second network by using the access apparatus, so that the user equipment can respond to paging of different networks. Specifically, the first network assists the second network in paging, so that a terminal device that cannot receive paging message of the second network can receive the paging message of the second network. In addition, the first network assists the second network in control plane signaling transmission, so that control plane signaling load balancing between networks can be implemented, and the second network can be prevented from continuously sending a paging message because the second network does not receive a paging response from the terminal device for a long time, thereby reducing a signaling storm of the second network. In this way, normal paging in a shared radio access network scenario can be ensured.

For example, in the shared-RAN scenario, one access apparatus may support access to two different networks. The access apparatus sends, over one of the two networks that support access, a paging message of the other network to the user equipment, so that the user equipment can respond to paging of different networks in the shared-RAN scenario.

In a possible implementation, the first network is a standalone non-public network (standalone non-public networks, SNPN), and the second network is a public network integrated non-public network (public network integrated NPN, PNI-NPN) or a PLMN.

In another possible implementation, the first network is a PNI-NPN, and the second network is an SNPN or a PLMN.

In still another possible implementation, the first network is a PLMN, and the second network is an SNPN or a PNI-NPN.

A "resource" in this application may be understood as a bearer resource, and is used to carry user plane data and/or signaling plane data.

In this application, that the user equipment accesses the second network by using the access apparatus includes the following possible cases:

Case 1: The first message is used to indicate that the user equipment is paged by the second network. If the user equipment has accessed the first network, the user equipment receives the first message from the access apparatus by using an SRB in the first network, or the user equipment receives the first message from the access apparatus by using paging information in the first network. It may be understood as that the first network accessed by the user equipment assists the second network not accessed by the user equipment in paging the user equipment.

Case 2: The first message is used to indicate that the user equipment is paged by the first network and the second network. Optionally, the user equipment first accesses the first network, and then the first network accessed by the user equipment assists the second network not accessed by the user equipment in paging the user equipment.

With reference to the first aspect, in some implementations of the first aspect, when the first message is used to indicate that the user equipment is paged by the second network, the first message includes at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment by using the access apparatus.

Based on the foregoing technical solution, the first message includes at least one of the second identifier of the user equipment, the identifier of the second network, or the identifier of the second cell, to assist the terminal device in learning that the second network is paging the terminal device, and provide reference information for the terminal device to access the second network, so that the terminal device can select an appropriate cell to access as soon as possible.

With reference to the first aspect, in some implementations of the first aspect, that the first message is used to indicate that the user equipment is paged by at least the second network includes: The first message is used to indicate that the user equipment is paged by the first network and the second network. When the first message is used to indicate that the user equipment accesses the first network and the second network by using the access apparatus, the first message includes at least one of a second identifier of the user equipment, an identifier of the second network, or an identifier of a second cell, and at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment by using the access apparatus.

Based on the foregoing technical solution, the first message includes at least one of the second identifier of the user equipment, the identifier of the second network, or the identifier of the second cell, and at least one of the first identifier of the user equipment, the identifier of the first network, or the identifier of the first cell, to assist the terminal device in learning that the first network and the second network are paging the terminal device, and provide reference information for the terminal device to access the first network and the second network, so that the terminal device can select an appropriate cell to access as soon as possible.

The first identifier of the user equipment that is included in the first message may be included in a first identifier list of the user equipment. To be specific, there may be a plurality of identifiers of the user equipment in the first network, and in the first message, the plurality of first identifiers of the user equipment may be used as the first identifier list of the user equipment and sent to the user equipment, to indicate that the first network is paging the user equipment. Likewise, the second identifier of the user equipment that is included in the first message may be included in a second identifier list of the user equipment. To be specific, there may be a plurality of identifiers of the user equipment in the second network, and in the first message, the plurality of second identifiers of the user equipment may be used as the second identifier list of the user equipment and sent to the user equipment, to indicate that the second network is paging the user equipment.

Optionally, the first identifier of the user equipment may be a first 5G S-temporary mobile subscriber identity (5G S-temporary mobile subscriber identity, 5G-S-TMSI), a first inactive radio network temporary identifier (inactive radio network temporary identity, I-RNTI), a first globally unique temporary identity (globally unique temporary identity, GUTI), a first subscription concealed identifier (subscription concealed identifier, SUCI), a first temporary mobile subscriber identity (temporary mobile subscriber identity, TMSI), or the like of the user equipment in the first network. Similarly, the second identifier of the user equipment may be a second 5G-S-TMSI, a second I-RNTI, a second GUTI, a second SUCI, a second TMSI, or the like of the user equipment in the second network. "First" and "second" are merely identifiers of the user equipment in different networks, and do not constitute any limitation on the protection scope of this application.

Optionally, the first message includes a second identifier of the user equipment, and the second identifier of the user equipment is used to indicate an identifier of the user equipment in the second network. If the user equipment receives the second identifier of the user equipment by using the first message after accessing the first network by using the access apparatus, the user equipment determines that the user equipment further needs to access the second network by using the access apparatus.

The second identifier of the user equipment that is included in the first message may be included in a second identifier list of the user equipment. To be specific, there may be a plurality of identifiers of the user equipment in the second network, and in the first message, the plurality of second identifiers of the user equipment may be used as the second identifier list of the user equipment and sent to the user equipment, to indicate that the second network is paging the user equipment.

Optionally, the first message includes an identifier of the second network, and the identifier of the second network is used to indicate that the second network needs to page the user equipment.

The identifier of the second network that is included in the first message may be included in an identifier list of the second network. To be specific, there may be a plurality of identifiers of the second network, and in the first message, the plurality of identifiers of the second network may be used as the identifier list of the second network and sent to the user equipment, to indicate that the second network is paging the user equipment.

Optionally, the identifier of the second network that is included in the first message may be a second PLMN ID, a second network identifier (network identifier, NID), a second closed access group (closed access group, CAG) ID, a second PLMN ID and a second NID, a second PLMN ID and a second CAG ID, a second PLMN ID and a second NID, a second PLMN ID and a first CAG ID, or the like. Likewise, the identifier of the first network may be a first PLMN ID, a first NID, a first CAG ID, a first PLMN ID and a first NID, a first PLMN ID and a first CAG ID, or the like.

Optionally, the first message includes an identifier of a second cell, and the identifier of the second cell is used to indicate that the second network needs to page the user equipment.

A plurality of cells in the second network may be accessed by the user equipment by using the access apparatus. To be specific, there may be a plurality of identifiers of the second cell in the first message, and in the first message, the plurality of identifiers of the second cell may be used as an identifier list of the second cell and sent to the user equipment, to indicate that the plurality of cells in the second network may be accessed by the user equipment by using the access apparatus.

Optionally, the identifier of the second cell may be a second new radio (new radio, NR) cell ID, a second cell global identifier (cell global identify, CGI), a second CAG ID, a second NID, or the like. Likewise, the identifier of the first cell may be a first NR cell ID, a first CGI, a first CAG ID, a first NID, or the like.

When a network includes only one cell, an identifier of the network may be used as an identifier of the cell.

Optionally, the first message includes a first identifier of the user equipment, and the first identifier of the user equipment is used to indicate an identifier of the user equipment in the first network. The user equipment determines, by using the first identifier of the user equipment that is included in the first message, that the user equipment needs to access the first network.

The first identifier of the user equipment that is included in the first message may be included in a first identifier list of the user equipment. To be specific, there may be a plurality of identifiers of the user equipment in the first network, and in the first message, the plurality of first identifiers of the user equipment may be used as the first identifier list of the user equipment and sent to the user equipment, to indicate that the first network is paging the user equipment.

Optionally, the first message includes an identifier of the first network, and the identifier of the first network is used to indicate that the first network needs to page the user equipment.

The identifier of the first network that is included in the first message may be included in an identifier list of the first network. To be specific, there may be a plurality of identifiers of the second network, and in the first message, the plurality of identifiers of the first network may be used as the identifier list of the first network and sent to the user equipment, to indicate that the first network is paging the user equipment.

Optionally, the first message includes an identifier of a first cell, and the identifier of the first cell is used to indicate a cell that is in the first network and that may be accessed by the user equipment by using the access apparatus.

A plurality of cells in the first network may be accessed by the user equipment by using the access apparatus. To be specific, there may be a plurality of identifiers of the first cell in the first message, and in the first message, the plurality of identifiers of the first cell may be used as an identifier list of the first cell and sent to the user equipment, to indicate that the plurality of cells in the first network may be accessed by the user equipment by using the access apparatus.

With reference to the first aspect, in some implementations of the first aspect, when the first message is used to indicate that the user equipment is paged by the first network and the second network, the first message further includes a first cause value and/or a second cause value, where the first cause value is used to indicate a reason why the first network pages the user equipment, and the second cause value is used to indicate a reason why the second network pages the user equipment. Alternatively, when the first message is used to indicate that the user equipment is paged by the second network, the first message further includes the second cause value.

According to the paging method provided in this embodiment of this application, the first message may include a reason why a network pages the user equipment, so that the user equipment can learn of reasons why different networks initiate paging, thereby assisting the user equipment in quickly locating a reason why a paging message is initiated, identifying a paging scenario, and quickly making an appropriate policy and action subsequently.

With reference to the first aspect, in some implementations of the first aspect, when the first message is used to indicate that the user equipment is paged by the second network, the first message further includes first duration and/or second duration, where the first duration is used to identify that the user equipment accesses the first network within the first duration by using the access apparatus, and the second duration is used to identify that the user equipment accesses the second network within the second duration by using the access apparatus. Alternatively, when the first message is used to indicate that the user equipment is paged by the second network, the first message includes the second duration.

According to the paging method provided in this embodiment of this application, the first message may include duration in which the user equipment is expected to respond when a network pages the user equipment, so that the user equipment can learn of a network that initiates paging that needs to be responded to as soon as possible. The terminal device may continue to receive a service of another network within a time threshold, and access a paging network when the time threshold is approaching, to ensure continuity of a user service.

The first duration may be specified in a protocol, or may be specified on a core network side, or may be agreed on between the user equipment and a core network. The first duration is not specifically limited in this application.

For example, the first duration is 10 ms. To be specific, after receiving the paging message, the user equipment needs to access the first network within 10 ms.

Likewise, the second duration may be specified in a protocol, or may be specified on a core network side, or may be agreed on between the user equipment and a core network. The second duration is not specifically limited in this application.

For example, the second duration is 20 ms. To be specific, after receiving the paging message, the user equipment needs to access the second network within 20 ms.

With reference to the first aspect, in some implementations of the first aspect, the user equipment has accessed the first network, and the paging method further includes: that user equipment receives a first message from an access apparatus over a first network includes: The user equipment receives the first message from the access apparatus by using a signaling radio bearer SRB in the first network, for example, by using a radio resource control (radio resource control, RRC) message in the first network. Alternatively, the user equipment receives the first message from the access apparatus by using paging information in the first network. The first message is used to indicate that the user equipment is paged by the second network.

According to the paging method provided in this embodiment of this application, when the user equipment has accessed the first network, the first network may assist the second network in paging the user equipment, so that the user equipment in connected mode can respond to paging of another network.

Optionally, that the user equipment has accessed the first network may be understood as that an RRC connection is established between the user equipment and the access apparatus in the first network.

With reference to the first aspect, in some implementations of the first aspect, the paging method further includes: The user equipment sends a first response message to the access apparatus. The first response message may be understood as a response to the first message. The first response message includes information about a third cell, and the third cell is a cell that is in the second network and that the user equipment determines to access. The user equipment receives, over the first network, a second message sent by the access apparatus. The second message includes at least one of the following parameters: a first parameter used to support the user equipment in randomly accessing the third cell, a second parameter indicating a resource in the third cell, a fourth parameter indicating context information of the user equipment in the second network, or a fifth parameter indicating security and integrity protection information of the user equipment in the second network.

The first response message may be a radio resource control reconfiguration complete (radio resource control reconfiguration complete, RRC reconfiguration complete) message, or may be a radio resource control setup complete (radio resource control setup complete, RRC setup complete) message, or may be an uplink information transfer (uplink information transfer) message, or may be a radio resource control setup response (radio resource control setup request, RRC setup request) message, or may be a message1

(message1, MSG1) message in a random access procedure, or may be medium access control (medium access control, MAC) layer signaling, for example, a MAC control element (control element, CE), or may be physical layer signaling, for example, uplink control information (uplink control information, UCI), or the like.

Optionally, when the first message is an RRC reconfiguration message, the first response message may be an RRC reconfiguration complete message. Optionally, when the first message is an RRC setup message, the first response message may be an RRC setup complete message. Optionally, when the first message is a paging message, the first response message may be uplink control information responding to the paging message.

Based on the foregoing technical solution, the user equipment responds to the paging of the second network, selects the third cell that is in the second network and that is to be accessed, and notifies the access apparatus of related information of the third cell. The access apparatus may provide a related parameter for accessing the third cell, and assist the user equipment in accessing the third cell by using the access apparatus.

The fourth parameter and the fifth parameter may be configured by the second network. For example, the fourth parameter and the fifth parameter are configured by the third cell, the third cell transmits the configured parameters to the first network, and the first network transmits the configured parameters to the user equipment by using the first cell. Alternatively, the fourth parameter and the fifth parameter may be directly configured by the first network. For example, the cell in the first network sends an existing parameter indicating a UE context and an existing parameter indicating security and integrity protection information to the user equipment, that is, the second network reuses the parameter indicating a UE context and the parameter indicating security and integrity protection information in the first network.

That the user equipment receives, over the first network, a second message sent by the access apparatus may be understood as that the foregoing parameter included in the second message is transmitted to the user equipment over the first network.

With reference to the first aspect, in some implementations of the first aspect, the first message includes at least one of the following parameters: a sixth parameter used to support the user equipment in randomly accessing a second cell, a seventh parameter indicating a resource in the second cell, a ninth parameter indicating context information of the user equipment in the second network, or a tenth parameter indicating security and integrity protection information of the user equipment in the second network.

Based on the foregoing technical solution, the access apparatus may provide related parameters of a plurality of cells for the user equipment to access.

With reference to the first aspect, in some implementations of the first aspect, when the first message is used to indicate that the user equipment is paged by the second network, the paging method further includes: The user equipment receives, over the first network, a third message sent by the access apparatus, where the third message is used to indicate that the user equipment accesses the first network by using the access apparatus, and the third message includes at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment by using the access apparatus.

According to the paging method provided in this embodiment of this application, the paging of the first network and the paging of the second network may be separately sent by the access apparatus to the user equipment, and after responding to the paging of the first network, the user equipment responds to the paging of the second network with the assistance of the first network.

In this embodiment of this application, that the user equipment includes user equipment that has accessed the first network may be understood as that the access apparatus receives a first paging message and a second paging message that are respectively sent by a second core network device and a first core network device, but the user equipment first responds to the first paging message and accesses the cell in the first network.

When the first network and the second network share a core network, the second core network device and the first core network device may be a same core network device. For example, the first network is a PNI-NPN, and the second network is a PLMN. The PNI-NPN and the PLMN share a core network device.

With reference to the first aspect, in some implementations of the first aspect, the paging method further includes: The user equipment sends a second response message to the access apparatus, where the second response message includes information about a fourth cell, and the fourth cell is a cell that is in the first network and that the user equipment determines to access.

Based on the foregoing technical solution, the user equipment may send the second response message to the access apparatus, where the second response message is used to respond to the paging of the first network. The second response message may be understood as a response to the third message.

The second response message may be an RRC reconfiguration complete message, or may be an RRC setup complete message, or may be an uplink information transfer message, or may be a MSG1 message in a random access procedure, or may be MAC CE information, or may be UCI, or the like.

Optionally, when the third message is an RRC reconfiguration message, the second response message may be an RRC reconfiguration complete message. Optionally, when the third message is an RRC setup message, the second response message may be an RRC setup complete message.

After accessing the fourth cell by using the access apparatus, the user equipment may detect a paging message only in the fourth cell, and the second network may page the user equipment in the fourth cell, so that energy consumption of the user equipment can be reduced. For example, the access device may send an RRC message or a paging message in the fourth cell to notify the user equipment that the second network is paging the user equipment.

With reference to the first aspect, in some implementations of the first aspect, the third message further includes a first cause value, and the first cause value is used to indicate a reason why the first network pages the user equipment.

With reference to the first aspect, in some implementations of the first aspect, the third message further includes first duration, and the first duration is used to identify that the user equipment accesses the first network within the first duration by using the access apparatus.

With reference to the first aspect, in some implementations of the first aspect, the paging method further includes:

The user equipment sends a first identifier of the user equipment and a second identifier of the user equipment to the access apparatus, where the first identifier of the user equipment is used to indicate an identifier of the user equipment in the first network, and the second identifier of the user equipment is used to indicate an identifier of the user equipment in the second network.

Based on the foregoing technical solution, the user equipment may notify the access apparatus of identifiers of the user equipment in different networks. In this way, when receiving paging from different networks, the access apparatus can determine, based on different identifiers of the user equipment, that different paging messages are used to page the same user equipment.

With reference to the first aspect, in some implementations of the first aspect, the user equipment includes a first subscriber identity module SIM card and a second SIM card. The first identifier of the user equipment is used to indicate an identifier of the first SIM card in the first network, and the second identifier of the user equipment is used to indicate an identifier of the second SIM card in the second network.

The user equipment may be user equipment connected to the access apparatus, may be user equipment in dual-radio mode, or may be user equipment with a plurality of SIM cards. The user equipment in dual-radio mode may have two Uu interfaces. One set of resources such as SRBs and DRBs may be configured on each Uu interface, that is, two sets of resources such as SRBs and DRBs may be configured for the user equipment. A Uu interface between the user equipment and the first network is a first Uu interface, and a Uu interface between the user equipment and the second network is a second Uu interface. According to the method in this application, the first Uu interface can assist the second Uu interface in paging the user equipment and assist the second Uu interface in configuring related SRB and DRB parameters. For the user equipment with a plurality of SIM cards, a UE identifier of the user equipment in the first network may be an identifier of the first SIM card, and a UE identifier of the user equipment in the second network may be an identifier of the second SIM card. In other words, in this application, the first SIM card can assist in paging the second SIM card and assist the second SIM card in configuring a related parameter, for example, when the first SIM card and the second SIM card in the user equipment share a single-input single-output antenna device.

When the user equipment includes the first SIM card and the second SIM card, the first network and the second network may be a same network or different networks.

With reference to the first aspect, in some implementations of the first aspect, the paging method further includes: The user equipment sends a first identifier of the user equipment and a second identifier of the user equipment to the access apparatus, where the first identifier of the user equipment is used to indicate an identifier of a first SIM card of the user equipment in the first network, and the second identifier of the user equipment is used to indicate an identifier of a second SIM card of the user equipment in the second network; and/or the user equipment sends a third identifier of the user equipment and a fourth identifier of the user equipment to the access apparatus, where the third identifier of the user equipment is used to indicate an identifier of a first SIM card of the user equipment in the second network, and the fourth identifier of the user equipment is used to indicate an identifier of a second SIM card of the user equipment in the first network.

When the user equipment has the first SIM card and the second SIM card, different networks page different SIM cards of the user equipment. For example, the first network sends the first identifier to page the first SIM card of the user equipment, and the second network sends the second identifier to page the second SIM card of the user equipment. Alternatively, a same network pages different SIM cards of the user equipment. For example, the first network sends the first identifier and the fourth identifier to page the first SIM card and the second SIM card of the user equipment, or the second network sends the third identifier and the second identifier to page the first SIM card and the second SIM card of the user equipment. Alternatively, different networks page a same SIM card of the user equipment. For example, the first network sends the first identifier to page the first SIM card of the user equipment, and the second network sends the third identifier to page the first SIM card of the user equipment.

Based on the foregoing technical solution, the user equipment may notify the access apparatus of identifiers of a same SIM card of the user equipment in different networks, identifiers of different SIM cards of the user equipment in a same network, or identifiers of different SIM cards of the user equipment in different networks. In this way, when receiving paging from different networks or a same network, the access apparatus can determine, based on different identifiers of the user equipment, that different paging messages are used to page the same user equipment.

According to a second aspect, a paging method is provided, including: An access apparatus receives a first paging message from a second core network device, where the first paging message is used by at least a second network to page user equipment. The access apparatus sends a first message to the user equipment over a first network, where the first message is used to indicate that the user equipment is paged by at least the second network.

According to the paging method provided in this embodiment of this application, the access apparatus may send the first message to the user equipment over the first network, so that the user equipment responds to the paging of the second network, and accesses the second network by using the access apparatus. The user equipment can respond to paging of different networks. Specifically, the first network assists the second network in paging, so that a terminal device that cannot receive paging information of the second network can receive the paging message of the second network. In addition, the first network assists the second network in control plane signaling transmission, so that control plane signaling load balancing between networks can be implemented, and the second network can be prevented from continuously sending a paging message because the second network does not receive a paging response from the terminal device for a long time, thereby reducing a signaling storm of the second network. In this way, normal paging in a shared radio access network scenario can be ensured.

With reference to the second aspect, in some implementations of the second aspect, when the first paging message is used by the second network to page the user equipment, the first paging message and the first message each include at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment by using the access apparatus.

Based on the foregoing technical solution, the first message includes at least one of the second identifier of the user equipment, the identifier of the second network, or the identifier of the second cell, to assist the terminal device in learning that the second network is paging the terminal device, and provide reference information for the terminal device to access the second network, so that the terminal device can select an appropriate cell to access as soon as possible.

With reference to the second aspect, in some implementations of the second aspect, that the first paging message is used by at least a first network to page user equipment includes: The first paging message is used by the first network and the second network to page the user equipment. When the first paging message is used by the first network and the second network to page the user equipment, the first paging message and the first message each include at least one of a second identifier of the user equipment, an identifier of the second network, or an identifier of the second cell, and at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment by using the access apparatus.

Based on the foregoing technical solution, the first message includes at least one of the second identifier of the user equipment, the identifier of the second network, or the identifier of the second cell, and at least one of the first identifier of the user equipment, the identifier of the first network, or the identifier of the first cell, to assist the terminal device in learning that the first network and the second network are paging the terminal device, and provide reference information for the terminal device to access the first network and the second network, so that the terminal device can select an appropriate cell to access as soon as possible.

The first identifier of the user equipment that is included in the first paging message may be included in a first identifier list of the user equipment. To be specific, there may be a plurality of identifiers of the user equipment in the first network, and in the first paging message, the plurality of first identifiers of the user equipment may be used as the first identifier list of the user equipment and sent to the user equipment, to indicate that the first network is paging the user equipment. Likewise, the second identifier of the user equipment that is included in the first paging message may be included in a second identifier list of the user equipment. To be specific, there may be a plurality of identifiers of the user equipment in the second network, and in the first paging message, the plurality of second identifiers of the user equipment may be used as the second identifier list of the user equipment and sent to the user equipment, to indicate that the second network is paging the user equipment.

Optionally, the first paging message includes a second identifier of the user equipment, and the second identifier of the user equipment is used to indicate an identifier of the user equipment in the second network. If the user equipment receives the second identifier of the user equipment by using the first paging message after accessing the first network by using the access apparatus, the user equipment determines that the user equipment further needs to access the second network by using the access apparatus.

The second identifier of the user equipment that is included in the first paging message may be included in a second identifier list of the user equipment. To be specific, there may be a plurality of identifiers of the user equipment in the second network, and in the first paging message, the plurality of second identifiers of the user equipment may be used as the second identifier list of the user equipment and sent to the user equipment, to indicate that the second network is paging the user equipment.

Optionally, the first paging message includes an identifier of the second network, and the identifier of the second network is used to indicate that the second network needs to page the user equipment.

The identifier of the second network that is included in the first paging message may be included in an identifier list of the second network. To be specific, there may be a plurality of identifiers of the second network, and in the first paging message, the plurality of identifiers of the second network may be used as the identifier list of the second network and sent to the user equipment, to indicate that the second network is paging the user equipment.

Optionally, the first paging message includes an identifier of a second cell, and the identifier of the second cell is used to indicate a cell that is in the second network and that may be accessed by the user equipment.

A plurality of cells in the second network may be accessed by the user equipment by using the access apparatus. To be specific, there may be a plurality of identifiers of the second cell in the first paging message, and in the first paging message, the plurality of identifiers of the second cell may be used as an identifier list of the second cell and sent to the user equipment, to indicate that the plurality of cells in the second network may be accessed by the user equipment by using the access apparatus.

Optionally, the first paging message includes a first identifier of the user equipment, and the first identifier of the user equipment is used to indicate an identifier of the user equipment in the first network. The user equipment determines, by using the first identifier of the user equipment that is included in the first paging message, that the user equipment needs to access the first network.

The first identifier of the user equipment that is included in the first paging message may be included in a first identifier list of the user equipment. To be specific, there may be a plurality of identifiers of the user equipment in the first network, and in the first paging message, the plurality of first identifiers of the user equipment may be used as the first identifier list of the user equipment and sent to the user equipment, to indicate that the first network is paging the user equipment.

Optionally, the first paging message includes an identifier of the first network, and the identifier of the first network is used to indicate that the first network needs to page the user equipment.

The identifier of the first network that is included in the first paging message may be included in an identifier list of the first network. To be specific, there may be a plurality of identifiers of the second network, and in the first paging message, the plurality of identifiers of the first network may be used as the identifier list of the first network and sent to the user equipment, to indicate that the first network is paging the user equipment.

Optionally, the first paging message includes an identifier of a first cell, and the identifier of the first cell is used to indicate a cell that is in the first network and that may be accessed by the user equipment by using the access apparatus.

A plurality of cells in the first network may be accessed by the user equipment by using the access apparatus. To be specific, there may be a plurality of identifiers of the first cell in the first paging message, and in the first paging message, the plurality of identifiers of the first cell may be used as an identifier list of the first cell and sent to the user equipment, to indicate that the plurality of cells in the first network may be accessed by the user equipment by using the access apparatus.

With reference to the second aspect, in some implementations of the second aspect, when the first paging message is used by the first network and the second network to page the user equipment, the first paging message further includes a first cause value and/or a second cause value, where the first cause value is used to indicate a reason why the first network pages the user equipment, and the second cause value is used to indicate a reason why the second network pages the user equipment. Alternatively, when the first paging message is used by the second network to page the user equipment, the first paging message further includes the second cause value.

According to the paging method provided in this embodiment of this application, the first paging message may include a reason why a network pages the user equipment, so that the user equipment can learn of, based on the first paging message, reasons why different networks initiate paging, thereby assisting the user equipment in quickly locating a reason why a paging message is initiated, identifying a paging scenario, and quickly making an appropriate policy and action subsequently.

With reference to the second aspect, in some implementations of the second aspect, when the first paging message is used by the first network and the second network to page the user equipment, the first paging message further includes first duration and/or second duration, where the first duration is used to identify that the user equipment accesses the first network within the first duration, and the second duration is used to identify that the user equipment accesses the second network within the second duration. Alternatively, when the first paging message is used by the second network to page the user equipment, the first paging message includes the second duration.

According to the paging method provided in this embodiment of this application, the first paging message may include duration in which the user equipment is expected to respond when a network pages the user equipment, so that the user equipment can learn of, based on the first paging message, a network that initiates paging that needs to be responded to as soon as possible. The terminal device may continue to receive a service of another network within a time threshold, and access a paging network when the time threshold is approaching, to ensure continuity of a user service.

With reference to the second aspect, in some implementations of the second aspect, before the access apparatus sends the first message to the user equipment, the method further includes: The access apparatus establishes a connection to the user equipment. That the access apparatus sends a first message to the user equipment over a first network includes: The access apparatus sends the first message to the user equipment by using a signaling radio bearer SRB in the first network, where the first message is used to indicate that the user equipment is paged by the second network. Alternatively, the access apparatus sends the first message to the user equipment by using paging information in the first network.

According to the paging method provided in this embodiment of this application, when the user equipment has accessed the first network, the first network may assist the second network in paging the user equipment, so that the user equipment in connected mode can respond to paging of another network.

With reference to the second aspect, in some implementations of the second aspect, the paging method further includes: The access apparatus receives a first response message sent by the user equipment. The first response message may be understood as a response to the first message. The first response message includes information about a third cell, and the third cell is a cell that is in the second network and that the user equipment determines to access. The access apparatus sends a second message to the user equipment over the first network. The second message includes at least one of the following parameters: a first parameter used to support the user equipment in randomly accessing the third cell, a second parameter indicating a resource in the third cell, a fourth parameter indicating context information of the user equipment in the second network, or a fifth parameter indicating security and integrity protection information of the user equipment in the second network.

Based on the foregoing technical solution, the user equipment responds to the paging of the second network, selects the third cell that is in the second network and that is to be accessed, and notifies the access apparatus of related information of the third cell. The access apparatus may provide a related parameter for accessing the third cell, and assist the user equipment in accessing the third cell.

With reference to the second aspect, in some implementations of the second aspect, the first message includes at least one of the following parameters: a sixth parameter used to support the user equipment in randomly accessing a second cell in the second network, a seventh parameter indicating a resource in the second cell, a ninth parameter indicating context information of the user equipment in the second network, or a tenth parameter indicating security and integrity protection information of the user equipment in the second network.

Based on the foregoing technical solution, the access apparatus may provide related parameters of a plurality of cells for the user equipment to access.

With reference to the second aspect, in some implementations of the second aspect, when the first paging message is used by the second network to page the user equipment, the method further includes: The access apparatus receives a second paging message sent by a first core network device. The access apparatus sends a third message to the user equipment over the first network, where the third message is used to indicate that the user equipment accesses the first network, and the second paging message and the third message each include at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

According to the paging method provided in this embodiment of this application, the paging of the first network and the paging of the second network may be separately sent by the access apparatus to the user equipment, and after responding to the paging of the first network, the user equipment responds to the paging of the second network with the assistance of the first network.

With reference to the second aspect, in some implementations of the second aspect, the method further includes: The access apparatus receives a second response message sent by the user equipment, where the second response message includes information about a fourth cell, and the fourth cell is a cell that is in the first network and that the user equipment determines to access.

According to the paging method provided in this embodiment of this application, the user equipment may send the second response message to the access apparatus, where the second response message is used to respond to the paging of the first network, and notify the access apparatus of related information of the fourth cell. The access apparatus may provide a related parameter for accessing the fourth cell, and assist the user equipment in accessing the fourth cell.

With reference to the second aspect, in some implementations of the second aspect, the paging method further includes: The access apparatus determines, based on the first paging message and the second paging message, that the access apparatus separately pages the user equipment in a cell in the first network and a cell in the second network, or the access apparatus pages the user equipment in a cell in the second network.

According to the paging method provided in this embodiment of this application, after receiving paging messages sent by a plurality of networks, the access apparatus may determine a sequence of paging the user equipment by different networks.

With reference to the second aspect, in some implementations of the second aspect, when the access apparatus determines to page the user equipment in a cell in the first network or a cell in the second network, the first message includes a first identifier of the user equipment and a second identifier of the user equipment. The first identifier of the user equipment is used to indicate an identifier of the user equipment in the first network, and the second identifier of the user equipment is used to indicate an identifier of the user equipment in the second network. The third message includes the first identifier of the user equipment and the second identifier of the user equipment.

According to the paging method provided in this embodiment of this application, when the access apparatus determines to page the user equipment in both the first network and the second network, the access apparatus may add both the identifier of the user equipment in the first network and the identifier of the user equipment in the second network to the first message or the third message.

With reference to the second aspect, in some implementations of the second aspect, before the access apparatus sends the first message to the user equipment, the method further includes: The access apparatus receives a first identifier of the user equipment and a second identifier of the user equipment from the user equipment, where the first identifier of the user equipment is used to indicate a UE identifier of the user equipment in the first network, and the second identifier of the user equipment is used to indicate a UE identifier of the user equipment in the second network. Alternatively, the access apparatus receives a first identifier of the user equipment and a second identifier of the user equipment from the first core network device. Alternatively, the access apparatus receives a first identifier of the user equipment and a second identifier of the user equipment from the second core network device.

According to the paging method provided in this embodiment of this application, the access apparatus may learn of identifiers of the user equipment in different networks.

With reference to the second aspect, in some implementations of the second aspect, the access apparatus includes an access network device. Alternatively, the access apparatus includes a distributed unit DU and a centralized unit CU. The CU is configured to: receive signaling from the first core network device and receive signaling from the second core network device, and send a fourth message to the DU.

According to the paging method provided in this embodiment of this application, the access apparatus may be an access network device, or may be an access apparatus including a CU and a DU. It is flexible.

That the CU is configured to receive signaling from the first core network device and receive signaling from the second core network device includes: The CU receives the first paging message from the second core network device and receives the second paging message from the first core network device. When the access apparatus includes a DU and a CU, the CU is configured to: receive signaling sent by a core network device, and send a fourth message to the DU. When the fourth message is used by the second network to page the user equipment, the fourth message includes at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment. When the fourth message is used to indicate that the second network and the first network are paging the user equipment, the fourth message includes at least one of a second identifier of the user equipment, an identifier of the second network, or an identifier of a second cell, and at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

When the access apparatus includes a DU and a CU, the access apparatus may include a DU and a plurality of CUs. For example, the access apparatus includes a DU, a first CU, and a second CU. The first CU is configured to receive signaling from the first core network device, and the second CU is configured to receive signaling from the second core network device. The first CU and the second CU each send paging information to the DU, and respectively add a first identifier of the user equipment and a second identifier of the user equipment. Further, the DU separately pages the user equipment in a cell in the first network and a cell in the second network, and separately adds the first identifier of the user equipment and the second identifier of the user equipment. Alternatively, the DU notifies, by using one piece of paging information, the user equipment that both the first network and the second network are paging the device. After the user equipment accesses the first network, the cell in the first network of the first CU and the DU assists in configuring a random access parameter, a bearer parameter, or the like of the user equipment in the cell in the second network of the second CU and the DU.

With reference to the second aspect, in some implementations of the second aspect, when the access apparatus includes a DU and a CU, the method further includes: The DU sends first signaling to the CU, where the first signaling is used to indicate a network that can be accessed by the DU. The DU receives second signaling sent by the CU, where the second signaling is used to indicate a network that can be accessed by both the CU and the DU, or the second signaling is used to indicate a network that can be accessed by the CU, or the second signaling is used to send an auxiliary configuration parameter of the CU for the DU. The auxiliary configuration parameter is used to assist the DU in configuring a related parameter of a supported network. For example, the CU sends network access rate reduction (network access rate reduction) signaling to the DU, to assist the DU in configuring a user access control (user access control, UAC) parameter of a network cell of the DU.

According to the paging method provided in this embodiment of this application, the CU and the DU may learn of, through signaling interaction, respective networks that can be accessed, to determine a network that can be accessed by both the CU and the DU.

With reference to the second aspect, in some implementations of the second aspect, the first signaling includes any one of the following signaling: F1 setup request signaling, DU configuration update request signaling, or a DU serving cell message, where the DU serving cell message includes a cell identifier and a network identifier of a network that can be accessed by a cell. The second signaling includes any one of the following signaling: F1 setup response signaling, DU configuration update response signaling, CU configuration update request signaling, network access rate reduction signaling, F1 setup failure signaling, DU configuration update failure signaling, or information about a network that can be accessed by the CU, where the information about the network that can be accessed by the CU includes a network identifier of the network that can be accessed by the CU.

According to the paging method provided in this embodiment of this application, there may be a plurality of types of signaling exchanged between the CU and the DU.

With reference to the second aspect, in some implementations of the second aspect, the CU includes a control plane CU-CP and a user plane CU-UP. The paging method further includes: The CU-UP sends third signaling to the CU-CP, where the third signaling is used to indicate a network that can be accessed by the CU-UP. The CU-UP receives fourth signaling sent by the CU-CP, where the fourth signaling is used to indicate a network that can be accessed by both the CU-CP and the CU-UP, or the fourth signaling is used to indicate a network that can be accessed by the CU-CP.

According to the paging method provided in this embodiment of this application, the CU-CP and the CU-UP may learn of, through signaling interaction, respective networks that can be accessed, to determine a network that can be accessed by both the CU-CP and the CU-UP.

With reference to the second aspect, in some implementations of the second aspect, the third signaling includes any one of the following signaling: E1 setup request signaling, CU-UP configuration update request signaling, or CU-CP configuration update response signaling. The fourth signaling includes any one of the following signaling: E1 setup response signaling, CU-UP configuration update response signaling, CU-CP configuration update request signaling, E1 setup failure signaling, or CU-UP configuration update failure signaling.

According to the paging method provided in this embodiment of this application, there may be a plurality of types of signaling exchanged between the CU-UP and the CU-CP.

According to a third aspect, a paging method is provided, including: A second core network device sends a first paging message to an access apparatus, where the first paging message is used by at least a second network to page user equipment.

With reference to the third aspect, in some implementations of the third aspect, when the first paging message is used by the second network to page the user equipment, the first paging message includes at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment. That the first paging message is used by at least a first network to page user equipment includes: The first paging message is used by the first network and the second network to page the user equipment. When the first paging message is used by the first network and the second network to page the user equipment, the first paging message and the first message each include at least one of a second identifier of the user equipment, an identifier of the second network, or an identifier of a second cell, and at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

According to a fourth aspect, a communications method is provided, including: A DU sends first signaling to a CU, where the first signaling is used to indicate a network that can be accessed by the DU. The DU receives second signaling sent by the CU, where the second signaling is used to indicate a network that can be accessed by both the CU and the DU, or the second signaling is used to indicate a network that can be accessed by the CU, or the second signaling is used to indicate that the CU fails to respond to the first signaling, and includes a response failure cause, or the second signaling is used to send an auxiliary configuration parameter of the CU for the DU. The auxiliary configuration parameter is used to assist the DU in configuring a related parameter of a supported network. For example, the CU sends network access rate reduction signaling to the DU, to assist the DU in configuring a user access control UAC parameter of a network cell of the DU.

In a possible implementation, when there is no network that can be accessed by both the CU and the DU, the CU fails to respond to the first signaling.

According to the communications method provided in this embodiment of this application, the CU and the DU may learn of, through signaling interaction, respective networks that can be accessed, to determine a network that can be accessed by both the CU and the DU. When UE requests for access, the DU can select a correct CU. In addition, the CU can select a correct DU when establishing user plane resources for the UE, selecting a target cell for handover, and initiating paging to the UE.

When the second signaling includes the response failure cause, the DU may quickly locate, based on a failure cause value, a problem that occurs, and identify, based on a failure cause value, a specific time and scenario corresponding to the failure, so that the DU can quickly make an appropriate policy and action subsequently.

With reference to the fourth aspect, in some implementations of the fourth aspect, the first signaling includes any one of the following signaling: F1 setup request signaling, DU configuration update request signaling, or a DU serving cell message, where the DU serving cell message includes a cell identifier and a network identifier of a network that can be accessed by a cell. The second signaling includes any one of the following signaling: F1 setup response signaling, DU configuration update response signaling, network access rate reduction signaling, CU configuration update request signaling, F1 setup failure signaling, DU configuration update failure signaling, or information about a network that can be accessed by the CU, where the information about the network that can be accessed by the CU includes a network identifier of the network that can be accessed by the CU.

According to the communications method provided in this embodiment of this application, there may be a plurality of types of signaling exchanged between the CU and the DU.

With reference to the fourth aspect, in some implementations of the fourth aspect, the CU includes a control plane CU-CP and a user plane CU-UP. The communications method further includes: The CU-UP sends third signaling to the CU-CP, where the third signaling is used to indicate a network that can be accessed by the CU-UP. The CU-UP receives fourth signaling sent by the CU-CP, where the fourth signaling is used to indicate a network that can be accessed by both the CU-CP and the CU-UP, or the fourth signaling is used to indicate a network that can be accessed by the CU-CP, or the fourth signaling is used to indicate that the CU-CP fails to respond to the third signaling, and includes a response failure cause.

In a possible implementation, when there is no network that can be accessed by both the CU-UP and the CU-CP, the CU-CP fails to respond to the third signaling.

According to the communications method provided in this embodiment of this application, the CU-CP and the CU-UP may learn of, through signaling interaction, respective networks that can be accessed, to determine a network that can be accessed by both the CU-CP and the CU-UP.

With reference to the fourth aspect, in some implementations of the fourth aspect, the third signaling includes any one of the following signaling: E1 setup request signaling, CU-UP configuration update request signaling, or CU-CP configuration update response signaling. The fourth signaling includes any one of the following signaling: E1 setup response signaling, CU-UP configuration update response signaling, CU-CP configuration update request signaling, E1 setup failure signaling, or CU-UP configuration update failure signaling.

According to the communications method provided in this embodiment of this application, there may be a plurality of types of signaling exchanged between the CU-UP and the CU-CP.

According to a fifth aspect, a communications method is provided, including: A CU receives first signaling sent by a DU, where the first signaling is used to indicate a network that can be accessed by the DU. The CU sends second signaling to the DU, where the second signaling is used to indicate a network that can be accessed by both the CU and the DU, or the second signaling is used to indicate a network that can be accessed by the CU, or the second signaling is used to indicate that the CU fails to respond to the first signaling, and includes a response failure cause.

According to the communications method provided in this embodiment of this application, the CU and the DU may learn of, through signaling interaction, respective networks that can be accessed, to determine a network that can be accessed by both the CU and the DU.

With reference to the fifth aspect, in some implementations of the fifth aspect, the first signaling includes any one of the following signaling: F1 setup request signaling, DU configuration update request signaling, or a DU serving cell message, where the DU serving cell message includes a cell identifier and a network identifier of a network that can be accessed by a cell. The second signaling includes any one of the following signaling: F1 setup response signaling, DU configuration update response signaling, network access rate reduction signaling, CU configuration update request signaling, F1 setup failure signaling, DU configuration update failure signaling, or information about a network that can be accessed by the CU, where the information about the network that can be accessed by the CU includes a network identifier of the network that can be accessed by the CU.

According to the communications method provided in this embodiment of this application, there may be a plurality of types of signaling exchanged between the CU and the DU.

According to a sixth aspect, a communications method is provided, including: User equipment receives a first message from an access apparatus over a first network, where the first message is used to indicate a resource that is in the first network and that is used to transmit data of the second network, and the first network and the second network are networks that can be accessed by the access apparatus. The user equipment determines the resource that is in the first network and that is used to transmit the data of the second network.

According to the communications method provided in this embodiment of this application, the user equipment may receive, over the first network, the first message indicating that the user equipment is paged by at least the second network, and determine the resource that is in the first network and that is used to transmit the data of the second network, to transmit the data of the second network by using the resource in the first network. The first network may assist the second network in transmitting user plane data and control plane data, to implement load balancing between networks, offload data traffic of a high-load network from a low-load network, and reduce signaling interaction between networks to prevent a signaling storm. The access apparatus side may perform control plane signaling offloading and user plane data offloading based on paging, to implement load balancing between different cells in different networks.

The data of the second network includes user plane data of the second network and signaling plane data of the second network, for example, PDU session user plane data.

With reference to the sixth aspect, in some implementations of the sixth aspect, the user equipment has accessed the first network, and the communications method further includes: that user equipment receives a first message from an access apparatus over a first network includes: The user equipment receives the first message from the access apparatus by using a signaling radio bearer SRB in the first network, for example, by using an RRC message in the first network. Alternatively, the user equipment receives the first message from the access apparatus by using paging information in the first network.

According to the communications method provided in this embodiment of this application, when the user equipment has accessed the first network, the first network may assist the second network in paging the user equipment, so that the user equipment in connected mode can respond to paging of another network.

With reference to the sixth aspect, in some implementations of the sixth aspect, the communications method further includes: The user equipment sends a first response message to the access apparatus, where the first response message includes information about a third cell, and the third cell is a cell that is in the second network and that the user equipment determines to access. The user equipment receives, over the first network, a second message sent by the access apparatus, where the second message includes a third parameter indicating a resource in the first network and first indication information, and the first indication information is used to indicate that the resource in the first network carries the data of the second network.

The resource in the first network is a resource in the first network that is configured by the first network.

According to the communications method provided in this embodiment of this application, the user equipment responds to the paging of the second network, selects the third cell in the second network to access, and notifies the access apparatus of related information of the third cell. The access apparatus may provide, by using the second message, the resource that is in the first network and that is used to transmit the data of the second network, to assist the user equipment and the second network in transmitting the data of the second network.

With reference to the sixth aspect, in some implementations of the sixth aspect, the first message includes an eighth parameter indicating a resource in the first network and first indication information, and the first indication information is used to indicate that the resource in the first network carries the data of the second network.

Based on the foregoing technical solution, the access apparatus may provide, by using the first message, the resource that is in the first network and that is used to transmit the data of the second network, to assist the user equipment and the second network in transmitting the data of the second network.

The resource in the first network is a resource in the first network that is configured by the first network.

With reference to the sixth aspect, in some implementations of the sixth aspect, the communications method further includes: The user equipment receives, over the first network, a third message sent by the access apparatus, where the third message is used to indicate that the user equipment accesses the first network, and the third message includes at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

According to the communications method provided in this embodiment of this application, the paging of the first network may be sent by the access apparatus to the user equipment, and after responding to the paging of the first network, the user equipment allocates the resource that is in the first network and that is used to transmit the data of the second network.

With reference to the sixth aspect, in some implementations of the sixth aspect, the communications method further includes: The user equipment sends a first identifier of the user equipment and a second identifier of the user equipment to the access apparatus, where the first identifier of the user equipment is used to indicate an identifier of the user equipment in the first network, and the second identifier of the user equipment is used to indicate an identifier of the user equipment in the second network.

Based on the foregoing technical solution, the user equipment may notify the access apparatus of identifiers of the user equipment in different networks. In this way, when receiving paging from different networks, the access apparatus can determine, based on different identifiers of the user equipment, that different paging messages are used to page the same user equipment.

With reference to the sixth aspect, in some implementations of the sixth aspect, the communications method further includes: The user equipment sends a first identifier of the user equipment and a second identifier of the user equipment to the access apparatus, where the first identifier of the user equipment is used to indicate an identifier of a first SIM card of the user equipment in the first network, and the second identifier of the user equipment is used to indicate an identifier of a second SIM card of the user equipment in the second network; and/or the user equipment sends a third identifier of the user equipment and a fourth identifier of the user equipment to the access apparatus, where the third identifier of the user equipment is used to indicate an identifier of a first SIM card of the user equipment in the second network, and the fourth identifier of the user equipment is used to indicate an identifier of a second SIM card of the user equipment in the first network.

According to a seventh aspect, a communications method is provided, including: An access apparatus receives a first paging message from a second core network device, where the first paging message is used by at least a second network to page user equipment. The access apparatus sends a first message to the user equipment over a first network, where the first message is used to indicate a resource that is in the first network and that is used to transmit data of the second network.

According to the communications method provided in this embodiment of this application, the access apparatus may send, to the user equipment by using the first network in the two different networks that can be accessed by the access apparatus, the resource that is in the first network and that is used to transmit the data of the second network, so that the user equipment can transmit the data of the second network in the first network.

With reference to the seventh aspect, in some implementations of the seventh aspect, before the access apparatus sends the first message to the user equipment, the communications method further includes: The access apparatus establishes a connection to the user equipment. That the access apparatus sends a first message to the user equipment over a first network includes: The access apparatus sends the first message to the user equipment by using a signaling radio bearer SRB in the first network. Alternatively, the access apparatus sends the first message to the user equipment by using paging information in the first network.

According to the communications method provided in this embodiment of this application, when the user equipment has accessed the first network, the first network may assist the second network in paging the user equipment, so that the user equipment in connected mode can respond to paging of another network.

With reference to the seventh aspect, in some implementations of the seventh aspect, the access apparatus receives a first response message sent by the user equipment, where the first response message includes information about a third cell, and the third cell is a cell that is in the second network and that the user equipment determines to access. The access apparatus sends a second message to the user equipment over the first network, where the second message includes a third parameter indicating a resource in the first network and first indication information, and the first indication information is used to indicate that the resource in the first network carries the data of the second network.

According to the communications method provided in this embodiment of this application, the user equipment responds to the paging of the second network, selects the third cell in the second network to access, and notifies the access apparatus of related information of the third cell. The access apparatus may provide, by using the second message, the resource that is in the first network and that is used to transmit the data of the second network, to assist the user equipment and the second network in transmitting the data of the second network.

With reference to the seventh aspect, in some implementations of the seventh aspect, the first message includes an eighth parameter indicating a resource in the first network that is configured by a cell in the first network and first indication information, and the first indication information is used to indicate that the resource in the first network that is configured by the cell in the first network carries the data of the second network.

Based on the foregoing technical solution, the access apparatus may provide, by using the first message, the resource that is in the first network and that is used to transmit the data of the second network, to assist the user equipment and the second network in transmitting the data of the second network.

With reference to the seventh aspect, in some implementations of the seventh aspect, when the first paging message is used by the second network to page the user equipment, the method further includes: The access apparatus receives a second paging message sent by a first core network device. The access apparatus sends a third message to the user equipment over the first network, where the third message is used to indicate that the user equipment accesses the first network, and the second paging message and the third message each include at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

According to the communications method provided in this embodiment of this application, the paging of the first network and the paging of the second network may be separately sent by the access apparatus to the user equipment, and after responding to the paging of the first network, the user equipment allocates the resource that is in the first network and that is used to transmit the data of the second network.

According to an eighth aspect, a paging apparatus is provided, including: a receiver, configured to receive a first message from an access apparatus over a first network, where the first message is used to indicate that user equipment is paged by at least the second network; and a processor, configured to page the second network. An example in which the paging apparatus is user equipment is used below for description.

With reference to the eighth aspect, in some implementations of the eighth aspect, when the first message is used to indicate that the user equipment is paged by the second network, the first message includes at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment. That the first message is used to indicate that the user equipment is paged by at least the second network includes: The first message is used to indicate that the user equipment is paged by the second network and the first network. When the first message is used to indicate that the user equipment is paged by the second network and the first network, the first message includes at least one of a second identifier of the user equipment, an identifier of the second network, or an identifier of a second cell, and at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

With reference to the eighth aspect, in some implementations of the eighth aspect, when the first message is used to indicate that the user equipment is paged by the first network and the second network, the first message further includes a first cause value and/or a second cause value, where the first cause value is used to indicate a reason why the first network pages the user equipment, and the second cause value is used to indicate a reason why the second network pages the user equipment. Alternatively, when the first message is used to indicate that the user equipment is paged by the second network, the first message further includes the second cause value.

With reference to the eighth aspect, in some implementations of the eighth aspect, when the first message is used to indicate that the user equipment is paged by the second network and the first network, the first message further includes first duration and/or second duration, where the first duration is used to identify that the user equipment accesses the first network within the first duration, and the second duration is used to identify that the user equipment accesses the second network within the second duration. Alternatively, when the first message is used to indicate that the user equipment is paged by the second network, the first message includes the second duration.

With reference to the eighth aspect, in some implementations of the eighth aspect, the user equipment has accessed the first network. That a receiver receives a first message from an access apparatus over a first network includes: The receiver receives the first message from the access apparatus by using a signaling radio bearer SRB in the first network, for example, by using an RRC message in the first network. Alternatively, the user equipment receives the first message from the access apparatus by using paging information in the first network. The first message is used to indicate that the user equipment is paged by the second network.

With reference to the eighth aspect, in some implementations of the eighth aspect, the paging apparatus further includes a transmitter, configured to send a first response message to the access apparatus, where the first response message includes information about a third cell, and the third cell is a cell that is in the second network and that the user equipment determines to access. The receiver is further configured to receive a second message sent by the access apparatus, where the second message includes at least one of the following parameters: a first parameter used to support the user equipment in randomly accessing the third cell, a second parameter indicating a resource in the third cell, a fourth parameter indicating context information of the user equipment in the second network, or a fifth parameter indicating security and integrity protection information of the user equipment in the second network.

With reference to the eighth aspect, in some implementations of the eighth aspect, the first message includes at least one of the following parameters: a sixth parameter used to support the user equipment in randomly accessing a second cell, a seventh parameter indicating a resource in the second cell, a ninth parameter indicating context information of the user equipment in the second network, or a tenth parameter indicating security and integrity protection information of the user equipment in the second network.

With reference to the eighth aspect, in some implementations of the eighth aspect, when the first message is used to indicate that the user equipment is paged by the second network, the receiver is further configured to receive, over the first network, a third message sent by the access apparatus, where the third message is used to indicate that the user equipment accesses the first network, and the third message includes at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

With reference to the eighth aspect, in some implementations of the eighth aspect, the transmitter is further configured to send a second response message to the access apparatus, where the second response message includes information about a fourth cell, and the fourth cell is a cell that is in the first network and that the user equipment determines to access.

With reference to the eighth aspect, in some implementations of the eighth aspect, the third message further includes a first cause value, and the first cause value is used to indicate a reason why the first network pages the user equipment.

With reference to the eighth aspect, in some implementations of the eighth aspect, the third message further includes first duration, and the first duration is used to identify that the user equipment accesses the first network within the first duration.

With reference to the eighth aspect, in some implementations of the eighth aspect, the transmitter is further configured to send a first identifier of the user equipment and a second identifier of the user equipment to the access apparatus, where the first identifier of the user equipment is used to indicate an identifier of the user equipment in the first network, and the second identifier of the user equipment is used to indicate an identifier of the user equipment in the second network.

With reference to the eighth aspect, in some implementations of the eighth aspect, the user equipment includes a first subscriber identity module SIM card and a second SIM card. The first identifier of the user equipment is used to indicate an identifier of the first SIM card in the first network, and the second identifier of the user equipment is used to indicate an identifier of the second SIM card in the second network.

The paging apparatus provided in the eighth aspect and any possible implementation of the eighth aspect may be configured to perform operations of the user equipment in the first aspect and any possible implementation of the first aspect.

Specifically, the paging apparatus includes a corresponding means (means) configured to perform the steps or functions described in the first aspect or any possible implementation of the first aspect. The means may be the user equipment in the first aspect or a chip or a functional module inside the user equipment. The steps or functions may be implemented by software, hardware, or a combination of hardware and software.

According to a ninth aspect, a paging apparatus is provided, including: a receiver, configured to receive a first paging message from a second core network device, where the first paging message is used by at least a second network to page user equipment; and a transmitter, configured to send a first message to the user equipment over a first network, where the first message is used to indicate that the user equipment is paged by at least the second network.

With reference to the ninth aspect, in some implementations of the ninth aspect, when the first paging message is used by the second network to page the user equipment, the first paging message and the first message each include at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment.

With reference to the ninth aspect, in some implementations of the ninth aspect, that the first paging message is used by at least a first network to page user equipment includes: The first paging message is used by the first network and the second network to page the user equipment. When the first paging message is used by the first network and the second network to page the user equipment, the first paging message and the first message each include at least one of a second identifier of the user equipment, an identifier of the second network, or an identifier of the second cell, and at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment by using the access apparatus. When the first paging message includes the first identifier of the user equipment and the second identifier of the user equipment, it indicates that the user equipment that needs to access or has accessed the second network further needs to access the first network.

With reference to the ninth aspect, in some implementations of the ninth aspect, when the first paging message is used by the first network and the second network to page the user equipment, the first paging message and the first message each further include a first cause value and/or a second cause value, where the first cause value is used to indicate a reason why the first network pages the user equipment, and the second cause value is used to indicate a reason why the second network pages the user equipment. Alternatively, when the first paging message is used by the second network to page the user equipment, the first paging message and the first message each further include the second cause value.

With reference to the ninth aspect, in some implementations of the ninth aspect, when the first paging message is used by the first network and the second network to page the user equipment, the first paging message and the first message each further include first duration and/or second duration, where the first duration is used to identify that the user equipment accesses the first network within the first duration, and the second duration is used to identify that the user equipment accesses the second network within the second duration. Alternatively, when the first paging message is used by the second network to page the user equipment, the first paging message and the first message each include the second duration.

With reference to the ninth aspect, in some implementations of the ninth aspect, before the transmitter sends the first message to the user equipment, the access apparatus establishes a connection to the user equipment. That a transmitter sends a first message to the user equipment over a first network includes: The transmitter sends the first message to the user equipment by using a signaling radio bearer SRB in the first network, where the first message is used to indicate that the user equipment is paged by the second network.

With reference to the ninth aspect, in some implementations of the ninth aspect, the receiver is further configured to receive a first response message sent by the user equipment, where the first response message includes information about a third cell, and the third cell is a cell that is in the second network and that the user equipment determines to access. The transmitter is further configured to send a second message to the user equipment over the first network, where the second message includes at least one of the following parameters: a first parameter used to support the user equipment in randomly accessing the third cell, a second parameter indicating a resource in the third cell, a fourth parameter indicating context information of the user equipment in the second network, or a fifth parameter indicating security and integrity protection information of the user equipment in the second network.

With reference to the ninth aspect, in some implementations of the ninth aspect, the first message includes at least one of the following parameters: a sixth parameter used to support the user equipment in randomly accessing a second cell in the second network, a seventh parameter indicating a resource in the second cell, a ninth parameter indicating context information of the user equipment in the second network, or a tenth parameter indicating security and integrity protection information of the user equipment in the second network.

With reference to the ninth aspect, in some implementations of the ninth aspect, when the first paging message is used by the second network to page the user equipment, the apparatus further includes: The receiver receives a second paging message sent by a first core network device. The transmitter sends a third message to the user equipment over the first network, where the third message is used to indicate that the user equipment accesses the first network, and the second paging message and the third message each include at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

With reference to the ninth aspect, in some implementations of the ninth aspect, the receiver is further configured to receive a second response message sent by the user equipment, where the second response message includes information about a fourth cell, and the fourth cell is a cell that is in the first network and that the user equipment determines to access. With reference to the ninth aspect, in some implementations of the ninth aspect, the apparatus further includes a processor, configured to determine, based on the first paging message and the second paging message, to separately page the user equipment in a cell in the first network and a cell in the second network, or page the user equipment in a cell in the second network.

With reference to the ninth aspect, in some implementations of the ninth aspect, before the transmitter sends the first message to the user equipment, the apparatus further includes: The receiver receives a first identifier of the user equipment and a second identifier of the user equipment from the user equipment, where the first identifier of the user equipment is used to indicate a UE identifier of the user equipment in the first network, and the second identifier of the user equipment is used to indicate a UE identifier of the user equipment in the second network. Alternatively, the receiver receives a first identifier of the user equipment and a second identifier of the user equipment from the first core network device. Alternatively, the receiver receives a first identifier of the user equipment and a second identifier of the user equipment from the second core network device.

With reference to the ninth aspect, in some implementations of the ninth aspect, the access apparatus includes an access network device. Alternatively, the access apparatus includes a distributed unit DU and a centralized unit CU. The CU is configured to: receive signaling from the first core network device and receive signaling from the second core network device, and send signaling to the DU.

With reference to the ninth aspect, in some implementations of the ninth aspect, when the access apparatus includes the DU and the CU, the apparatus further includes: The DU sends first signaling to the CU, where the first signaling is used to indicate a network that can be accessed by the DU. The DU receives second signaling sent by the CU, where the second signaling is used to indicate a network that can be accessed by both the CU and the DU, or the second signaling is used to indicate a network that can be accessed by the CU.

With reference to the ninth aspect, in some implementations of the ninth aspect, the first signaling includes any one of the following signaling: F1 setup request signaling, DU configuration update request signaling, or a DU serving cell message, where the DU serving cell message includes a cell identifier and a network identifier of a network that can be accessed by a cell. The second signaling includes any one of the following signaling: F1 setup response signaling, DU configuration update response signaling, network access rate reduction signaling, CU configuration update request signaling, F1 setup failure signaling, DU configuration update failure signaling, or information about a network that can be accessed by the CU, where the information about the network that can be accessed by the CU includes a network identifier of the network that can be accessed by the CU.

With reference to the ninth aspect, in some implementations of the ninth aspect, the CU includes a control plane CU-CP and a user plane CU-UP. The apparatus further includes: The CU-UP sends third signaling to the CU-CP, where the third signaling is used to indicate a network that can be accessed by the CU-UP. The CU-UP receives fourth signaling sent by the CU-CP, where the fourth signaling is used to indicate a network that can be accessed by both the CU-CP and the CU-UP, or the fourth signaling is used to indicate a network that can be accessed by the CU-CP.

With reference to the ninth aspect, in some implementations of the ninth aspect, the third signaling includes any one of the following signaling: E1 setup request signaling, CU-UP configuration update request signaling, or CU-CP configuration update response signaling. The fourth signaling includes any one of the following signaling: E1 setup response signaling, CU-UP configuration update response signaling, CU-CP configuration update request signaling, E1 setup failure signaling, or CU-UP configuration update failure signaling.

The paging apparatus provided in the ninth aspect and any possible implementation of the ninth aspect may be configured to perform operations of the access apparatus in the second aspect and any possible implementation of the second aspect.

Specifically, the paging apparatus includes a corresponding means (means) configured to perform the steps or functions described in the second aspect or any possible implementation of the second aspect. The means may be the access apparatus in the second aspect or a chip or a functional module inside the access apparatus. The steps or functions may be implemented by software, hardware, or a combination of hardware and software.

According to a tenth aspect, a paging apparatus is provided, including: a transmitter, configured to send a first paging message to an access apparatus, where the first paging message is used by at least a second network to page user equipment.

With reference to the tenth aspect, in some implementations of the tenth aspect, when the first paging message is used by the second network to page the user equipment, the first paging message and the first message each include at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment.

With reference to the tenth aspect, in some implementations of the tenth aspect, that the first paging message is used by at least a first network to page user equipment includes: The first paging message is used by the first network and the second network to page the user equipment. When the first paging message is used by the first network and the second network to page the user equipment, the first paging message and the first message each include at least one of a second identifier of the user equipment, an identifier of the second network, or an identifier of the second cell, and at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment. When the first paging message includes the first identifier of the user equipment and the second identifier of the user equipment, it indicates that the user equipment that needs to access or has accessed the second network further needs to access the first network.

The paging apparatus provided in the tenth aspect and any possible implementation of the tenth aspect may be configured to perform operations of the DU in the third aspect and any possible implementation of the third aspect.

Specifically, the paging apparatus includes a corresponding means (means) configured to perform the steps or functions described in the third aspect or any possible implementation of the third aspect. The means may be the second core network device in the third aspect or a chip or a functional module inside the second core network device. The steps or functions may be implemented by software, hardware, or a combination of hardware and software.

According to an eleventh aspect, a communications apparatus is provided, including: a transmitter, configured to send first signaling to a CU, where the first signaling is used to indicate a network that can be accessed by a DU; and a receiver, configured to receive second signaling sent by the CU, where the second signaling is used to indicate a network that can be accessed by both the CU and the DU, or the second signaling is used to indicate a network that can be accessed by the CU, or the second signaling is used to indicate that the CU fails to respond to the first signaling, and includes a response failure cause.

With reference to the eleventh aspect, in some implementations of the eleventh aspect, the first signaling includes any one of the following signaling: F1 setup request signaling, DU configuration update request signaling, or a DU serving cell message, where the DU serving cell message includes a cell identifier and a network identifier of a network that can be accessed by a cell. The second signaling includes any one of the following signaling: F1 setup response signaling, DU configuration update response signaling, network access rate reduction signaling, CU configuration update request signaling, F1 setup failure signaling, DU configuration update failure signaling, or information about a network that can be accessed by the CU, where the information about the network that can be accessed by the CU includes a network identifier of the network that can be accessed by the CU.

With reference to the eleventh aspect, in some implementations of the eleventh aspect, the communications apparatus includes a control plane CU-CP and a user plane CU-UP. The CU-UP sends third signaling to the CU-CP, where the third signaling is used to indicate a network that can be accessed by the CU-UP. The CU-UP receives fourth signaling sent by the CU-CP, where the fourth signaling is used to indicate a network that can be accessed by both the CU-CP and the CU-UP, or the fourth signaling is used to indicate a network that can be accessed by the CU-CP, or the fourth signaling is used to indicate that the CU-CP fails to respond to the third signaling, and includes a response failure cause.

With reference to the eleventh aspect, in some implementations of the eleventh aspect, the third signaling includes any one of the following signaling: E1 setup request signaling, CU-UP configuration update request signaling, or CU-CP configuration update response signaling. The fourth signaling includes any one of the following signaling: E1 setup response signaling, CU-UP configuration update response signaling, CU-CP configuration update request signaling, E1 setup failure signaling, or CU-UP configuration update failure signaling.

The paging apparatus provided in the eleventh aspect and any possible implementation of the eleventh aspect may be configured to perform operations of the DU in the fourth aspect and any possible implementation of the fourth aspect.

Specifically, the paging apparatus includes a corresponding means (means) configured to perform the steps or functions described in the third aspect or any possible implementation of the fourth aspect. The means may be the DU in the fourth aspect or a chip or a functional module inside the DU. The steps or functions may be implemented by software, hardware, or a combination of hardware and software.

According to a twelfth aspect, a communications apparatus is provided, including: a receiver, configured to receive first signaling sent by a DU, where the first signaling is used to indicate a network that can be accessed by the DU; and a transmitter, configured to send second signaling to the DU, where the second signaling is used to indicate a network that can be accessed by both the CU and the DU, or the second signaling is used to indicate a network that can be accessed by the CU, or the second signaling is used to indicate that the CU fails to respond to the first signaling, and includes a response failure cause.

With reference to the twelfth aspect, in some implementations of the twelfth aspect, the first signaling includes any one of the following signaling: F1 setup request signaling, DU configuration update request signaling, or a DU serving cell message, where the DU serving cell message includes a cell identifier and a network identifier of a network that can be accessed by a cell. The second signaling includes any one of the following signaling: F1 setup response signaling, DU configuration update response signaling, network access rate reduction signaling, CU configuration update request signaling, F1 setup failure signaling, DU configuration update failure signaling, or information about a network that can be accessed by the CU, where the information about the network that can be accessed by the CU includes a network identifier of the network that can be accessed by the CU.

The paging apparatus provided in the twelfth aspect and any possible implementation of the twelfth aspect may be configured to perform operations of the CU in the fifth aspect and any possible implementation of the fifth aspect.

Specifically, the paging apparatus includes a corresponding means (means) configured to perform the steps or functions described in the fourth aspect or any possible implementation of the fifth aspect. The means may be the CU in the fifth aspect or a chip or a functional module inside the CU. The steps or functions may be implemented by software, hardware, or a combination of hardware and software.

According to a thirteenth aspect, a communication apparatus is provided, including: a receiver, configured to receive a first message from an access apparatus over a first network, where the first message is used to indicate a resource that is in the first network and that is used to transmit data of the second network, and the first network and the second network are networks that can be accessed by the access apparatus; and a processor, configured to determine the resource that is in the first network and that is used to transmit the data of second network.

With reference to the thirteenth aspect, in some implementations of the thirteenth aspect, the communications apparatus includes user equipment, the user equipment has accessed the first network, and that a receiver receives a first message from an access apparatus over a first network includes: The receiver receives the first message from the access apparatus by using a signaling radio bearer SRB in the first network, for example, by using an RRC message in the first network. Alternatively, the receiver receives the first message from the access apparatus by using paging information in the first network.

With reference to the thirteenth aspect, in some implementations of the thirteenth aspect, the communications apparatus further includes a transmitter, configured to send a first response message to the access apparatus, where the first response message includes information about a third cell, and the third cell is a cell that is in the second network and that the user equipment determines to access. The user equipment receives, over the first network, a second message sent by the access apparatus, where the second message includes a third parameter indicating a resource in the first network and first indication information, and the first indication information is used to indicate that the resource in the first network carries the data of the second network.

With reference to the thirteenth aspect, in some implementations of the thirteenth aspect, the first message includes an eighth parameter indicating a resource in the first network and first indication information, and the first indication information is used to indicate that the resource in the first network carries the data of the second network.

With reference to the thirteenth aspect, in some implementations of the thirteenth aspect, when the first message is used to indicate that the user equipment is paged by the second network, the receiver is further configured to receive, over the first network, a third message sent by the access apparatus, where the third message is used to indicate that the user equipment accesses the first network, and the third message includes at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

With reference to the thirteenth aspect, in some implementations of the thirteenth aspect, the transmitter is further configured to send a first identifier of the user equipment and a second identifier of the user equipment to the access apparatus, where the first identifier of the user equipment is used to indicate an identifier of the user equipment in the first network, and the second identifier of the user equipment is used to indicate an identifier of the user equipment in the second network.

With reference to the thirteenth aspect, in some implementations of the thirteenth aspect, the transmitter is further configured to send a first identifier of the user equipment and a second identifier of the user equipment to the access apparatus, where the first identifier of the user equipment is used to indicate an identifier of a first SIM card of the user equipment in the first network, and the second identifier of the user equipment is used to indicate an identifier of a second SIM card of the user equipment in the second network.

The communications apparatus provided in the thirteenth aspect and any possible implementation of the thirteenth aspect may be configured to perform operations of the user equipment in the sixth aspect and any possible implementation of the sixth aspect.

Specifically, the paging apparatus includes a corresponding means (means) configured to perform the steps or functions described in the first aspect or any possible implementation of the first aspect. The means may be the user equipment in the first aspect or a chip or a functional module inside the user equipment. The steps or functions may be implemented by software, hardware, or a combination of hardware and software.

According to a fourteenth aspect, a communications apparatus is provided, including: a receiver, configured to receive a first paging message from a second core network device, where the first paging message is used by at least a second network to page user equipment; and a transmitter, configured to send a first message to the user equipment over a first network, where the first message is used to indicate a resource that is in the first network and that is used to transmit data of the second network.

With reference to the fourteenth aspect, in some implementations of the fourteenth aspect, before the transmitter sends the first message to the user equipment, the access apparatus establishes a connection to the user equipment. That a transmitter sends a first message to the user equipment over a first network includes: The transmitter sends the first message to the user equipment by using a signaling radio bearer SRB in the first network. Alternatively, the transmitter sends the first message to the user equipment by using paging information in the first network.

With reference to the fourteenth aspect, in some implementations of the fourteenth aspect, the receiver is further configured to receive a first response message sent by the user equipment, where the first response message includes information about a third cell, and the third cell is a cell that is in the second network and that the user equipment determines to access. The transmitter sends a second message to the user equipment over the first network, where the second message includes a third parameter indicating a resource in the first network and first indication information, and the first indication information is used to indicate that the resource in the first network carries the data of the second network.

With reference to the fourteenth aspect, in some implementations of the fourteenth aspect, the first message includes an eighth parameter indicating a resource in the first network and first indication information, and the first indication information is used to indicate that the resource in the first network carries the data of the second network.

With reference to the fourteenth aspect, in some implementations of the fourteenth aspect, when the first paging message is used by the second network to page the user equipment, the receiver is further configured to receive a second paging message sent by a first core network device. The transmitter sends a third message to the user equipment over the first network, where the third message is used to indicate that the user equipment accesses the first network, and the second paging message and the third message each include at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

The communications apparatus provided in the fourteenth aspect and any possible implementation of the fourteenth aspect may be configured to perform operations of the access apparatus in the seventh aspect and any possible implementation of the seventh aspect.

Specifically, the paging apparatus includes a corresponding means (means) configured to perform the steps or functions described in the seventh aspect or any possible implementation of the seventh aspect. The means may be the access apparatus in the seventh aspect or a chip or a functional module inside the access apparatus. The steps or functions may be implemented by software, hardware, or a combination of hardware and software.

According to a fifteenth aspect, a paging apparatus is provided. The paging apparatus includes a processor, configured to implement functions of the user equipment in the method described in the first aspect.

Optionally, the paging apparatus may further include a memory, the memory is coupled to the processor, and the processor is configured to implement functions of the user equipment in the method described in the first aspect. In a possible implementation, the memory is configured to store program instructions and data. The memory is coupled to the processor, and the processor may invoke and execute the program instructions stored in the memory, to implement functions of the user equipment in the method described in the first aspect.

Optionally, the paging apparatus may further include a communications interface, and the communications interface is used by the paging apparatus to communicate with another device. When the paging apparatus is user equipment, the transceiver may be a communications interface or an input/output interface.

In a possible design, the paging apparatus includes a processor and a communications interface, configured to implement functions of the user equipment in the method described in the first aspect. Details are as follows:

The communications interface is used by the processor to perform external communication.

The processor is configured to run a computer program, so that the apparatus implements the method described in the first aspect.

It may be understood that the external communication may be communication with an object other than the processor, or an object other than the apparatus.

In another implementation, when the paging apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

According to a sixteenth aspect, a paging apparatus is provided. The paging apparatus includes a processor, configured to implement functions of the access apparatus in the method described in the second aspect.

Optionally, the paging apparatus may further include a memory, the memory is coupled to the processor, and the processor is configured to implement functions of the access apparatus in the method described in the second aspect. In a possible implementation, the memory is configured to store program instructions and data. The memory is coupled to the processor, and the processor may invoke and execute the program instructions stored in the memory, to implement functions of the access apparatus in the method described in the second aspect. Optionally, the paging apparatus may further include a communications interface, and the communications interface is used by the paging apparatus to communicate with another device. When the paging apparatus is an access apparatus, the communications interface is a transceiver, an input/output interface, a circuit, or the like.

In a possible design, the paging apparatus includes a processor and a communications interface.

The communications interface is used by the processor to perform external communication.

The processor is configured to run a computer program, so that the apparatus implements the method described in the second aspect.

In another possible design, the paging apparatus is a chip or a chip system. The communications interface may be an input/output interface, an interface circuit, an output circuit, an input circuit, a pin, a related circuit, or the like on the chip or the chip system. The processor may alternatively be embodied as a processing circuit or a logic circuit.

According to a seventeenth aspect, a paging apparatus is provided. The paging apparatus includes a processor, configured to implement functions of the second core network device in the method described in the third aspect.

Optionally, the paging apparatus may further include a memory, the memory is coupled to the processor, and the processor is configured to implement functions of the second core network device in the method described in the third aspect. In a possible implementation, the memory is configured to store program instructions and data. The memory is coupled to the processor, and the processor may invoke and execute the program instructions stored in the memory, to implement functions of the second core network device in the method described in the third aspect. Optionally, the paging apparatus may further include a communications interface, and the communications interface is used by the paging apparatus to communicate with another device. When the paging apparatus is an access apparatus, the communications interface is a transceiver, an input/output interface, a circuit, or the like.

In a possible design, the paging apparatus includes a processor and a communications interface.

The communications interface is used by the processor to perform external communication.

The processor is configured to run a computer program, so that the apparatus implements the method described in the third aspect.

In another possible design, the paging apparatus is a chip or a chip system. The communications interface may be an input/output interface, an interface circuit, an output circuit, an input circuit, a pin, a related circuit, or the like on the chip or the chip system. The processor may alternatively be embodied as a processing circuit or a logic circuit.

According to an eighteenth aspect, a communications apparatus is provided. The communications apparatus includes a processor, configured to implement functions of the DU in the method described in the fourth aspect.

Optionally, the communications apparatus may further include a memory, the memory is coupled to the processor, and the processor is configured to implement functions of the DU in the method described in the fourth aspect. In a possible implementation, the memory is configured to store program instructions and data. The memory is coupled to the processor, and the processor may invoke and execute the program instructions stored in the memory, to implement functions of the DU in the method described in the fourth aspect.

Optionally, the communications apparatus may further include a communications interface, and the communications interface is used by the communications apparatus to communicate with another device. When the communications apparatus is a DU, the transceiver may be a communications interface or an input/output interface.

In a possible design, the communications apparatus includes a processor and a communications interface, configured to implement functions of the DU in the method described in the fourth aspect. Details are as follows:

The communications interface is used by the processor to perform external communication.

The processor is configured to run a computer program, so that the apparatus implements the method described in the fourth aspect.

It may be understood that the external communication may be communication with an object other than the processor, or an object other than the apparatus.

In another implementation, when the communications apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

According to a nineteenth aspect, a communications apparatus is provided. The communications apparatus includes a processor, configured to implement functions of the CU in the method described in the fifth aspect.

Optionally, the communications apparatus may further include a memory, the memory is coupled to the processor, and the processor is configured to implement functions of the CU in the method described in the fifth aspect. In a possible implementation, the memory is configured to store program instructions and data. The memory is coupled to the processor, and the processor may invoke and execute the program instructions stored in the memory, to implement functions of the CU in the method described in the fifth aspect. Optionally, the communications apparatus may further include a communications interface, and the communications interface is used by the communications apparatus to communicate with another device. When the communications apparatus is a CU, the communications interface is a transceiver, an input/output interface, a circuit, or the like.

In a possible design, the communications apparatus includes a processor and a communications interface.

The communications interface is used by the processor to perform external communication.

The processor is configured to run a computer program, so that the apparatus implements the method described in the fifth aspect.

In another possible design, the communications apparatus is a chip or a chip system. The communications interface may be an input/output interface, an interface circuit, an output circuit, an input circuit, a pin, a related circuit, or the like on the chip or the chip system. The processor may alternatively be embodied as a processing circuit or a logic circuit.

According to a twentieth aspect, a communications apparatus is provided. The communications apparatus includes a processor, configured to implement functions of the user equipment in the method described in the sixth aspect.

Optionally, the communications apparatus may further include a memory, the memory is coupled to the processor, and the processor is configured to implement functions of the user equipment in the method described in the sixth aspect. In a possible implementation, the memory is configured to store program instructions and data. The memory is coupled to the processor, and the processor may invoke and execute the program instructions stored in the memory, to implement functions of the user equipment in the method described in the sixth aspect.

Optionally, the communications apparatus may further include a communications interface, and the communications interface is used by the communications apparatus to communicate with another device. When the communications apparatus is user equipment, the transceiver may be a communications interface or an input/output interface.

In a possible design, the communications apparatus includes a processor and a communications interface, configured to implement functions of the user equipment in the method described in the sixth aspect. Details are as follows:

The communications interface is used by the processor to perform external communication.

The processor is configured to run a computer program, so that the apparatus implements the method described in the fifth aspect.

It may be understood that the external communication may be communication with an object other than the processor, or an object other than the apparatus.

In another implementation, when the communications apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

According to a twenty-first aspect, a communications apparatus is provided. The communications apparatus includes a processor, configured to implement functions of the access apparatus in the method described in the seventh aspect.

Optionally, the communications apparatus may further include a memory, the memory is coupled to the processor, and the processor is configured to implement functions of the access apparatus in the method described in the seventh aspect. In a possible implementation, the memory is configured to store program instructions and data. The memory is coupled to the processor, and the processor may invoke and execute the program instructions stored in the memory, to implement functions of the access apparatus in the method described in the seventh aspect. Optionally, the communications apparatus may further include a communications interface, and the communications interface is used by the communications apparatus to communicate with another device. When the communications apparatus is an access apparatus, the communications interface is a transceiver, an input/output interface, a circuit, or the like.

In a possible design, the communications apparatus includes a processor and a communications interface.

The communications interface is used by the processor to perform external communication.

The processor is configured to run a computer program, so that the apparatus implements the method described in the seventh aspect.

In another possible design, the communications apparatus is a chip or a chip system. The communications interface may be an input/output interface, an interface circuit, an output circuit, an input circuit, a pin, a related circuit, or the like on the chip or the chip system. The processor may alternatively be embodied as a processing circuit or a logic circuit.

According to a twenty-second aspect, a computer-readable storage medium is provided. The computer-readable storage medium stores a computer program, and when the computer program is executed by a communications apparatus, the communications apparatus is enabled to implement the methods in any one of the first aspect to the seventh aspect, or the possible implementations of the first aspect to the seventh aspect.

According to a twenty-third aspect, a computer program product including instructions is provided. When the instructions are executed by a computer, a communications apparatus is enabled to implement the methods in any one of the first aspect to the seventh aspect, or the possible implementations of the first aspect to the seventh aspect.

According to a twenty-fourth aspect, a communications system is provided, including the paging apparatus described in the ninth aspect and the paging apparatus described in the tenth aspect.

According to a twenty-fifth aspect, a paging method is provided, including: A second core network device sends a first paging message to an access apparatus, where the first paging message is used by at least a second network to page user equipment. The access apparatus sends a first message to the user equipment over a first network, where the first message is used to indicate that the user equipment is paged by at least the second network.

Based on the foregoing solution, when the second network needs to page the user equipment, the second core network device sends the first paging message to the access apparatus. After receiving the first paging message, the access apparatus learns that the second network needs to page the user equipment. In this case, the access apparatus may send the first message to the user equipment over the first network, so that the user equipment responds to the paging of the second network, and accesses the second network by using the access apparatus. Specifically, the first network assists the second network in paging, so that a terminal device that cannot receive paging information of the second network can receive the paging message of the second network. In addition, the first network assists the second network in control plane signaling transmission, so that control plane signaling load balancing between networks can be implemented, and the second network can be prevented from continuously sending a paging message because the second network does not receive a paging response from the terminal device for a long time, thereby reducing a signaling storm of the second network. In this way, normal paging in a shared radio access network scenario can be ensured.

According to a twenty-sixth aspect, a paging system is provided, including a second core network device and an access apparatus. The second core network device is configured to send a first paging message to the access apparatus, where the first paging message is used by at least a second network to page user equipment. The access apparatus is configured to send a first message to the user equipment over a first network, where the first message is used to indicate that the user equipment is paged by at least the second network.

BRIEF DESCRIPTION OF DRAWINGS

FIG. 7 is a schematic diagram of a PNI-NPN and an SNPN in a shared-RAN scenario according to an embodiment of this application;

DESCRIPTION OF EMBODIMENTS

The following describes technical solutions in this application with reference to the accompanying drawings.

The technical solutions in the embodiments of this application may be applied to various communications systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), and a fifth generation (5th generation, 5G) system or an NR system. The 5G mobile communications system described in this application includes a non-standalone (non-standalone, NSA) 5G mobile communications system or a standalone (standalone, SA) 5G mobile communications system. The technical solutions provided in this application may be further applied to a future communications system such as a sixth generation mobile communications system. The communications system may alternatively be a public land mobile network (public land mobile network, PLMN), a device-to-device (device-to-device, D2D) communications system, a machine-to-machine (machine to machine, M2M) communications system, an internet of things (Internet of Things, IoT) communications system, or another communications system.

Figure 1:
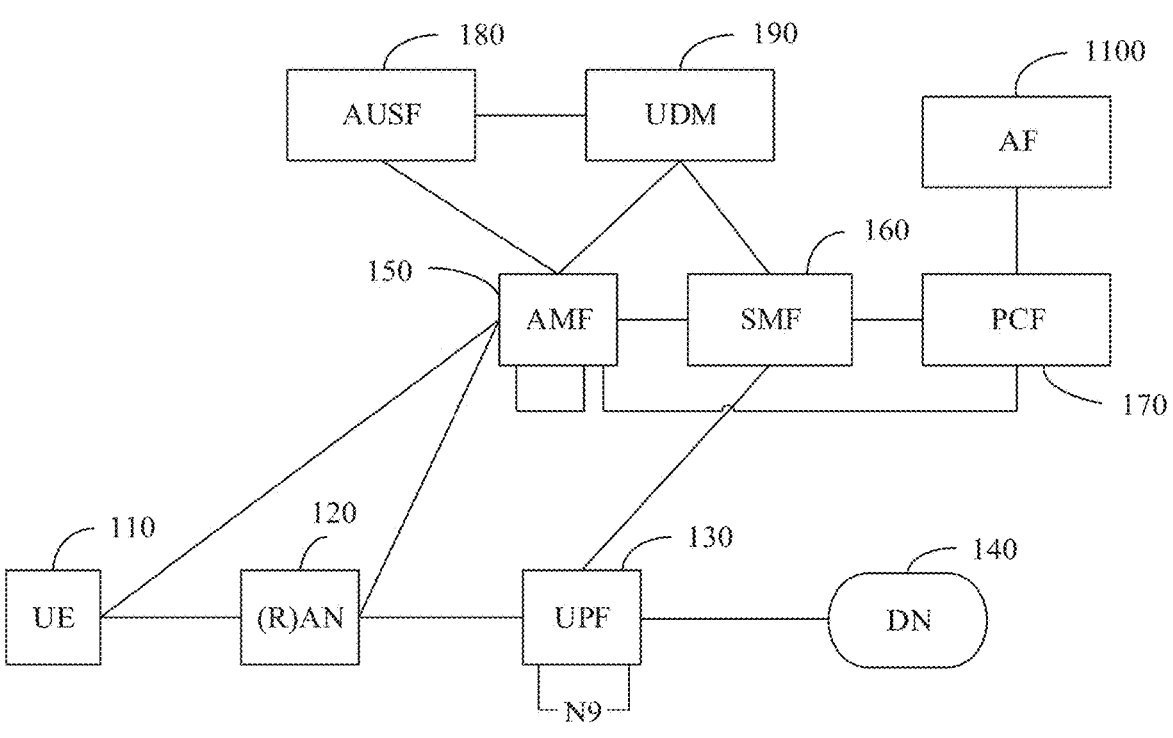
FIG. 1 is a network architecture applicable to an embodiment of this application.

FIG. 1 is a network architecture applicable to an embodiment of this application. As shown in FIG. 1, the following separately describes components in the network architecture.

1. User equipment (user equipment, UE) 110: The UE 110 may include various handheld devices having a wireless communication function, vehicle-mounted devices, wearable devices, computing devices, or other processing devices connected to a wireless modem, and various forms of terminals, mobile stations (mobile station, MS), terminals (terminal), soft clients, and the like. For example, the UE 110 may be a water meter, an electricity meter, or a sensor.

2. (Radio) access network (radio access network, (R)AN) network element 120: The (R)AN network element 120 is configured to: manage a radio resource, and provide an access service for user equipment, to complete forwarding of a control signal and user equipment data between the user equipment and a core network.

3. User plane network element 130: The user plane network element 130 is configured to perform packet routing and forwarding, quality of service (quality of service, QoS) processing of user plane data, and the like.

In a 5G communications system, the user plane network element may be a user plane function (user plane function, UPF) network element. In a future communications system, the user plane network element may still be a UPF network element, or may have another name. This is not limited in this application.

4. Data network element 140: The data network element 140 is configured to provide a network for data transmission.

In a 5G communications system, the data network element may still be a data network (data network, DN) element. In a future communications system, the data network element may still be a DN network element, or may have another name. This is not limited in this application.

5. Access and mobility management network element 150: The access and mobility management network element 150 is mainly configured to perform mobility management, access management, and the like. The access and mobility management network element 150 may be configured to implement functions, for example, lawful interception and access authorization/authentication, other than session management in functions of a mobility management entity (mobility management entity, MME).

In a 5G communications system, the access and mobility management network element may be an access and mobility management function (access and mobility management function, AMF). In a future communications system, the access and mobility management device may still be an AMF, or may have another name. This is not limited in this application.

6. Session management network element 160: The session management network element 160 is mainly configured to: manage a session, assign and manage an internet protocol (internet protocol, IP) address of user equipment, select an endpoint that can manage a user plane function interface and a policy control and charging function interface, notify downlink data, and the like.

In a 5G communications system, the session management network element may be a session management function (session management function, SMF) network element. In a future communications system, the session management network element may still be an SMF network element, or may have another name. This is not limited in this application.

7. Policy control network element 170: The policy control network element 170 is configured to: guide a unified policy framework for network behavior, provide policy rule information for a control plane function network element (such as an AMF or an SMF network element), and the like.

In a 4G communications system, the policy control network element may be a policy and charging rules function (policy and charging rules function, PCRF) network element. In a 5G communications system, the policy control network element may be a policy control function (policy control function, PCF) network element. In a future communications system, the policy control network element may still be a PCF network element, or may have another name. This is not limited in this application.

8. Authentication server 180: The authentication server 180 is configured to: authenticate a service, generate a key to implement two-way authentication for user equipment, and support a unified authentication framework.

In a 5G communications system, the authentication server may be an authentication server function (authentication server function, AUSF) network element. In a future communications system, the authentication server function network element may still be an AUSF network element, or may have another name. This is not limited in this application.

9. Data management network element 190: The data management network element 190 is configured to: process an identifier of user equipment, and perform access authentication, registration, mobility management, and the like.

In a 5G communications system, the data management network element may be a unified data management (unified data management, UDM) network element. In a 4G communications system, the data management network element may be a home subscriber server (home subscriber server, HSS) network element. In a future communications system, the unified data management may still be a UDM network element, or may have another name. This is not limited in this application.

10. Application network element 1100: The application network element 1100 is configured to: perform application-affected data routing, access a network exposure function network element, interact with a policy framework to perform policy control, and the like.

In a 5G communications system, the application network element may be an application function (application function, AF) network element. In a future communications system, the application network element may still be an AF network element, or may have another name. This is not limited in this application.

11. Network repository network element: The network repository network element is configured to maintain real-time information of all network function services in a network.

In a 5G communications system, the network repository network element may be a network registration function (network repository function, NRF) network element. In a future communications system, the network repository network element may still be an NRF network element, or may have another name. This is not limited in this application.

It may be understood that the foregoing network element or function may be a network element in a hardware device, a software function running on dedicated hardware, or a virtualized function instantiated on a platform (for example, a cloud platform). For ease of description, this application is described below by using an example in which the access and mobility management device is the AMF, the data management network element is the UDM network element, the session management network element is the SMF network element, and the user plane network element is the UPF network element.

For ease of description, in the embodiments of this application, a paging method is described by using an example in which an apparatus is an AMF entity or a UDM entity. For an implementation method in which the apparatus is a chip in the AMF entity or a chip in the UDM entity, refer to specific descriptions about an implementation method in which the apparatus is the AMF entity or the UDM entity.

In the network architecture shown in FIG. 1, the user equipment is connected to the AMF through an interface (for example, an N1 interface), the (R)AN is connected to the AMF through an interface (for example, an N2 interface), and the (R)AN is connected to the UPF through an interface (for example, an N3 interface). UPFs are connected to each other through an interface (for example, an N9 interface), and the UPF is connected to the DN through an interface (for example, an N6 interface). The SMF controls the UPF through an N4 interface. The AMF is connected to the SMF through an interface (for example, an N11 interface). The AMF obtains subscription data of the user equipment from the UDM unit through an interface (for example, an N8 interface), and the SMF obtains the subscription data of the user equipment from the UDM unit through an interface (for example, an N10 interface).

The foregoing network architecture applicable to the embodiments of this application is merely an example, and a network architecture applicable to the embodiments of this application is not limited thereto. Any network architecture that can implement functions of the foregoing network elements is applicable to the embodiments of this application.

For example, in some network architectures, network function network element entities such as an AMF, an SMF network element, a PCF network element, a BSF network element, and a UDM network element are all referred to as network function (network function, NF) network elements. Alternatively, in some other network architectures, a set of network elements such as an AMF, an SMF network element, a PCF network element, a BSF network element, and a UDM network element may be all referred to as control plane function network elements.

The user equipment (user equipment, UE) in the embodiments of this application may be an access terminal, a subscriber unit, a subscriber station, a mobile station, a mobile console, a relay station, a remote station, a remote terminal, a mobile device, a user terminal (user terminal), a terminal device (terminal equipment), a terminal, a wireless communications device, a user agent, a user apparatus, or the like. The user equipment may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, user equipment in a future 5G network, user equipment in a future evolved PLMN, user equipment in future internet of vehicles, or the like. This is not limited in the embodiments of this application.

By way of example and not limitation, in the embodiments of this application, the wearable device may also be referred to as a wearable intelligent device, and is a generic term for wearable devices that are developed by using wearable technologies to intelligently design daily wear, such as glasses, gloves, watches, clothes, and shoes. The wearable device is a portable device that can be directly worn or integrated into clothes or accessories of a user. The wearable device is not merely a hardware device, but is used to implement a powerful function through software support, data exchange, and cloud interaction. In a broader sense, the wearable intelligent device is full-featured, has a large size, and can implement all or some functions without depending on a smartphone. For example, the wearable intelligent device is a smart watch or smart glasses. Alternatively, the wearable intelligent device focuses only on a specific application function, and needs to be used with another device such as a smartphone. For example, the wearable intelligent device is a smart wristband, a smart helmet, or smart jewelry for physical sign monitoring.

In addition, in the embodiments of this application, the user equipment may alternatively be user equipment in an IoT system. The IoT is an important constituent part of future information technology development. A main technical feature of the IoT is connecting a thing to a network by using a communications technology, to implement an intelligent network for interconnection between a person and a machine or between things. In the embodiments of this application, an IoT technology may implement massive connections, deep coverage, and terminal power saving through a narrowband (narrow band, NB) technology or the like.

In addition, in the embodiments of this application, the user equipment may further include a device such as an intelligent printer, a train detector, an event data recorder, or a vehicle-mounted stereo. Main functions of the user equipment include: collecting data, receiving control information and downlink data from a network device, sending an electromagnetic wave, and transmitting uplink data to the network device.

In the embodiments of this application, the access network device may be any communications device that has a wireless transceiver function and that is configured to communicate with the user equipment. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB HeNB, or a home NodeB HNB), a baseband unit (baseBand unit, BBU), an access point (access point, AP) in a wireless fidelity (wireless fidelity, WIFI) system, a wireless relay node, a wireless backhaul node, a transmission point (transmission point, TP), a transmission reception point (transmission and reception point, TRP), or the like. Alternatively, the device may be a gNB or a transmission point (TRP or TP) in a 5G system such as an NR system, may be one antenna panel or a group of antenna panels (including a plurality of antenna panels) of a gNB in a 5G system, or may be a network node, such as a baseband unit (BBU) or a distributed unit (distributed unit, DU), that constitutes a gNB or a transmission point.

Figure 2:
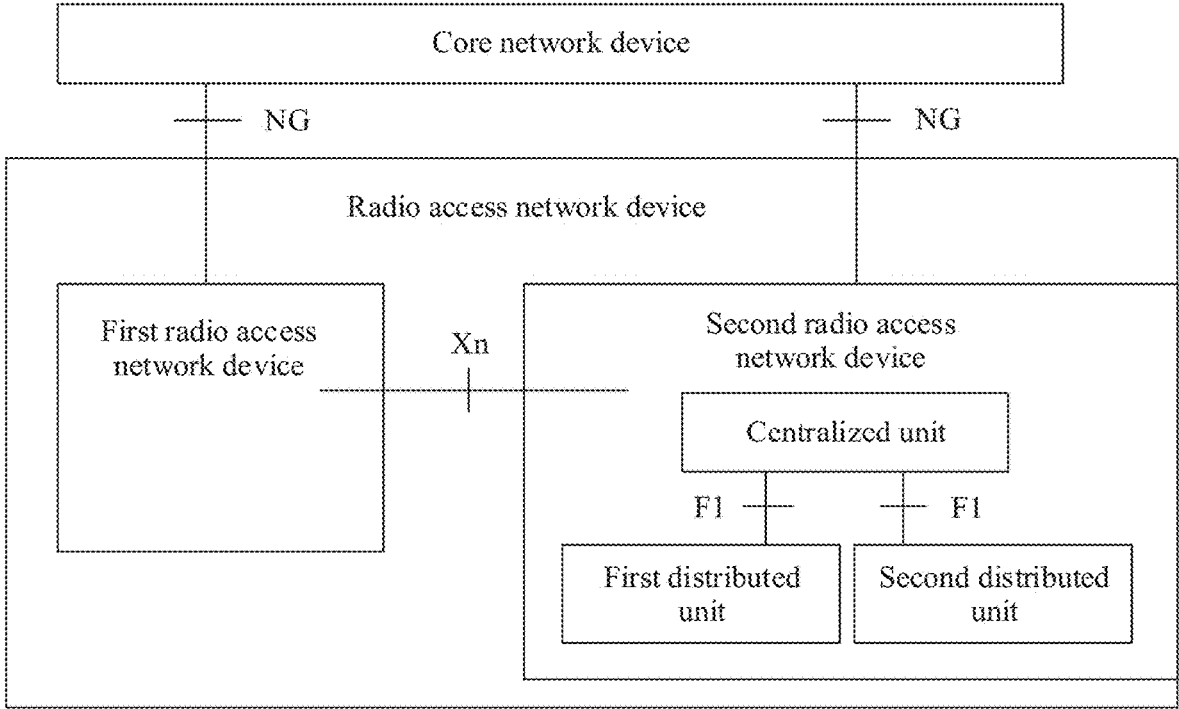
FIG. 2 is a schematic block diagram of another communications system applicable to an embodiment of this application.

In some deployments, the gNB may include a centralized unit (centralized unit, CU) and a DU. FIG. 2 is a schematic block diagram of another communications system applicable to an embodiment of this application. The communications system includes a core network device and radio access network devices. The radio access network device includes a centralized unit and a distributed unit.

The core network device shown in FIG. 2 in the embodiments of this application may be a core network device in different communications systems, for example, a core network device in a 5G communications system or a core network device in an LTE communications system. The radio access network devices include a first radio access network device and a second radio access network device.

Specifically, the first radio access network device in FIG. 2 may be a gNodeB (gNodeB, gNB) or an ng-eNodeB (ng-eNodeB, ng-eNB). The second radio access network device may also be a gNB or an ng-eNB. The gNB provides a user plane protocol and function and a control plane protocol and function of NR for a terminal device, and the ng-eNB provides a user plane protocol and function and a control plane protocol and function of evolved universal terrestrial radio access (evolved universal terrestrial radio access, E-UTRA) for the terminal device. All interfaces between the radio access network devices are Xn interfaces. An interface between the radio access network device and the core network device is referred to as an NG interface.

Specifically, the gNB or the ng-eNB may include a CU and a DU. Specifically, one radio access network device may include one centralized unit and one or more distributed units. In FIG. 2, the second radio access network device includes a first distributed unit and a second distributed unit.

The CU device has (hosting) a wireless high-layer protocol stack function. For example, the CU has an RRC layer and a packet data convergence protocol (packet data convergence protocol, PDCP) layer. Moreover, the CU can support some core network functions in being deployed in an access network, which is referred to as an edge computing network, so that a higher network latency requirement posed by an emerging service (for example, video, online shopping, or virtual/augmented reality) in a future communications network can be satisfied. The CU has some of functions of a core network and higher-layer protocol stacks of a radio access network, and main protocol layers include an RRC function, a service discovery application protocol (service discovery application protocol, SDAP) sublayer function, and a packet data convergence protocol (packet data convergence protocol, PDCP) sublayer function. The DU has some of functions of a physical layer for baseband processing and a layer 2. Specifically, the DU implements a radio frequency processing function and baseband processing functions of layers such as a radio link control (radio link control, RLC) layer, a medium access control (medium access control, MAC) layer, and a physical layer (physical layer, PHY). CUs may be deployed in a centralized manner. Deployment of DUs depends on an actual network environment. In a core urban area with high traffic density, a small station spacing, and limited computer room resources, such as a university or a large-scale performance venue, the DUs may also be deployed in a centralized manner. However, in a region with sparse traffic, a relatively large station spacing, and the like, such as a suburban county or a mountainous area, the DUs may be deployed in a distributed manner.

Further, the CU may further include a centralized unit-control plane (that is, a centralized unit-control plane CU-CP network element) and a centralized unit-user plane (that is, a centralized unit-user plane CU-UP network element). The CU-CP and the CU-UP may also be separately deployed on different physical devices, the CU-CP is responsible for control plane processing at the RRC layer and the PDCP layer, and the CU-UP is responsible for user plane processing at the SDAP layer and the PDCP layer. One gNB may include one CU-CP, one or more CU-UPs, and one or more DUs. One CP-UP is connected to one CU-CP through a control plane interface (for example, E1), to transmit control plane data. One DU is connected to one CU-CP through a control plane interface (for example, F1-C), to transmit control plane data. Under control of the CU-CP, one DU may be connected to one or more CU-UPs, one CU-UP may also be connected to one or more DUs, and the CU-UP is connected to the DU through a user plane interface (for example, F1-U), to transmit user plane data. It should be noted that, to maintain network elasticity, one DU or one CU-UP may also be connected to a plurality of CU-CPs. In this case, the plurality of CU-CPs serve as backups for each other. In actual application, only one CU-CP may be running at a same moment. For a RAN device architecture including a CU and a DU, the foregoing protocol stack division manner is merely an example. The RAN device may alternatively be divided into the CU and the DU in another division manner. For example, the CU may be responsible for operations at an RRC layer, an SDAP layer, a PDCP layer, and an RLC layer, and the DU is responsible for operations at a MAC layer and a PHY layer. Alternatively, the CU is responsible for operations at an RRC layer and an SDAP layer, and the DU is responsible for operations at a PDCP layer, an RLC layer, a MAC layer, a PHY layer. Similarly, a division manner of a protocol stack between the CU-CP and the CU-UP in the CU is also variable. This is not specifically limited in this application.

The gNB may further include an active antenna unit (active antenna unit, AAU). The CU implements some functions of the gNB, and the DU implements some functions of the gNB. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that a network device may be a device including one or more of a CU node, a DU node, and an AAU node. In the embodiments of this application, the user equipment or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory. The operating system may be any one or more of computer operating systems implementing service processing through a process (process), for example, a Linux operating system, a Unix operating system, an Android operating system, an iOS operating system, and a Windows operating system. The application layer includes applications such as a browser, an address book, word processing software, and instant communications software. In addition, a specific structure of an execution body of a method according to the embodiments of this application is not specifically limited in the embodiments of this application, provided that a program that records code for the method in the embodiments of this application can be run to perform communication according to the method in the embodiments of this application. For example, the method in the embodiments of this application may be performed by user equipment or an access network device, or a functional module that is in user equipment or an access network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable storage media" may include but is not limited to a wireless channel, and various other media that can store, include, and/or carry instructions and/or data.

To facilitate understanding of the paging method provided in the embodiments of this application, the following briefly describes several basic concepts in the embodiments of this application.

1. Non-Public Network (Non-Public Networks, NPN)

The NPN is a network that is being discussed in the 3GPP standard. Different from a conventional cellular network, the NPN allows access of some users with specific permission. The NPN includes two network architectures. One network architecture is standalone (standalone, SA), and the other network architecture is non-standalone (non-standalone, NSA). The non-standalone NPN may also be referred to as a (public network integrated NPN, PNI-NPN). For ease of description, the standalone NPN is denoted as an SNPN below, and the non-standalone NPN is denoted as a PNI-NPN below. The following briefly describes a relationship and a difference between an NPN and a PLMN with reference to FIG. 3 and FIG. 4.

Figure 3:
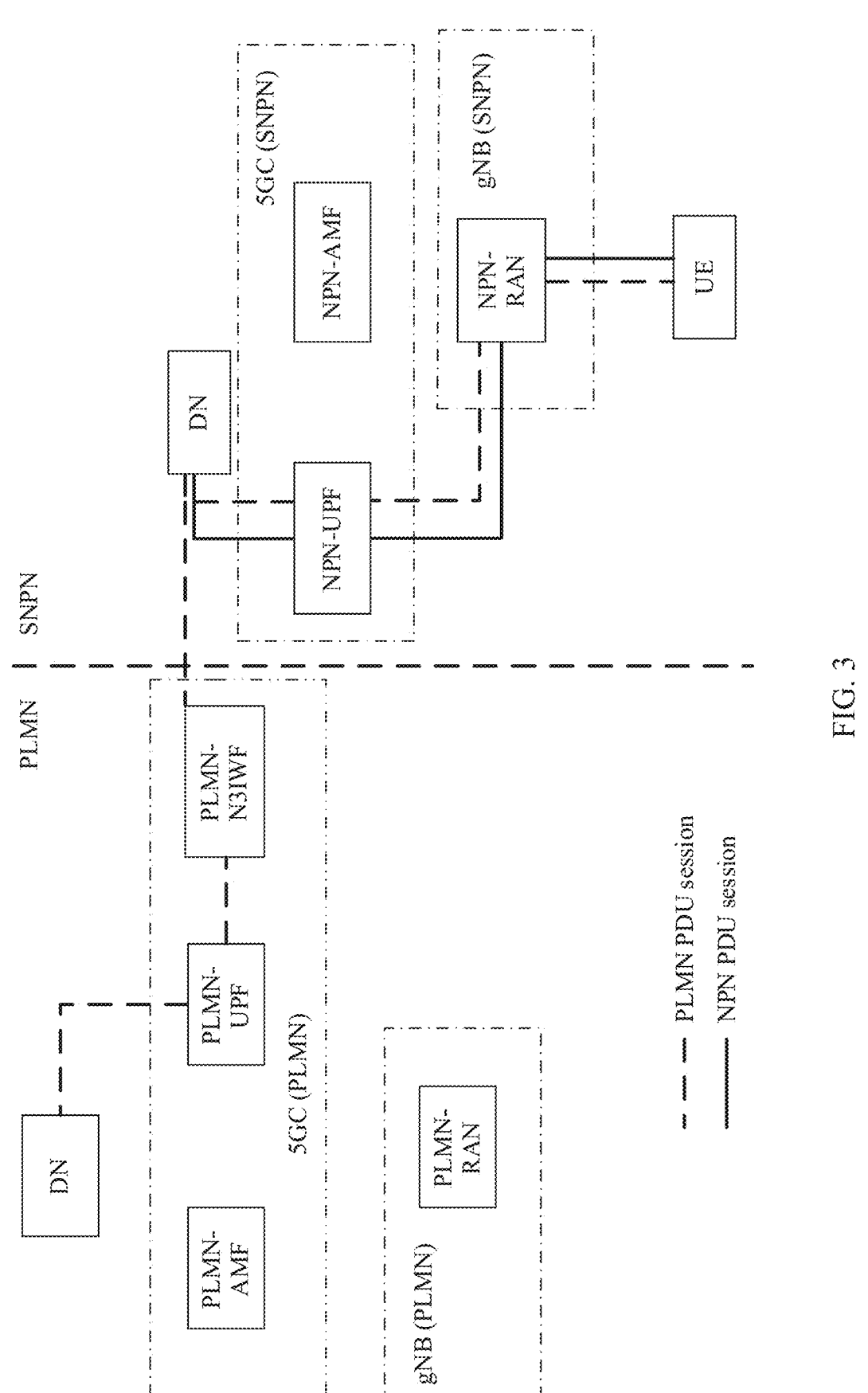
FIG. 3 is a schematic diagram of an SNPN and a PLMN according to an embodiment of this application.

FIG. 3 is a schematic diagram of an SNPN and a PLMN according to an embodiment of this application. The SNPN and the PLMN have independent RANs and core networks. The SNPN is considered as a non-3GPP network. The core networks of the SNPN and the PLMN are connected by using a non-3GPP interworking function (non-3GPP interworking function, N3IWF) network element. Interaction between a user plane and a control plane can be implemented by using the N3IWF network element. An SNPN is jointly identified by using a NID and a PLMN ID. A cell in the SNPN may be jointly identified by using a cell ID, a PLMN ID, and a NID. For example, a first cell (whose cell ID is the first cell) may access both a first network and a second network (whose PLMN IDs are a first PLMN and a second PLMN respectively), and when a first standalone non-public network (whose NID is a first NID) is arranged in the first network and user equipment needs to access the first standalone non-public network, identifiers that need to be included include the first cell, the first PLMN, and the first NID.

It can be learned from FIG. 3 that PLMN PDU session resources of the UE are carried on the UE, an NPN-RAN, an NPN-UPF, a DN, a PLMN-N3IWF, a PLMN-UPF, and a DN. It can be learned from FIG. 3 that NPN PDU session resources of the UE are carried on the UE, the NPN-RAN, the NPN-UPF, and the DN. In this application, "session resources are carried on" some devices or network elements may be understood as that the "session resources" are provided by these devices or network elements. 5GC in the figure represents a 5G core network device.

Figure 4:
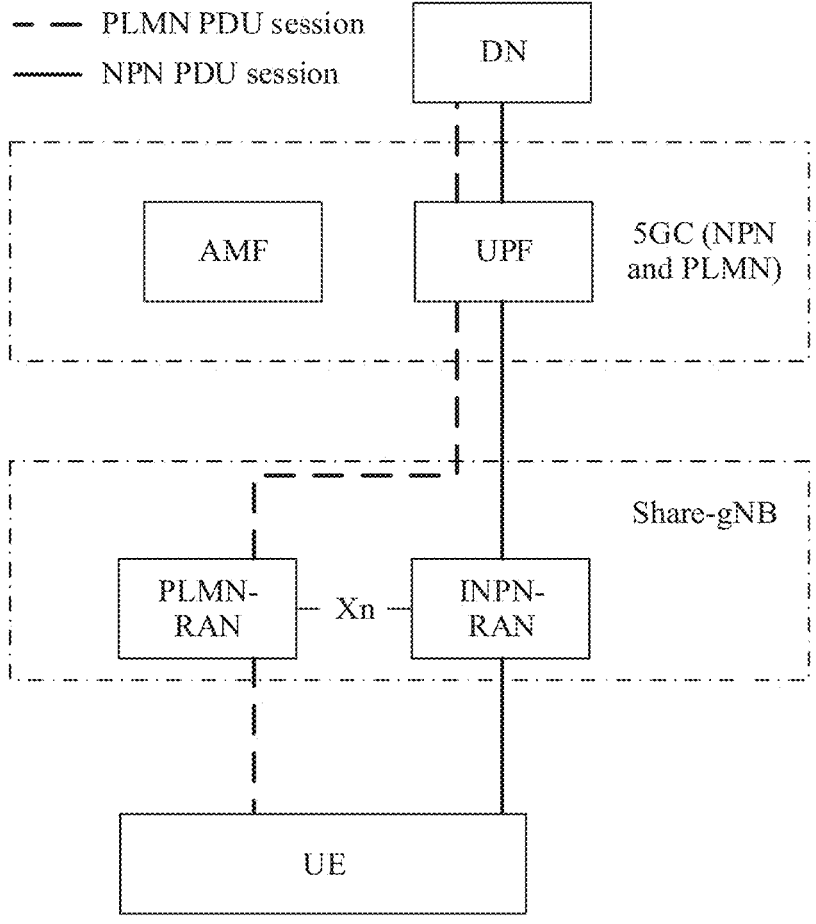
FIG. 4 is a schematic diagram of a PNI-NPN and a PLMN according to an embodiment of this application.

FIG. 4 is a schematic diagram of a PNI-NPN and a PLMN according to an embodiment of this application. The PNI-NPN and the PLMN share a core network or an access network. A user, in the PNI-NPN, who is authorized to access the PNI-NPN is referred to as a user belonging to a CAG, and a cell in the PNI-NPN may be jointly identified by using a PLMN ID, a CAG ID, and a cell ID. As shown in FIG. 4, the PLMN and the PNI-NPN share a core network (an AMF or a UPF), and are deployed with a PLMN-RAN and a PNI-NPN-RAN respectively. An Xn interface may exist between different RANs.

It can be learned from FIG. 4 that PLMN PDU session resources of UE are carried on the UE, the PLMN-RAN, the UPF, and a DN. It can be learned from FIG. 4 that NPN PDU session resources of the UE are carried on the UE, the INPN-RAN, the UPF, and the DN.

2. CAG

If a network device or a cell belongs to a PNI-NPN, the network device or the cell broadcasts a CAG identifier, and only a terminal device registered with the closed access group can access the network. In other words, only a terminal device registered with the closed access group can be served by the cell. Different CAGs correspond to different CAG identifiers (identify, ID).

3. Shared Access Network Device (Shared-RAN)

The shared-RAN means that a RAN may be configured with cells of different networks, and user equipment may access different networks (for example, networks with different PLMN IDs) over one RAN. The following briefly describes a relationship and a difference between an NPN and a PLMN in a shared-RAN scenario with reference to FIG. 5 and FIG. 6A and FIG. 6B.

Figure 5:
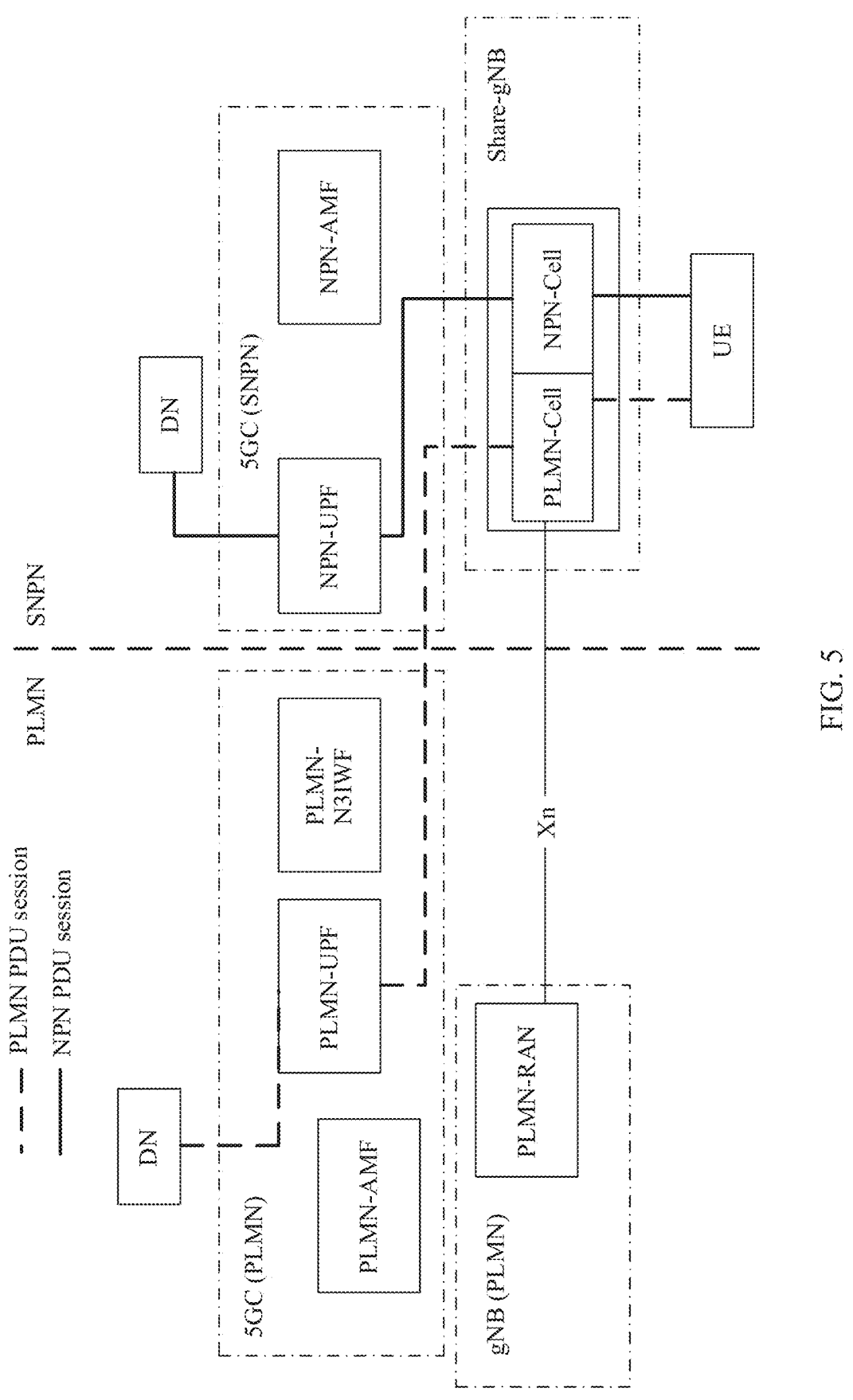
FIG. 5 is a schematic diagram of an SNPN and a PLMN in a shared-RAN scenario according to an embodiment of this application.

FIG. 5 is a schematic diagram of an SNPN and a PLMN in a shared-RAN scenario according to an embodiment of this application. In FIG. 5, an NPN-RAN is a shared-RAN, the shared-RAN is configured with a PLMN cell and an NPN cell, PLMN protocol data unit (protocol data unit, PDU) session (session) resources of user equipment may be directly set up over the shared-RAN, and the PLMN PDU session resources of the UE are carried on the UE, the shared-RAN, a PLMN UPF, and a DN. NPN PDU session resources of the UE are carried on the UE, the shared-RAN, an NPN UPF, and the DN. An Xn interface may exist between the shared-RAN and the PLMN-RAN.

Figures 6A, 6B:
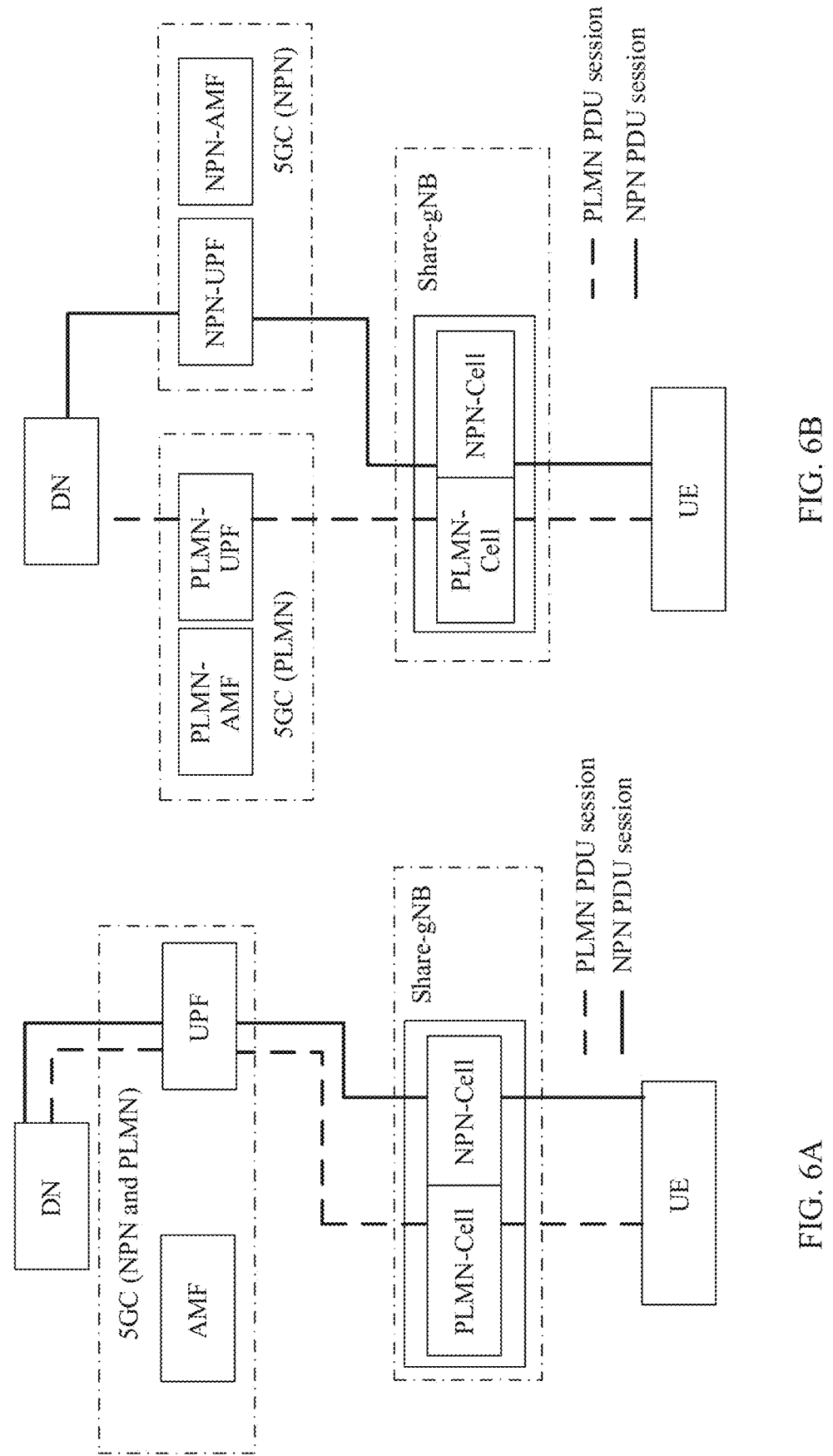
FIG. 6A and FIG. 6B are a schematic diagram of a PNI-NPN and a PLMN in a shared-RAN scenario according to an embodiment of this application.

FIG. 6A and FIG. 6B are a schematic diagram of a PNI-NPN and a PLMN in a shared-RAN scenario according to an embodiment of this application. In the shared-RAN scenario, by comparison with FIG. 5, the PNI-NPN and the PLMN in FIG. 6A share a core network and a RAN, and the PNI-NPN and the PLMN in FIG. 6B share a RAN, and are separately deployed with core networks. The shared-RAN is configured with a PLMN cell and a PNI-NPN cell. Specifically, it can be learned from FIG. 6A that the PNI-NPN and the PLMN share an AMF, a UPF, and a DN, and PLMN PDU session resources and NPN PDU session resources of UE are carried on the UE, the shared-RAN, the UPF, and the DN. It can be learned from FIG. 6B that the PNI-NPN and the PLMN share a RAN and a DN, but the PNI-NPN and the PLMN have respective AMFs and UPFs; and PLMN PDU session resources of UE are carried on the UE, the shared-RAN, a PLMN UPF, and the DN, and NPN PDU session resources of the UE are carried on the UE, the shared-RAN, an NPN UPF, and the DN.

Figure 7:
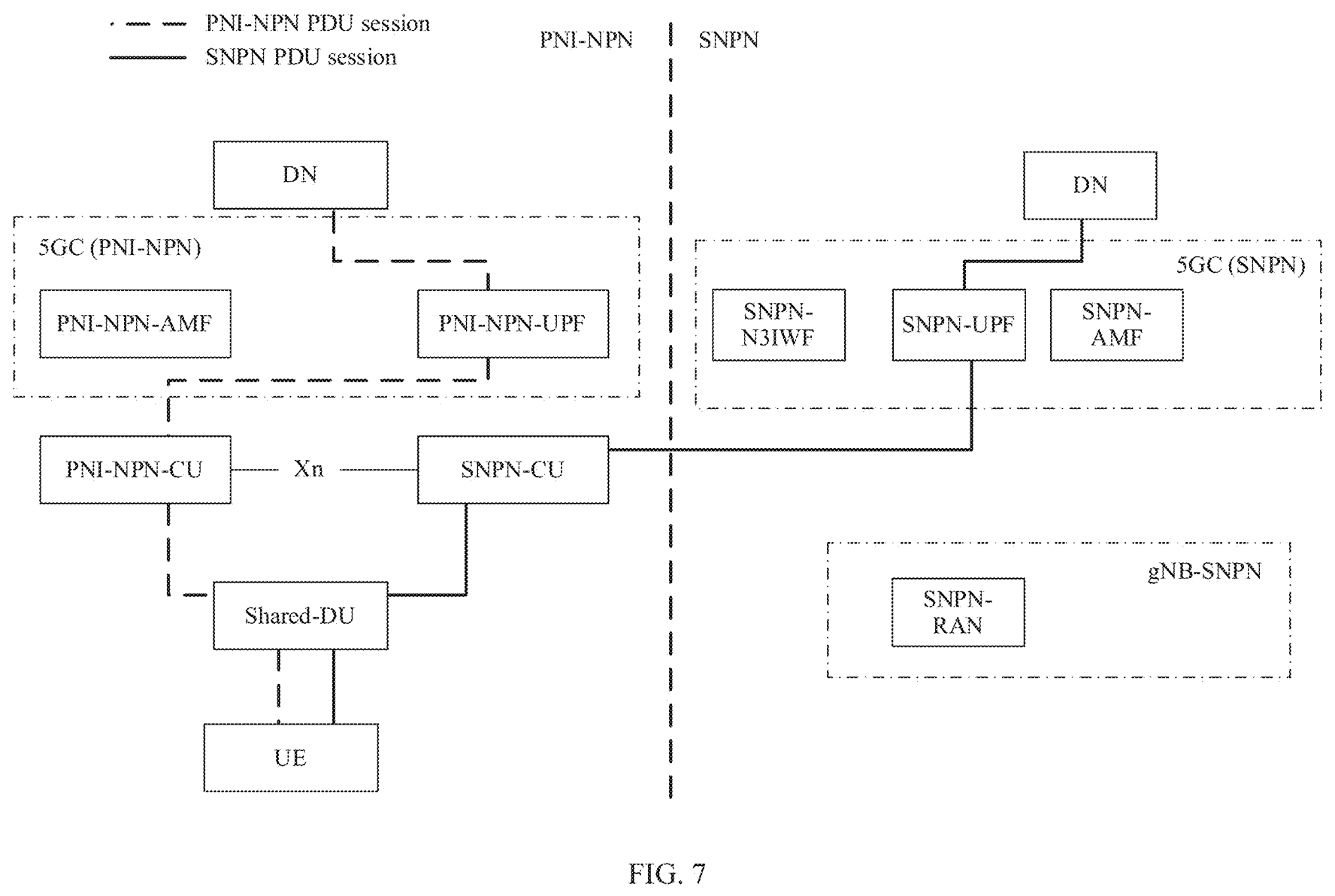

Further, the shared-RAN is also applicable to the CU-DU shown in FIG. 2. FIG. 7 is a schematic diagram of a PNI-NPN and an SNPN in a shared-RAN scenario according to an embodiment of this application, with the PNI-NPN and the SNPN used as an example in a CU-DU architecture. As shown in FIG. 7, the PLMN and the SNPN are connected to respective CUs, a PNI-NPN-CU and an SNPN-CU share a shared-DU, and an Xn interface may exist between the PNI-NPN-CU and the SNPN-CU. Similarly, there may be a similar derived scenario for a PNI-NPN and an SNPN, a PNI-NPN and a PLMN, and a shared-CU. Details are not described again.

4. Paging (Paging)

The paging includes core network paging (CN paging) and RAN paging (RAN paging).

When data of user equipment in registration management-registered (registration management registered, RM-Registered) mode and in RRC-idle (idle) mode arrives at a UPF, the UPF triggers an SMF and an AMF to initiate CN paging, and the AMF sends paging information to a RAN. The paging information includes information such as a PLMN ID to be paged, a tracking area code (tracking area code, TAC), a cell ID, an identifier of the user equipment (for example, a 5G S-temporary mobile subscriber identity (5G S-temporary mobile subscriber identity, 5G-S-TMSI) of the user equipment), and a RAN node ID. After receiving the CN paging, the RAN initiates RAN paging and continues to page the user equipment in a corresponding cell over a Uu interface. Paging information over the Uu interface includes an identifier of the user equipment (5G-S-TMSI). After receiving the paging message, the user equipment in RRC-idle mode may initiate an RRC setup process to respond to the paging.

When data of user equipment in RM-registered mode and in RRC-inactive (inactive) mode arrives at a UPF, the UPF does not need to perform CN paging, but sends the data to a RAN, and the RAN triggers RAN paging to page the user equipment over a Uu interface. Paging information over the Uu interface includes information such as an identifier of the user equipment (5G-S-TMSI or I-RNTI). After receiving the paging information, the user equipment in RRC-inactive mode sends radio resource control resume request (RRC resume request) information in a cell in which the paged user equipment is located, to respond to the paging.

The embodiments of this application are applicable to the paging of the user equipment in RM-registered mode and in RRC-idle mode, and is also applicable to the paging of the user equipment in RM-registered mode and in RRC-inactive mode.

In addition, to facilitate understanding of the embodiments of this application, the following several descriptions are provided.

First, in this application, "used to indicate" may include "used to directly indicate" and "used to indirectly indicate". When indication information is described as being used to indicate A, the indication information may be used to directly indicate A or used to indirectly indicate A, but it does not necessarily indicate that the indication information includes A.

Information used for indication may be referred to as to-be-indicated information. In a specific implementation process, the to-be-indicated information may be indicated in a plurality of manners. For example, the to-be-indicated information may be directly indicated, for example, the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of all pieces of information that is pre-agreed on (for example, specified in a protocol), to reduce indication overheads to some extent. In addition, a common part of all pieces of information may be further identified and indicated in a unified manner, to reduce indication overheads caused by separately indicating same information. When a plurality of pieces of information of a same type need to be indicated, indication manners of different pieces of information may be different. In a specific implementation process, a required indication manner may be selected according to a specific requirement. The selected indication manner is not limited in the embodiments of this application. In this way, the indication manner involved in the embodiments of this application should be understood as covering various methods that can enable a to-be-indicated party to learn of the to-be-indicated information.

The to-be-indicated information may be sent as a whole, or may be divided into a plurality of pieces of sub-information for separate sending. In addition, sending periods and/or sending occasions of the sub-information may be the same or may be different. A specific sending method is not limited in this application. The sending periods and/or the sending occasions of the sub-information may be predefined, for example, predefined according to a protocol, or may be configured by a transmit end device by sending configuration information to a receive end device. For example, the configuration information may include but is not limited to one or a combination of at least two of radio resource control signaling, MAC layer signaling, and physical layer signaling. The radio resource control signaling includes, for example, RRC signaling. The MAC layer signaling includes, for example, a MAC control element (control element, CE). The physical layer signaling includes, for example, downlink control information (downlink control information, DCI).

Second, "first", "second", and various serial numbers in the following embodiments are merely used for differentiation for ease of description, but are not intended to limit the scope of the embodiments of this application. For example, different preset correspondences are distinguished between each other.

Third, in the following embodiments, "preset" may include "indicated by a network device by using signaling or "predefined", for example, "defined in a protocol". Herein, "predefined" may be implemented in a manner in which corresponding code, a table, or other related indication information is prestored in a device (for example, including user equipment and a network device). A specific implementation is not limited in this application.

Fourth, "storage" in the embodiments of this application may be storage in one or more memories. The one or more memories may be separately disposed, or may be integrated into an encoder, a decoder, a processor, or a communications apparatus. Alternatively, a part of the one or more memories may be separately disposed, and a part of the one or more memories are integrated into an encoder, a decoder, a processor, or a communications apparatus. A type of the memory may be a storage medium in any form, and this is not limited in this application.

Fifth, a "protocol" in the embodiments of this application may be a standard protocol in the communications field, for example, may include an LTE protocol, an NR protocol, and a related protocol applied to a future communications system. This is not limited in this application.

In the foregoing existing paging mechanism for the user equipment in RM-registered mode and in RRC-idle mode, after receiving a paging message, the user equipment responds to the paging message and accesses a corresponding cell, so that the user equipment changes to RRC-connected (connected) mode. Afterwards, the user equipment no longer listens to or receives paging information from another cell, but receives paging information only from the accessed cell. However, in a shared-RAN scenario, cells of different networks may be configured in a shared-RAN. When user equipment accesses a cell of a network in the shared-RAN and changes from RRC-idle mode to RRC-connected mode, if another network triggers the shared-RAN to page the user equipment in another corresponding cell, the user equipment does not listen to or receive paging of the another network, and the another network does not receive a paging response for long time. In addition, from a perspective of user equipment, when the user equipment registers with a plurality of networks, the user equipment needs to listen to paging of the plurality of networks before accessing a network, and consequently power consumption is high. From a perspective of a network, when different networks need to page user equipment, paging needs to be separately performed, and consequently power consumption is high.

To resolve the foregoing problem of paging the user equipment in the shared-RAN scenario, the embodiments of this application provide a paging method, to ensure normal paging in the shared-RAN scenario.

The paging method in the embodiments of this application is described in detail below with reference to the accompanying drawings.

The method in the embodiments of this application may be applied to different communications systems, for example, the communications system shown in FIG. 1 or FIG. 2. The communications system may include at least one network device and at least one user equipment. In addition, a specific structure of an execution body of the method in the embodiments of this application is not specifically limited in the following embodiments, provided that a program that records code for the method in the embodiments of this application can be run to perform communication according to the method in the embodiments of this application. For example, the method in the embodiments of this application may be performed by user equipment or a network device, or a functional module or a chip that is in the user equipment or the network device and that can invoke and execute the program.

Without loss of generality, interaction between the network device and the user equipment is used as an example below to describe in detail the paging method in the embodiments of this application.

Figure 8:
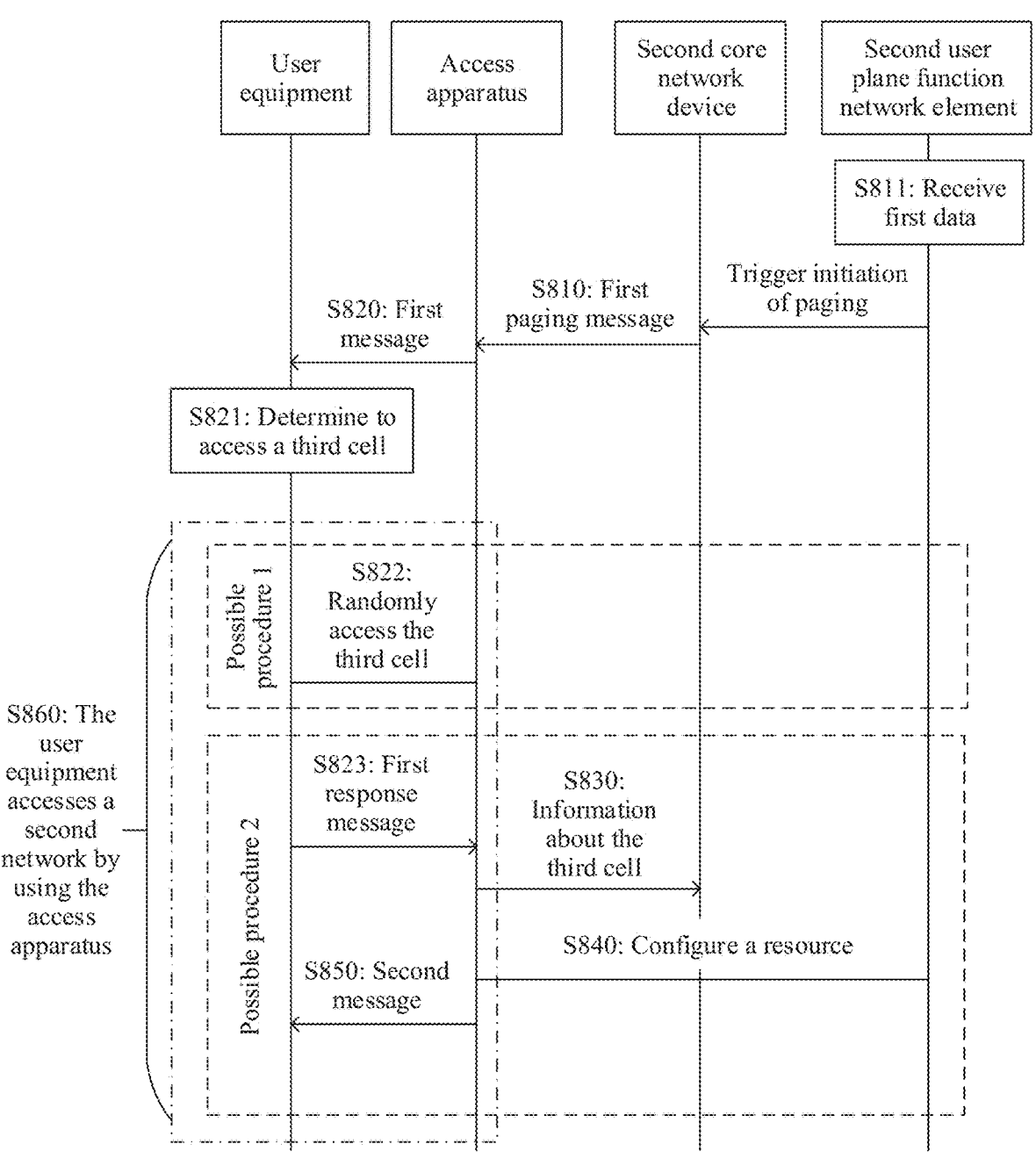
FIG. 8 is a schematic flowchart of a paging method according to an embodiment of this application.

FIG. 8 is a schematic flowchart of a paging method according to an embodiment of this application. This procedure is performed by a second user plane function network element, a second core network device, an access apparatus, and user equipment. To distinguish from the user equipment, the second user plane function network element, the second core network device, and the access apparatus may be collectively referred to as a network device.

The access apparatus in this embodiment of this application may be the foregoing shared-RAN, or another access device that can support access to a plurality of networks. A specific form of the access apparatus is not limited in this application.

The core network device in this embodiment of this application may be the access and mobility management function (access and mobility management function, AMF) shown in FIG. 1, or may be another core network device that can implement a function of the AMF in this embodiment of this application. This is not limited in this application.

The second user plane function network element in this embodiment of this application may be the UPF shown in FIG. 1, or may be another device that can implement a function of the UPF in this embodiment of this application. This is not limited in this application.

In this embodiment of this application, that the user equipment accesses a network or accesses a cell in the network may be understood as that the user equipment accesses a network or accesses a cell in the network by using the access apparatus.

In this embodiment, the user equipment is already in RRC-connected (RRC-connected) mode in a first network, but is in RRC-idle (RRC-idle) mode in a second network, and the user equipment needs to access a cell in the second network by using the access apparatus. When data of the second network arrives at the second user plane function network element at a moment, the second user plane function network element triggers the second core network device to perform paging.

The paging method includes the following steps.

S810: The second core network device sends a first paging message to the access apparatus. The access apparatus receives the first paging message from the second core network device.

When the first paging message is used by the second network to page the user equipment, the first paging message includes at least one of a second identifier of the user equipment, an identifier of the second network, or an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment.

Further, the second identifier of the user equipment that is included in the first paging message may be included in a second identifier list of the user equipment. For example, there may be a plurality of identifiers of the user equipment in the second network, and in the first paging message, the plurality of second identifiers of the user equipment may be used as the second identifier list of the user equipment and sent to the user equipment, to indicate that the second network is paging the user equipment.

Further, the identifier of the second network that is included in the first paging message may be included in an identifier list of the second network. For example, there may be a plurality of identifiers of the second network, and in the first paging message, the plurality of identifiers of the second network may be used as the identifier list of the second network and sent to the user equipment, to indicate that the second network is paging the user equipment.

Further, a plurality of cells in the second network may be accessed by the user equipment. To be specific, there may be a plurality of identifiers of the second cell in the first message, and in the first message, the plurality of identifiers of the second cell may be used as an identifier list of the second cell and sent to the user equipment, to indicate that the plurality of cells in the second network may be accessed by the user equipment.

In a possible implementation, when the second network is a standalone non-public network (SNPN), the identifier list of the second network includes a NID list and a PLMN ID list, or includes a PLMN ID list. For example, a PLMN ID is used to identify an SNPN, or a NID and a PLMN ID that are respectively included in the NID list and the PLMN ID list are used to indicate an SNPN to be accessed by the user equipment. For example, NIDs included in the NID list included in the first paging message are a first NID, a second NID, and a third NID, and PLMN IDs included in the PLMN ID list included in the first paging message are a first PLMN ID, a second PLMN ID, and a third PLMN ID. The first PLMN ID and the first NID are used to identify a first SNPN, the second PLMN ID and the second NID are used to identify a second SNPN, and the third PLMN ID and the third NID are used to identify a third NPN. In this case, it indicates that the user equipment may access one or more standalone non-public networks of the first SNPN, the second SNPN, and the third NPN. In this implementation, the first network accessed by the user equipment may be a PNI-NPN, a PLMN, or another SNPN.

In another possible implementation, when the second network is a public network integrated NPN (PNI-NPN), the identifier list of the second network includes a CAG ID list and a PLMN ID list, or includes a PLMN ID list. For example, a PLMN ID is used to identify a PNI-NPN, or a CAG ID and a PLMN ID that are respectively included in the CAG ID list and the PLMN ID list are used to indicate a PNI-NPN to be accessed by the user equipment. For example, CAG IDs included in the CAG ID list included in the first paging message are a first CAG ID, a CAG ID #2, and a third CAG ID, and PLMN IDs included in the PLMN ID list included in the first paging message are a first PLMN ID, a second PLMN ID, and a third PLMN ID. The first PLMN ID and the first CAG ID are used to identify a first PNI-NPN, the second PLMN ID and the second CAG ID are used to identify a second PNI-NPN, and the third PLMN ID and the third CAG ID are used to identify a third PNI-NPN. In this case, it indicates that the user equipment may access one or more public networks integrated NPN of the first PNI-NPN, the second PNI-NPN, and the third PNI-NPN. In this implementation, the first network accessed by the user equipment may be an SNPN, a PLMN, or another PNI-NPN.

In still another possible implementation, when the second network is a PLMN, the identifier list of the second network is a PLMN ID list, and a PLMN ID included in the PLMN ID list is used to indicate a PLMN to be accessed by the user equipment. For example, PLMN IDs included in the PLMN ID list included in the first paging message are a first PLMN ID, a second PLMN ID, and a third PLMN ID. The first PLMN ID is used to identify a first PLMN, the second PLMN ID is used to identify a second PLMN, and the third PLMN ID is used to identify a third PLMN. In this case, it indicates that the user equipment may access one or more PLMNs of the first PLMN, the second PLMN, and the third PLMN. In this implementation, the first network accessed by the user equipment may be an SNPN, a PNI-NPN, or another PLMN.

Further, the second identifier list of the user equipment that is included in the first paging message may be used to notify the access apparatus that an object to be paged is the user equipment. For example, the first paging message includes at least one of a 5G-S-TMSI, a 5G globally unique temporary identity (5G globally unique temporary identity, 5G-GUTI), or an international mobile subscriber identity (international mobile subscriber identification number, IMSI) of the user equipment in the second network.

Further, the identifier list of the second cell that is included in the first paging message enables the access apparatus to notify the user equipment of a cell that is in the second network and that can be accessed. Further, the first paging message further includes a second cell identifier list (cell ID list), an access network device identifier list (RAN Node ID list), and a second tracking area code list (TAC list). A second cell identifier included in the second cell identifier list is used to indicate a cell that is in the second network and that is to be accessed by the user equipment, an access network device identifier included in the access network device identifier list is used to indicate an access network device through which the user equipment can access the cell, and a second TAC included in the second tracking area code list is used to indicate a tracking area (tracking area, TA) to which the cell to be accessed by the user equipment belongs.

Optionally, the first paging message may further include a second cause (cause) value, and the second cause value is used to indicate a reason why the second network pages the user equipment. That is, when the first paging message includes the second cause value, the user equipment can learn of, based on the second cause value, the reason why the second network initiates the paging. The second cause value may assist the user equipment in quickly locating a reason why a paging message is initiated, and identifying a paging scenario, so that the user equipment can quickly make an appropriate policy and action subsequently.

Optionally, the first paging message may further include second duration (timer), and the second duration is used to identify that the user equipment needs to access a cell in the second network within the second duration. That is, when the first paging message includes the second duration, the user equipment can learn of, based on the second duration, a time in which the second network expects the user equipment to respond to the paging. The second duration provides a time threshold reference value for a network and a terminal side to access a network. For example, if a terminal device is receiving a service of another network when receiving a paging message, the terminal device may continue to receive the service of the another network within a time threshold, and access a paging network when the time threshold is approaching, to ensure continuity of a user service.

The second cause value includes the following possible forms:

In a possible implementation, if the second network is an SNPN, and the first network is a PNI-NPN, a PLMN, or another SNPN, the second cause value may be an SNPN character, indicating that paging is initiated because of an SNPN service.

In another possible implementation, if the second network is a PNI-NPN, and the first network is an SNPN, a PLMN, or another PNI-NPN, the second cause value may be a PNI-NPN character, indicating that paging is initiated because of a PNI-NPN service.

In still another possible implementation, if the second network is a PLMN, and the first network is an SNPN, a PNI-NPN, or another PLMN, the second cause value may be a PLMN character, indicating that paging is initiated because of a PLMN service.

In still another possible implementation, if the second network is an SNPN, and the first network is a PNI-NPN, a PLMN, or another SNPN, the second cause value may be characters PNI-NPN to SNPN (PNI-NPN to SNPN), PLMN to SNPN (PLMN to SNPN), or SNPN to SNPN (SNPN to SNPN), indicating that the user equipment previously accesses the PNI-NPN, the PLMN, or the another SNPN, and then the user equipment moves from the PNI-NPN, the PLMN, or the another SNPN to the SNPN, and indicating that paging is initiated to the user equipment because of a service of the PNI-NPN, the PLMN, or the another SNPN.

In still another possible implementation, if the second network is a PNI-NPN, a PLMN, or another SNPN, and the first network is an SNPN, the second cause value may be characters SNPN to PNI-NPN (SNPN to PNI-NPN), SNPN to PLMN (SNPN to PLMN), or SNPN to SNPN (SNPN to SNPN), indicating that the user equipment previously accesses the SNPN, and then the user equipment moves from the SNPN to the PNI-NPN, the PLMN, or the another SNPN, and indicating that paging is initiated to the user equipment because of a service of the SNPN.

In still another possible implementation, if the second network is an SNPN, and the first network is a PNI-NPN, a PLMN, or another SNPN, the second cause value may be characters PNI-NPN to SNPN (PNI-NPN to SNPN), PLMN to SNPN (PLMN to SNPN), or SNPN to SNPN (SNPN to SNPN), indicating that the user equipment previously accesses the PNI-NPN or the PLMN and establishes a PDU session resource in the SNPN over the PNI-NPN or the PLMN, and then the user equipment moves from the PNI-NPN, the PLMN, or the another SNPN to the SNPN, and indicating that the SNPN initiates paging to the user equipment in the local network because of a service of the local network.

In still another possible implementation, if the second network is a PNI-NPN or a PLMN, and the first network is an SNPN, the second cause value may be characters SNPN to PNI-NPN (SNPN to PNI-NPN), SNPN to PLMN (SNPN to PLMN), or SNPN to SNPN (SNPN to SNPN), indicating that the user equipment previously accesses the SNPN and establishes a PDU session resource in the PNI-NPN or the PLMN over the SNPN, and then the user equipment moves from the SNPN to the PNI-NPN, the PLMN, or the another SNPN, and indicating that the PNI-NPN, the PLMN, or the another SNPN initiates paging to the user equipment in the local network because of a service of the local network.

The foregoing possible cases are merely used as examples to describe possible forms of the second cause value, and do not constitute any limitation on the protection scope of this application. Other possible forms of the second cause value are not described in this application.

Further, a reason why the second core network device sends the first paging message to the access apparatus may be that the second user plane function network element receives data of the user equipment, that is, the method procedure shown in FIG. 8 further includes S811: The second user plane function network element receives first data, where the first data is data that needs to be sent by the second network to the user equipment.

Further, in this embodiment of this application, the user equipment is in RRC-connected mode in a cell in the first network. After receiving the first paging message, the access apparatus determines that the user equipment that the second network needs to page has accessed the cell that is in the first network and that is configured by the access apparatus, that is, the method procedure shown in FIG. 8 further includes S820: The access apparatus sends a first message to the user equipment. The user equipment receives the first message from the access apparatus.

In a possible implementation, the first message is a radio resource control reconfiguration (radio resource control reconfiguration, RRC reconfiguration) message.

In another possible implementation, the first message is a radio resource control setup (radio resource control setup, RRC setup) message.

In another possible implementation, the first message is a paging (paging) message.

A specific form of the first paging message is not limited in this embodiment of this application. The first paging message may be any existing signaling used by the second core network device to page the user equipment, or any newly added signaling used to page the user equipment between the user equipment and the second core network device, or any existing signaling between the second core network device and the access apparatus.

When the first message is used to indicate that the user equipment is paged by the second network, the first message includes at least one of the following parameters: a second identifier of the user equipment, an identifier of the second network, or an identifier of a second cell. The second identifier of the user equipment, the identifier of the second network, and the identifier of the second cell are similar to the second identifier of the user equipment, the identifier of the second network, and the identifier of the second cell that may be included in the first paging message, and details are not described herein again.

Optionally, the first message further includes a second cause value.

Optionally, the first message further includes second duration.

Optionally, the first message further includes a second access network device identifier list and a second tracking area code list.

In this embodiment, the user equipment has accessed the first network, and the user equipment receives the first message from the access apparatus by using a signaling radio bearer (SRB) in the first network. Alternatively, the user equipment receives the first message from the access apparatus by using paging information in the first network. The first message is used to indicate that the user equipment is paged by the second network. For example, the user equipment receives the first message from the access apparatus by using an RRC message in the first network.

S860: The user equipment accesses the second network by using the access apparatus. For example, the user equipment selects a third cell in the second network, and accesses the second network by accessing the third cell in the second network.

Optionally, the method procedure shown in FIG. 8 may further include S821: The user equipment determines the third cell that is in the second network and that is to be accessed.

Information included in the first message may be used to identify a plurality of different cells in the second network, and the user equipment may select, from the plurality of different cells, the third cell that is in the second network and that is to be accessed. Alternatively, the user equipment learns of the paging of the second network based only on the first message, and does not select a cell corresponding to a cell identifier provided in the first message to access, but selects the third cell that is not identified in the first message to access, and determines a network identifier, a cell identifier, an access network device identifier, or a tracking area code that corresponds to the third cell. A policy for determining to access the third cell by the user equipment is not limited in this embodiment of this application. The user equipment may randomly select the third cell from cells that can be accessed, or may select an appropriate cell to access according to a preset policy.

Specifically, after the user equipment accesses the second network and determines to access the third cell in the second network, the user equipment may execute the following two possible procedures:

Possible Procedure 1:

In a possible implementation, the user equipment selects the third cell in the second network to initiate a random access procedure, and S860 may specifically include S822: The user equipment randomly accesses the third cell by using the access apparatus. After accessing the third cell, the user equipment configures a resource for data transmission in the third cell.

Optionally, in the possible procedure 1, radio resource control setup complete (RRC setup complete) signaling in the random access procedure of the user equipment needs to include an identifier of an NPN selected by the user equipment, and the identifier of the NPN needs to be reported to the access apparatus. For example, for an SNPN, a selected (selected) PLMN ID and a selected NID need to be included, and for a PNI-NPN, a selected (selected) PLMN ID and a selected CAG ID need to be included. After the user equipment completes random access, the access apparatus needs to notify the core network device of information about a network selected by the user equipment. For example, the access device reports, to the core network device by using initial UE message (initial UE message) signaling, the network to be accessed by the user equipment. The initial UE message signaling includes an identifier of an NPN selected by the user, and the identifier of the NPN is reported to the access device. For example, for an SNPN, a selected (selected) PLMN ID and a selected NID need to be included, and for a PNI-NPN, a selected (selected) PLMN ID and a selected CAG ID need to be included.

Possible Procedure 2:

In another possible implementation, the user equipment notifies the access apparatus of information about the third cell that is in the second network and that is to be accessed by the user equipment, and the access apparatus may assist the user equipment in accessing the third cell.

For example, the user equipment sends a first response message to the access apparatus, and the first response message may be considered as a response to the first message. The first response message includes the information about the third cell, and the third cell is a cell that is in the second network and that the user equipment determines to access. S860 may specifically include S823: The user equipment sends the first response message to the access apparatus. The access apparatus receives the first response message from the user equipment. For an NPN, the first response message includes an identifier of the NPN. For example, for an SNPN, a selected (selected) PLMN ID and a selected NID need to be included, and for a PNI-NPN, a selected (selected) PLMN ID and a selected CAG ID need to be included.

In a possible implementation, the first response message is a radio resource control reconfiguration complete (radio resource control reconfiguration complete, RRC reconfiguration complete) message.

In another possible implementation, the first response message is a radio resource control setup complete (radio resource control setup complete, RRC setup complete) message.

In another possible implementation, the first response message is an uplink information transfer (uplink information transfer) message.

In another possible implementation, the first response message is a radio resource control setup response (radio resource control setup request, RRC setup request) message.

In another possible implementation, the first response message is a message1 (message1, MSG1) message in a random access procedure.

In another possible implementation, the first response message is medium access control (medium access control, MAC) layer signaling, for example, a MAC control element (control element, CE).

In another possible implementation, the first response message is physical layer signaling, for example, uplink control information (uplink control information, UCI).

Optionally, when the first message is an RRC reconfiguration message, the first response message may be an RRC reconfiguration complete message. Optionally, when the first message is an RRC setup message, the first response message may be an RRC setup complete message.

A specific form of the first response message is not limited in this embodiment of this application. The first response message may be any existing signaling used to transmit the information about the third cell between the user equipment and the access apparatus, or any newly added signaling used to transmit the information about the third cell between the user equipment and the access apparatus, or any existing signaling between the user equipment and the access apparatus.

In the possible procedure 2, to complete the paging procedure, the paging method shown in FIG. 8 further includes the following step:

S830: The access apparatus sends the information about the third cell to the second core network device. The second core network device receives the information about the third cell from the access apparatus.

The information about the third cell is used to notify the second core network device that the user equipment that needs to be paged has been found, and the information about the third cell includes a cell identifier of the third cell, and a network identifier, an access network device identifier, or a tracking area code corresponding to the third cell.

In a possible implementation, the information about the third cell may be included in an initial UE message (initial UE message), and the initial UE message is used to notify the second core network device that the user equipment that needs to be paged has been found. For an NPN, the initial UE message includes an identifier of the NPN.

A manner for transmitting the information about the third cell between the second core network device and the access apparatus is not limited in this embodiment of this application. The manner may be reusing existing signaling, or adding the information about the third cell to existing signaling, or newly adding signaling used to transmit the information about the third cell between the second core network device and the access apparatus.

After the second core network device learns that the user equipment is successfully found, the second user plane function network element in the first network needs to configure a session resource for the user equipment, that is, the method procedure shown in FIG. 8 further includes S840: The access apparatus and the second user plane function network element each configure a resource for the user equipment.

Specifically, after the access apparatus and a first user plane function network element each configure a session resource for the user equipment, the user equipment and the access apparatus each configure, by using a signaling radio bearer in a cell that has been accessed by the user equipment, a resource and/or a parameter that are/is required by the third cell to be accessed by the user equipment.

That is, the method procedure shown in FIG. 8 further includes S850: The access apparatus sends a second message to the user equipment over the first network. The user equipment receives the second message from the access apparatus. The second message includes at least one of the following parameters: a first parameter used to support the user equipment in randomly accessing the third cell, a second parameter indicating a resource in the third cell, a fourth parameter indicating context information of the user equipment in the second network, or a fifth parameter indicating security and integrity protection information of the user equipment in the second network.

Optionally, the second message may further include a third parameter indicating a resource in the first network that is configured by a cell in the first network and first indication information, and the first indication information is used to indicate that the resource in the first network that is configured by the cell in the first network carries the data of the second network.

When the second message includes the third parameter and the first indication information, the access apparatus may deliver the third parameter without receiving the third cell.

The third cell to be accessed by the user equipment may be a cell corresponding to the identifier of the second cell that is delivered by the access apparatus by using the first message, or may be a cell to be accessed by the user equipment other than a cell corresponding to the identifier of the second cell.

In a possible implementation, the third cell is a cell in an SNPN, and the information about the third cell includes a cell ID, a NID, a PLMN ID, or a TAC.

In another possible implementation, the third cell is a cell in a PNI-NPN, and the information about the third cell includes a cell ID, a CAG ID, a PLMN ID, or a TAC.

In still another possible implementation, the third cell is a cell in a PLMN, and the information about the third cell includes a cell ID, a PLMN ID, or a TAC.

Optionally, when the second message includes a first parameter used to support the user equipment in randomly accessing the third cell, the user equipment may randomly access the third cell based on the first parameter in the second message, without listening to and parsing related system information of the third cell, and perform random access after obtaining the first parameter used to support the user equipment in randomly accessing the third cell. For example, the first parameter may include preamble (preamble) information, and the user equipment may randomly access the third cell based on the preamble in a non-contention manner. In this case, to perform subsequent data transmission in the third cell, the user equipment further needs to configure a resource in the third cell by using the third cell. For a specific configuration manner, refer to a configuration of a transmission resource of the user equipment after random access in a current protocol. Details are not described in this application.

Optionally, when the second message includes a second parameter indicating a resource in the third cell, the user equipment may learn of, based on the second parameter, the resource that is in the third cell and that needs to be occupied when data transmission is performed in the third cell, and does not need to configure, in the third cell after randomly accessing the third cell, the resource required for data transmission.

Optionally, when the second message includes a third parameter indicating a resource in the first network that is configured by a cell in the first network, the user equipment may learn of, based on the third parameter, the resource that is in the first network and that needs to be occupied to transmit the data in the second network, and does not need to access the second network or configure a resource required for data transmission in the second network. For example, in a standalone non-public network scenario, when data of a PDU session in an SNPN (the second network) is transmitted by using an N3IWF over a PLMN (the first network), a PDU session resource of the UE in the SNPN is carried in a PDU session in the PLMN, that is, a corresponding DRB resource needs to be configured in a cell (a first cell) in the PLMN to transmit the data of the PDU session in the SNPN (the second network). Vice versa, when data of a PDU session in a PLMN (the second network) is transmitted by using an N3IWF over an SNPN (the first network), a PDU session resource of the UE in the PLMN is carried in a PDU session in the SNPN, that is, a corresponding DRB resource needs to be configured in a cell (a first cell) in the SNPN to transmit the data of the PDU session in the PLMN (the second network).

Optionally, when the second message includes a fourth parameter indicating context information of the user equipment in the second network, the user equipment may learn of the context information in the second network based on the fourth parameter, and does not need to obtain the context information of the user equipment in the second network from the third cell after randomly accessing the third cell.

Optionally, when the second message includes a fifth parameter indicating security and integrity protection information of the user equipment in the second network, the user equipment may learn of the security and integrity protection information in the second network based on the fifth parameter, and does not need to obtain the security and integrity protection information of the user equipment in the second network from the third cell after randomly accessing the third cell.

The fourth parameter and the fifth parameter may be configured by the second network. For example, the fourth parameter and the fifth parameter are configured by the third cell, the third cell transmits the configured parameters to the first network, and the first network transmits the configured parameters to the user equipment by using the first cell. Alternatively, the fourth parameter and the fifth parameter may be directly configured by the first network. For example, the fourth parameter and the fifth parameter are configured by the first cell, and the first cell sends an existing parameter indicating a UE context and an existing parameter indicating security and integrity protection information to the user equipment, that is, the second network reuses the parameter indicating a UE context and the parameter indicating security and integrity protection information in the first network.

The first parameter includes a parameter, such as a RACH, a PRACH, or a preamble, that indicates random access to the third cell in the second network.

The second parameter includes resources such as an SRB and a DRB in the third cell.

The third parameter includes resources such as an SRB and a DRB in the first network.

According to the paging method provided in this embodiment of this application, when the second message includes the second parameter, it indicates that, when the user equipment that has accessed the cell in the first network is paged by the second network, the resource in the third cell may be configured by the cell in the first network, or after the user equipment randomly accesses the third cell, the resource in the second cell is configured by the third cell.

The foregoing parameters that can be included in the second message are merely examples, and constitute no limitation on the protection scope of this application. For example, the second message may further include other related information of the user equipment in the second network. Examples are not described one by one herein.

In a possible implementation, the access apparatus provides, by using the first message, the user equipment with information required for accessing a cell, or notifies, by using the first message, the user equipment of a resource that is in the first network and that may be used to transmit the data of the second network.

For example, the first message includes at least one of the following parameters:

a sixth parameter used to support the user equipment in randomly accessing a second cell, a seventh parameter indicating a resource in the second cell, an eighth parameter indicating a resource in the first network, a ninth parameter indicating context information of the user equipment in the second network, or a tenth parameter indicating security and integrity protection information of the user equipment in the second network.

When the first message includes the eighth parameter, the first message further includes first indication information, and the first indication information is used to indicate that a resource in the first network that is configured by a cell in the first network carries a service of the second network.

Optionally, when the first message includes a sixth parameter used to support the user equipment in randomly accessing a second cell, the user equipment may randomly access a cell in the second network based on the sixth parameter in the first message. There may be a plurality of second cells that can be accessed by the user equipment and that are provided by the access apparatus, that is, the first message may include sixth parameters required for accessing the plurality of second cells. In this case, to perform subsequent data transmission in the second cell, the user equipment further needs to configure a resource in the second cell by using the second cell. For a specific configuration manner, refer to a configuration of a transmission resource of the user equipment after random access in a current protocol. Details are not described in this application.

For example, the first message includes a sixth parameter #1 used to support the user equipment in randomly accessing a second cell #1, a sixth parameter #2 used to support the user equipment in randomly accessing a second cell #2, and a sixth parameter #3 used to support the user equipment in randomly accessing a second cell #3. The user equipment may select to access the second cell #1, the second cell #2, or the second cell #3 based on the first message. After selecting to access the second cell #1, the user equipment may perform resource configuration by using the second cell #1, so that the user equipment can perform data transmission in the second cell #1. In this embodiment of this application, "#1", "#2", and "#3" are merely intended to distinguish between different objects, have similar functions to "first", "second", and "third", and do not constitute any limitation on the protection scope of this application.

Optionally, when the first message includes a seventh parameter indicating a resource in the second cell, the user equipment may learn of, based on the seventh parameter, the resource that is in the second cell and that needs to be occupied when data transmission is performed in the second cell, and does not need to configure, in the second cell after randomly accessing the second cell, the resource required for data transmission.

There may be a plurality of second cells that can be accessed by the user equipment and that are provided by the access apparatus, that is, the first message may include seventh parameters corresponding to the plurality of second cells.

Optionally, when the first message includes an eighth parameter indicating a resource in the first network that is configured by a cell in the first network, the user equipment may learn of, based on the eighth parameter, the resource that is in the first network and that needs to be occupied for data transmission, and does not need to access the second network or configure a resource required for data transmission in the second network.

Optionally, when the first message includes a ninth parameter indicating context information of the user equipment in the second network, the user equipment may learn of the context information in the second network based on the ninth parameter, and does not need to obtain the context information of the user equipment in the second network from the second cell after randomly accessing the second cell.

Optionally, when the first message includes a tenth parameter indicating security and integrity protection information of the user equipment in the second network, the user equipment may learn of the security and integrity protection information in the second network based on the fifth parameter, and does not need to obtain the security and integrity protection information of the user equipment in the second network from the second cell after randomly accessing the second cell.

The sixth parameter includes a parameter, such as a RACH, a PRACH, or a preamble, that indicates random access to the second cell in the second network.

The seventh parameter includes resources such as an SRB and a DRB in the second cell.

The eighth parameter includes resources such as an SRB and a DRB in the first network.

According to the paging method provided in this embodiment of this application, when the first message includes both the seventh parameter and the eighth parameter, it indicates that, when the user equipment that has accessed the cell in the first network is paged by the second cell in the second network, the resource in the second cell may be configured by the cell in the first network, or after the user equipment randomly accesses the second cell, the resource in the second cell is configured by the second cell.

In a possible implementation, the resource may be carried on a shared-RAN, a PLMN-UPF, a DN, an N3IWF, an NPN-UPF, or a DN. In this case, an internet protocol security (internet protocol security, IPsec) tunnel needs to be set up, and a PDU session resource in the second network is carried in a cell in the first network of the access apparatus.

In another possible implementation, the session resource may be carried on a shared-RAN, an NPN-UPF, or a DN. In this case, the session resource may be a dual-radio (dual radio) resource, and a PDU session resource in the second network, for example, a DRB resource in the second network, is configured in a cell in the second network of the access apparatus.

In this application, the user equipment may be user equipment connected to the access apparatus, may be user equipment in dual-radio (dual radio) mode, or may be user equipment with a plurality of SIM cards. The user equipment in dual-radio (dual radio) mode may have two Uu interfaces. One set of resources such as SRBs and DRBs may be configured on each Uu interface, that is, two sets of resources such as SRBs and DRBs may be configured for the user equipment. A Uu interface between the user equipment and the first network is a first Uu interface, and a Uu interface between the user equipment and the second network is a second Uu interface. According to the method in this application, the first Uu interface can assist the second Uu interface in paging the user equipment and assist the second Uu interface in configuring related SRB and DRB parameters. For the user equipment with a plurality of SIM cards, a UE identifier of the user equipment in the first network may be an identifier of a first SIM card, and a UE identifier of the user equipment in the second network may be an identifier of a second SIM card. In other words, in this application, the second SIM card can assist in paging the first SIM card and assist the first SIM card in configuring a related parameter, for example, when the first SIM card and the second SIM card in the user equipment share an antenna device.

In this embodiment of this application, the user equipment may first access a cell in a first network device. In this way, the access apparatus can send the first message to the user equipment in the first network by using the signaling radio bearer of the cell in the first network.

Specifically, in the embodiment shown in FIG. 8, a method for accessing the cell in the first network by the user equipment is not limited, for example, may be any one of the following methods:

(1) Before receiving the first paging message, the access apparatus receives a second paging message sent by a first core network device. The user equipment responds to the second paging message, and changes to RRC-connected mode in the first network.

(2) The access apparatus receives the first paging message and a second paging message at the same time, and the access apparatus first pages the user equipment in the cell in the first network according to a known paging policy. The user equipment responds to the second paging message, and changes to RRC-connected mode in the first network. This will be explained below with reference to FIG. 9.

(3) The access apparatus receives the first paging message and a second paging message at the same time, and the access apparatus pages the user equipment in the cell in the first network and the cell in the second network at the same time. The user equipment first responds to the second paging message, and changes to RRC-connected mode in the first network. This will be explained below with reference to FIG. 9 and FIG. 10.

(4) The access apparatus receives the first paging message and a second paging message at the same time, and the access apparatus first pages the user equipment in the cell in the second network according to a paging policy of the access apparatus, but does not find the user equipment. Therefore, the access apparatus pages the user equipment in the cell in the first network. The user equipment responds to the second paging message, and changes to RRC-connected mode in the first network. Then, the first network assists the user equipment in responding to the paging of the second network.

(5) The first paging message may be used by the first network and the second network to page the user equipment, and the user equipment first accesses the first network. This will be explained below with reference to FIG. 9 and FIG. 10.

In the method procedure shown in FIG. 8, the user equipment is in RRC-connected mode in a cell in the first network, and then responds to the paging of the second network with the assistance of the cell that is in the first network and that has been accessed, so that the user equipment can respond to paging of different networks.

Further, the user equipment may detect a paging message only in the third cell to be accessed by the user equipment, so that energy consumption of the user equipment can be reduced.

In the method procedure shown in FIG. 8, a network accessed by the user equipment assists another network in paging the user equipment, so that performance of paging the user equipment by a plurality of networks by using one shared-RAN can be improved.

In addition, the user equipment in dual-radio mode may have two Uu interfaces. Resources such as SRBs and DRBs may be configured on each Uu interface, that is, two sets of resources such as SRBs and DRBs may be configured for the user equipment. A Uu interface between the user equipment and the first network is a first Uu interface, and a Uu interface between the user equipment and the second network is a second Uu interface. According to the paging method provided in this embodiment of this application, the first Uu interface assists the second Uu interface in paging the user equipment and/or assists the second Uu interface in configuring related SRB and DRB parameters, so that the user equipment in a dual-radio mode scenario can respond to paging of different networks.

For the user equipment with a plurality of SIM cards, a first identifier of the user equipment in the first network may be an identifier of a first SIM card, and a second identifier of the user equipment in the second network may be an identifier of a second SIM card. According to the paging method provided in this embodiment of this application, the first SIM card assists in paging the second SIM card and/or assists the second SIM card in configuring a related parameter, so that the user equipment with a plurality of SIM cards can respond to different paging for different SIM cards.

Figure 9:
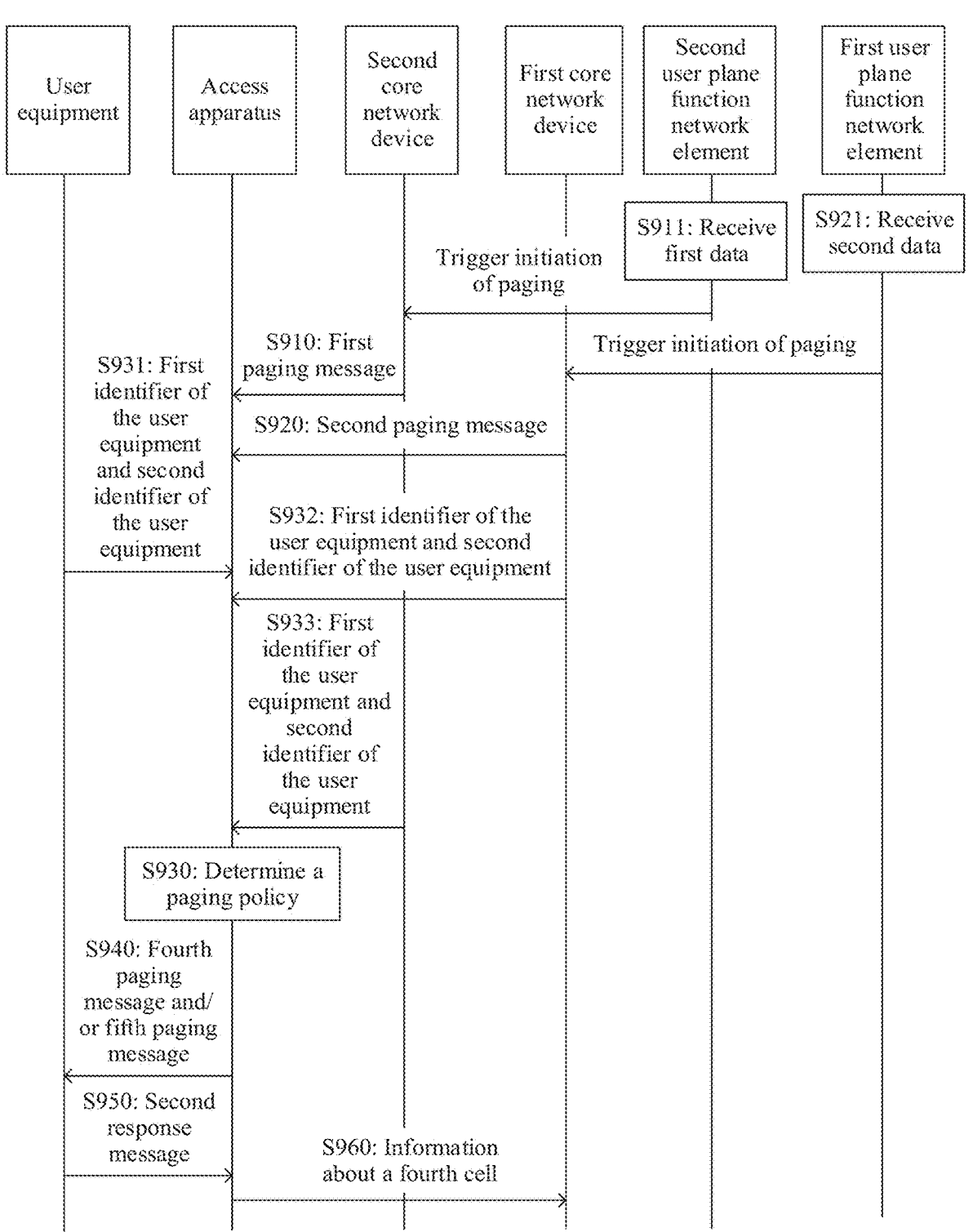
FIG. 9 is a schematic flowchart of another paging method according to an embodiment of this application.

With reference to FIG. 9, the following briefly describes a method for responding to paging of different networks by the user equipment when the access apparatus receives different paging messages and learns, based on identifiers of the user equipment that are included in the different paging messages, that the different paging messages are used to page the same user equipment.

FIG. 9 is a schematic flowchart of another paging method according to an embodiment of this application. This procedure is performed by a first user plane function network element, a first core network device, a second user plane function network element, a second core network device, an access apparatus, and user equipment. To distinguish from the user equipment, the first user plane function network element, the first core network device, and the access apparatus may be collectively referred to as a network device, and the second user plane function network element, the second core network device, and the access apparatus may also be collectively referred to as a network device.

The user equipment is in RRC-idle mode in two networks that can be accessed by the access apparatus. Data of the first network arrives at the first user plane function network element, and data of the second network arrives at the second user plane function network element. Specifically, the first user plane function network element and the second user plane function network element respectively trigger the first core network device and the second core network device to perform paging. After first receiving the paging of the first network, the user equipment accesses the first network and enters RRC-connected mode.

The paging method includes the following steps.

S910: The second core network device sends a first paging message to the access apparatus. The access apparatus receives the first paging message from the second core network device.

The first paging message includes at least one of a second identifier of the user equipment, an identifier of the second network, and an identifier of a second cell. The second identifier of the user equipment is used to indicate an identifier of the user equipment in the second network, the identifier of the second network is used to indicate the second network that the user equipment needs to access, and the identifier of the second cell is used to indicate a cell that is in the second network and that is to be accessed by the user equipment.

Specifically, the second identifier of the user equipment, the identifier of the second network, or the identifier of the second cell is similar to the second identifier of the user equipment, the identifier of the second network, or the identifier of the second cell that is included in the first paging message described above, and details are not described herein again.

Further, the first paging message may further include an access network device identifier list (RAN Node ID list) and a second tracking area code list (TAC list). The access network device identifier list and the second tracking area code list are similar to the access network device identifier list and the second tracking area code list described above, and details are not described herein again.

Optionally, the first paging message may further include the second cause value described above.

Optionally, the first paging message may further include the second duration described above.

S920: The first core network device sends a second paging message to the access apparatus. The access apparatus receives the second paging message from the first core network device.

The second paging message includes at least one of a first identifier list of the user equipment, an identifier list of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

Further, the first identifier of the user equipment that is included in the second paging message may be included in a first identifier list of the user equipment. For example, there may be a plurality of identifiers of the user equipment in the first network, and in the second paging message, the plurality of first identifiers of the user equipment may be used as the first identifier list of the user equipment and sent to the user equipment, to indicate that the first network is paging the user equipment.

Further, the identifier of the first network that is included in the second paging message may be included in an identifier list of the first network. For example, there may be a plurality of identifiers of the first network, and in the second paging message, the plurality of identifiers of the first network may be used as the identifier list of the first network and sent to the user equipment, to indicate that the first network is paging the user equipment.

Further, a plurality of cells in the first network may be accessed by the user equipment. To be specific, there may be a plurality of identifiers of the first cell in the first message, and in the first message, the plurality of identifiers of the first cell may be used as an identifier list of the first cell and sent to the user equipment, to indicate that the plurality of cells in the first network may be accessed by the user equipment.

In a possible implementation, when the first network is a standalone non-public network (SNPN), the identifier list of the first network includes a NID list and a PLMN ID list, or includes a PLMN ID list. For example, a PLMN ID is used to identify an SNPN, or a NID and a PLMN ID that are respectively included in the NID list and the PLMN ID list are used to indicate an SNPN to be accessed by the user equipment. For example, NIDs included in the NID list included in the second paging message are a first NID, a second NID, and a third NID, and PLMN IDs included in the PLMN ID list included in the second paging message are a first PLMN ID, a second PLMN ID, and a third PLMN ID. The first PLMN ID and the first NID are used to identify a first SNPN, the second PLMN ID and the second NID are used to identify a second SNPN, and the third PLMN ID and the third NID are used to identify a third NPN. In this case, it indicates that the user equipment may access one or more standalone non-public networks of the first SNPN, the second SNPN, and the third NPN.

In another possible implementation, when the first network is a public network integrated NPN (PNI-NPN), the identifier list of the first network includes a CAG ID list and a PLMN ID list, or includes a PLMN ID list. For example, a PLMN ID is used to identify an SNPN, or a CAG ID and a PLMN ID that are respectively included in the CAG ID list and the PLMN ID list are used to indicate a PNI-NPN to be accessed by the user equipment. For example, CAG IDs included in the CAG ID list included in the second paging message are a first CAG ID, a second CAG ID, and a third CAG ID, and PLMN IDs included in the PLMN ID list included in the second paging message are a first PLMN ID, a second PLMN ID, and a third PLMN ID. The first PLMN ID and the first CAG ID are used to identify a first PNI-NPN, the second PLMN ID and the second CAG ID are used to identify a second PNI-NPN, and the third PLMN ID and the third CAG ID are used to identify a third PNI-NPN. In this case, it indicates that the user equipment may access one or more public networks integrated NPN of the first PNI-NPN, the second PNI-NPN, and the third PNI-NPN.

In still another possible implementation, when the first network is a PLMN, the identifier list of the first network is a PLMN ID list, and a PLMN ID included in the PLMN ID list is used to indicate a PLMN to be accessed by the user equipment. For example, PLMN IDs included in the PLMN ID list included in the second paging message are a first PLMN ID, a second PLMN ID, and a third PLMN ID. The first PLMN ID is used to identify a first PLMN, the second PLMN ID is used to identify a first PLMN, and the third PLMN ID is used to identify a third PLMN. In this case, it indicates that the user equipment may access one or more PLMNs of the first PLMN, the second PLMN, and the third PLMN.

Further, the first identifier list of the user equipment that is included in the second paging message may be used to notify the access apparatus that an object to be paged is the user equipment. For example, the second paging message includes at least one of a 5G-S-TMSI, a 5G-GUTI, or an IMSI of the user equipment in the first network.

Further, the identifier list of the first cell that is included in the second paging message enables the access apparatus to notify the user equipment of a cell that is in the first network and that can be accessed. Further, the second paging message further includes at least one of a first cell identifier list (cell ID list), an access network device identifier list (RAN Node ID list), or a first tracking area code list (TAC list). A first cell identifier included in the first cell identifier list is used to indicate a cell that is in the first network and that is to be accessed by the user equipment, an access network device identifier included in the access network device identifier list is used to indicate an access network device through which the user equipment can access the cell, and a first TAC included in the first tracking area code list is used to indicate a TA to which the cell to be accessed by the user equipment belongs.

Optionally, the second paging message may further include a first cause (cause) value, and the first cause value is used to indicate a reason why the first network pages the user equipment. That is, when the second paging message includes the first cause value, the user equipment can learn of, based on the first cause value, the reason why the first network initiates the paging. The first cause value may assist the user equipment in quickly locating a reason why a paging message is initiated, and identifying a paging scenario, so that the user equipment can quickly make an appropriate policy and action subsequently.

Optionally, the second paging message may further include first duration, and the first duration is used to identify that the user equipment needs to access a cell in the first network within the first duration. That is, when the second paging message includes the first duration, the user equipment can learn of, based on the first duration, a time in which the first network expects the user equipment to respond to the paging. The first duration provides a time threshold reference value for a network and a terminal side to access a network. For example, if the terminal device is receiving a service of another network when receiving a paging message, the terminal device may continue to receive the service of the another network within a time threshold, and access a paging network when the time threshold is approaching, to ensure continuity of a user service.

The second cause value includes the following possible forms:

In a possible implementation, if the second network is an SNPN, and the first network is a PNI-NPN, a PLMN, or another SNPN, the first cause value may be a PNI-NPN character or a PLMN character, indicating that paging is initiated because of a PNI-NPN service 9% or a PLMN service.

In another possible implementation, if the second network is a PNI-NPN, and the first network is an SNPN, a PLMN, or another PNI-NPN, the first cause value may be an SNPN character or a PLMN character, indicating that paging is initiated because of an SNPN service or a PLMN service.

In still another possible implementation, if the second network is a PLMN, and the first network is an SNPN, a PNI-NPN, or another PLMN, the first cause value may be an SNPN character or a PNI-NPN character, indicating that paging is initiated because of an SNPN service or a PNI-NPN service.

In still another possible implementation, if the second network is an SNPN, and the first network is a PNI-NPN, a PLMN, or another SNPN, the first cause value may be characters SNPN to PNI-NPN (SNPN to PNI-NPN), SNPN to PLMN (SNPN to PLMN), or SNPN to SNPN (SNPN to SNPN), indicating that the user equipment previously accesses the SNPN, and then the user equipment moves from the SNPN to the PNI-NPN, the PLMN, or the another SNPN, and indicating that paging is initiated to the user equipment because of a service of the SNPN.

In still another possible implementation, if the second network is a PNI-NPN, a PLMN, or another SNPN, and the first network is an SNPN, the first cause value may be characters PNI-NPN to SNPN (PNI-NPN to SNPN), PLMN to SNPN (PLMN to SNPN), or SNPN to SNPN (SNPN to SNPN), indicating that the user equipment previously accesses the PNI-NPN, the PLMN, or the another SNPN, and then the user equipment moves from the PNI-NPN, the PLMN, or the another SNPN to the SNPN, and indicating that paging is initiated to the user equipment because of a service of the PNI-NPN, the PLMN, or the another SNPN.

In still another possible implementation, if the second network is an SNPN, and the first network is a PNI-NPN, a PLMN, or another SNPN, the first cause value may be characters SNPN to PNI-NPN (SNPN to PNI-NPN) or SNPN to PLMN (SNPN to PLMN), indicating that the user equipment previously accesses the SNPN and establishes a PDU session resource in the PNI-NPN, the PLMN, or the another SNPN over the SNPN, and then the user equipment moves from the SNPN to the PNI-NPN or the PLMN, and indicating that the PNI-NPN, the PLMN, or the another SNPN initiates paging to the user equipment in the local network because of a service of the local network.

In still another possible implementation, if the second network is a PNI-NPN or a PLMN, and the first network is an SNPN, the first cause value may be characters PNI-NPN to SNPN (PNI-NPN to SNPN), PLMN to SNPN (PLMN to SNPN), or SNPN to SNPN (SNPN to SNPN), indicating that the user equipment previously accesses the PNI-NPN or the PLMN and establishes a PDU session resource in the SNPN over the PNI-NPN or the PLMN, and then the user equipment moves from the PNI-NPN or the PLMN to the SNPN, and indicating that the SNPN initiates paging to the user equipment in the local network because of a service of the local network.

The foregoing possible cases are merely used as examples to describe possible forms of the first cause value, and do not constitute any limitation on the protection scope of this application. Other possible forms of the first cause value are not described in this application.

The first identifier of the user equipment and the second identifier of the user equipment may be different. However, in this embodiment, the access apparatus may determine, based on the first identifier of the user equipment and the second identifier of the user equipment, that both the first identifier and the second identifier identify the same user equipment.

In a possible implementation, the access apparatus receives the first identifier of the user equipment and the second identifier of the user equipment from the user equipment, that is, the method procedure shown in FIG. 9 further includes S931: The user equipment sends the first identifier of the user equipment and the second identifier of the user equipment to the access apparatus. The access apparatus receives the first identifier of the user equipment and the second identifier of the user equipment from the user equipment.

In another possible implementation, the access apparatus receives the first identifier of the user equipment and the second identifier of the user equipment from the first core network device, that is, the method procedure shown in FIG. 9 further includes S932: The first core network device sends the first identifier of the user equipment and the second identifier of the user equipment to the access apparatus. The access apparatus receives the first identifier of the user equipment and the second identifier of the user equipment from the first core network device.

In another possible implementation, the access apparatus receives the first identifier of the user equipment and the second identifier of the user equipment from the second core network device, that is, the method procedure shown in FIG. 9 further includes S933: The second core network device sends the first identifier of the user equipment and the second identifier of the user equipment to the access apparatus. The access apparatus receives the first identifier of the user equipment and the second identifier of the user equipment from the second core network device.

The first identifier of the user equipment is used to indicate a UE identifier of the user equipment in the first network, and the second identifier of the user equipment is used to indicate a UE identifier of the user equipment in the second network.

S931, S932, or S933 may be performed before S910 and S920, or S931, S932, or S933 may be performed after S910 and S920, or S931, S932, or S933 and S910 and S920 may be performed at the same time. In this embodiment, a sequence between S931, S932, or S933, and S910 and S920 is not limited.

A reason why the first core network device sends the second paging message to the access apparatus is that the second user plane function network element receives data of the user equipment, that is, the method procedure shown in FIG. 9 further includes S911: The second user plane function network element receives first data.

Likewise, a reason why the second core network device sends the first paging message to the access apparatus may be that the first user plane function network element receives data of the user equipment, that is, the method procedure shown in FIG. 9 further includes S921: The first user plane function network element receives second data.

When the first network and the second network share a core network, for example, when the first core network device and the second core network device are a same device, the first paging message and the second paging message are paging messages sent by the same core network device, and may be collectively referred to as a first paging message. The first paging message is used by the first network and the second network to page the user equipment. The first paging message includes at least one of a second identifier of the user equipment, an identifier of the second network, or an identifier of a second cell, and at least one of a first identifier of the user equipment, an identifier of the first network, or an identifier of a first cell.

Optionally, in this case, the first paging message may further include a first cause value and/or a second cause value.

Optionally, in this case, the second paging message may further include first duration and/or second duration.

The first core network device and the second core network device are a same core network device, and the first user plane function network element and the second user plane function network element are a same user plane function network element. In other words, the user plane function network element receives both the first data and the second data, and the first data and the second data belong to different networks.

Further, after receiving the first paging message and the second paging message, the access apparatus determines to page the user equipment in both a cell in the first network and a cell in the second network, or page the user equipment in a cell in the first network or the second network. That is, the method procedure shown in FIG. 9 further includes S930: The access apparatus determines a paging policy.

In a possible implementation, the access apparatus determines, based on information included in the received first paging message and information included in the received second paging message, to page the user equipment in both a cell in the first network and a cell in the second network that can be accessed by the access apparatus. Alternatively, in another possible implementation, the access apparatus pages the user equipment only in a cell in the first network or a cell in the second network based on information included in the received first paging message and information included in the received second paging message, and if the access apparatus does not find the user equipment, the access apparatus pages the user equipment in the cell in the other network. The access apparatus may determine a cell paging priority based on duration included in the first paging message and duration included in the second paging message, and shorter duration indicates a higher paging priority.

Optionally, the paging policy determined by the access apparatus may be determined by the access apparatus according to an operator policy, or may be determined by the access apparatus with the assistance of the first core network device and/or the second core network device side. For example, when the first core network device and/or the second core network device send/sends a paging message, the paging message includes indication information, where the indication information is used to notify the access apparatus to page the user equipment only in a cell in the first network or a cell in the second network, or page the user equipment in both a cell in the first network and in a cell in the second network. Alternatively, the paging message includes paging priorities of different networks.

When the access apparatus pages the user equipment in both the cell in the first network and the cell in the second network, the user equipment receives the paging of the cell in the second network. Alternatively, when the access apparatus pages the user equipment in both the cell in the first network and the cell in the second network, the user equipment first receives the paging of the cell in the first network. Alternatively, when the access apparatus pages the user equipment only in the cell in the first network, the user equipment receives the paging of the cell in the first network. Alternatively, when the access apparatus pages the user equipment only in the cell in the second network, the user equipment receives the paging of the cell in the second network. That is, the method procedure shown in FIG. 9 further includes S940: The user equipment receives a fourth paging message and/or a fifth paging message from the access apparatus. The access apparatus sends the fourth paging message and/or the fifth paging message to the user equipment.

Optionally, when the first network and the second network share a core network, for example, when the first core network device and the second core network device are a same device, the fourth paging message and the fifth paging message may be one paging message. For example, the fourth paging message and the fifth paging message are a first message sent by the access apparatus to the user equipment, and the first message is used to indicate the user equipment to access the first network and the second network. The first message includes at least one of a second identifier of the user equipment, an identifier of the second network, or an identifier of a second cell, and at least one of a first identifier of the user equipment, an identifier of the first network, or an identifier of a first cell.

Optionally, the first message further includes a first cause value and/or a second cause value.

Optionally, the first message further includes first duration and/or second duration.

Optionally, the fourth paging message and the fifth paging message are two paging messages. For example, if the access apparatus learns, based on the received second paging message, that a cell in the second network is paging the user equipment, the access apparatus sends the fourth paging message to the user equipment. In this case, the fourth paging message is similar to the first message. If the access apparatus learns, based on the received first paging message, that a cell in the first network is paging the user equipment, the access apparatus sends the fifth paging message to the user equipment. For ease of distinction, the fifth paging message may be referred to as a third message, and is used to indicate the user equipment to access the first network.

In a possible implementation, a paging message received by the user equipment is a fourth paging message sent by the access apparatus to the user equipment based on the first paging message. Information included in the fourth paging message is similar to the information included in the first paging message, and details are not described herein again.

In another possible implementation, a paging message received by the user equipment is a fifth paging message sent by the access apparatus to the user equipment based on the second paging message. Information included in the fifth paging message is similar to the information included in the second paging message, and details are not described herein again.

Further, the user equipment responds to the paging message and accesses a corresponding network.

For ease of description, in the following embodiment shown in FIG. 9, an example in which the user equipment determines to access the first network is used for description. In this case, the embodiment shown in FIG. 8 may be referenced. To be specific, after accessing the first network, the user equipment may further respond to the paging of the second network over the first network with reference to the method procedure shown in FIG. 8.

Specifically, after determining to access a fourth cell in the first network, the user equipment sends information about the fourth cell to the access apparatus. That is, the method procedure shown in FIG. 9 further includes S950: The user equipment sends a second response message to the access apparatus, and the access apparatus receives the second response message from the user equipment. The second response message includes the information about the fourth cell. For an NPN, the second response message includes an identifier of the NPN. For example, for an SNPN, a selected (selected) PLMN ID and a selected NID need to be included, and for a PNI-NPN, a selected (selected) PLMN ID and a selected CAG ID need to be included.

In a possible implementation, the second response message is an RRC setup complete message.

In another possible implementation, the second response message is an RRC reconfiguration complete message.

In another possible implementation, the second response message is an uplink information transfer message.

In another possible implementation, the second response message is an RRC setup request message.

In another possible implementation, the second response message is a MSG1 message in a random access procedure.

In another possible implementation, the second response message is MAC layer signaling, for example, a MAC CE.

In another possible implementation, the second response message is physical layer signaling, for example, UCI.

Optionally, when the third message is an RRC reconfiguration message, the second response message may be an RRC reconfiguration complete message. Optionally, when the third message is an RRC setup message, the second response message may be an RRC setup complete message.

Further, the paging method shown in FIG. 9 further includes the following step:

S960: The access apparatus sends the information about the fourth cell to the second first core network device. The second first core network device receives the information about the fourth cell from the access apparatus.

The information about the fourth cell is used to notify the second core network device that the user equipment that needs to be paged has been found, and the information about the fourth cell includes a cell identifier of the fourth cell, and a network identifier, an access network device identifier, or a tracking area code corresponding to the fourth cell.

In a possible implementation, the information about the fourth cell may be included in an initial UE message, and the initial UE message is used to notify the second core network device that the user equipment that needs to be paged has been found.

A manner for transmitting the information about the fourth cell between the second core network device and the access apparatus is not limited in this embodiment of this application. The manner may be reusing existing signaling, or adding the information about the fourth cell to existing signaling, or newly adding signaling used to transmit the information about the fourth cell between the second core network device and the access apparatus.

After learning that the user equipment is successfully found, the second core network device configures, for the user equipment according to an existing standard procedure, a bearer resource for accessing the fourth cell. Details are not described herein.

Further, after the user equipment is in RRC-connected mode in the first network, for processing of the paging of the second network, refer to the method procedure shown in FIG. 8. By using an established SRB of the first network, the access apparatus assists, by using an RRC message, the second network in continuing to page the user equipment, and pre-configuring an SRB, a DRB, and a PDU session resource for the user equipment. Details are not described in detail herein.

Figure 10:
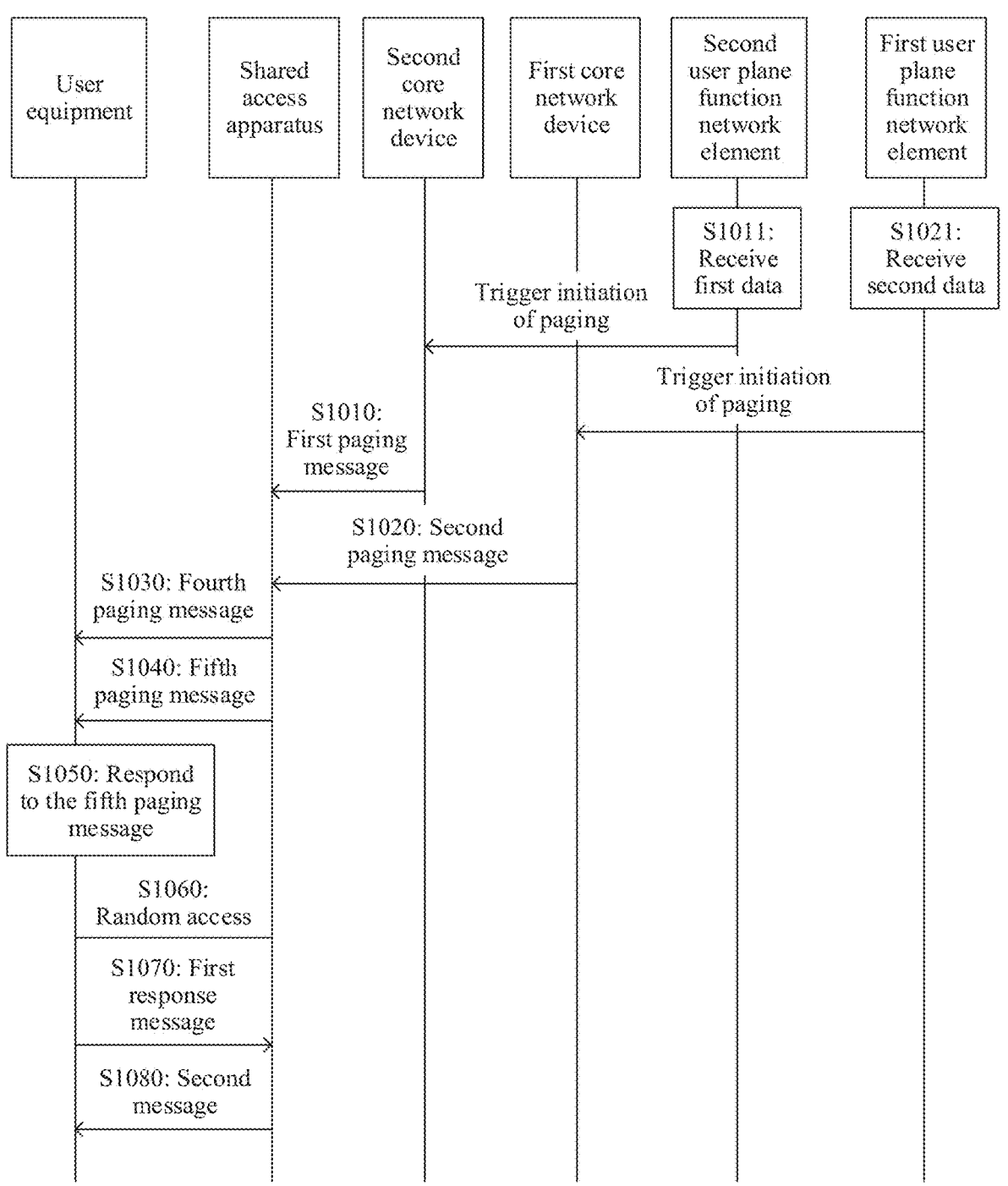
FIG. 10 is a schematic flowchart of still another paging method according to an embodiment of this application.

In the method procedure shown in FIG. 9, it is considered that the access apparatus can determine, after receiving different paging messages, that the different paging messages are used to page same user equipment. In some possible cases, the access apparatus cannot determine, after receiving different paging messages, that the different paging messages are used to page same user equipment. With reference to FIG. 10, the following describes in detail a case in which the access apparatus does not determine or cannot determine, when receiving different paging messages, that the different paging messages are used to page same user equipment.

FIG. 10 is a schematic flowchart of still another paging method according to an embodiment of this application. This procedure is performed by a first user plane function network element, a first core network device, a second user plane function network element, a second core network device, an access apparatus, and user equipment. To distinguish from the user equipment, the first user plane function network element, the first core network device, and the access apparatus may be collectively referred to as a network device, and the second user plane function network element, the second core network device, and the access apparatus may also be collectively referred to as a network device.

The user equipment is in RRC-idle mode in two networks that can be accessed by the access apparatus. Data of the first network arrives at the first user plane function network element, and data of the second network arrives at the second user plane function network element. Specifically, the first user plane function network element and the second user plane function network element respectively trigger the first core network device and the second core network device to perform paging. The access apparatus cannot identify that two pagings of different networks are paging same user equipment. After receiving the paging of the first network and the paging of the second network, the user equipment first accesses the first network and enters RRC-connected mode, and then notifies the access apparatus of paging information of the second network for the user equipment. A cell in the first network that the user equipment first accesses assists the user equipment in accessing the second network.

The paging method includes the following steps.

S1010: The second core network device sends a first paging message to the access apparatus. The access apparatus receives the first paging message from the second core network device.

The first paging message is similar to the first paging message in S910 in FIG. 9, and details are not described herein again.

S1020: The first core network device sends a second paging message to the access apparatus. The access apparatus receives the second paging message from the first core network device.

The second paging message is similar to the second paging message in S920 in FIG. 9, and details are not described herein again.

The first identifier of the user equipment and the second identifier of the user equipment may be different. However, in this embodiment, the access apparatus does not know that both the first identifier of the user equipment and the second identifier of the user equipment identify the same user equipment.

A reason why the first core network device sends the second paging message to the access apparatus may be that the second user plane function network element receives data of the user equipment, that is, the method procedure shown in FIG. 10 further includes S1011: The second user plane function network element receives first data.

Likewise, a reason why the second core network device sends the first paging message to the access apparatus may be that the first user plane function network element receives data of the user equipment, that is, the method procedure shown in FIG. 10 further includes S1021: The first user plane function network element receives second data.

When the first network and the second network share a core network, the first paging message and the second paging message are paging messages sent by a same core network device, and may be collectively referred to as a first paging message.

Further, after receiving the first paging message and the second paging message, the access apparatus needs to page the user equipment, that is, the method procedure shown in FIG. 10 further includes the following steps: S1030: The access apparatus sends a fourth paging message to the user equipment. The user equipment receives the fourth paging message from the access apparatus. S1040: The access apparatus sends a fifth paging message to the user equipment. The user equipment receives the fifth paging message from the access apparatus. The fourth paging message is similar to the fourth paging message shown in FIG. 9, and the fifth paging message is similar to the fifth paging message shown in FIG. 9. Details are not described herein again.

When the first network and the second network share a core network, the fourth paging message and the fifth paging message are paging messages sent by a same core network device, and may be collectively referred to as a first message.

Specifically, if the access apparatus cannot learn in advance that user equipment that needs to be paged by using the first paging message and user equipment that needs to be paged by using the second paging message are same user equipment, the access apparatus pages the user equipment in both a cell in the first network and a cell in the second network.

For example, an identifier of the user equipment that is included in the first paging message is a first 5G-S-TMSI, and an identifier of the user equipment that is included in the second paging message is a second 5G-S-TMSI. The access apparatus sends the fourth paging message in the cell in the second network to page the user equipment whose paging identifier is the first 5G-S-TMSI, and send the fifth paging message in the cell in the first network to page the user equipment whose paging identifier is the second 5G-S-TMSI.

Further, when the access apparatus pages the user equipment in both the cell in the first network and the cell in the second network, the user equipment can receive both the paging of the cell in the first network and the paging of the cell in the second network (which may be understood as that the user equipment supports dual radio (dual radio) or the user equipment may access different networks by using different SIM cards). The user equipment receives the fourth paging message and the fifth paging message.

Further, the user equipment responds to the fourth paging message or the fifth paging message and accesses a corresponding cell.

In a possible implementation, the user equipment receives the fourth paging message and the fifth paging message, and determines to first respond to the fourth paging message.

In another possible implementation, the user equipment receives the fourth paging message and the fifth paging message, and determines to first respond to the fifth paging message.

Optionally, when the user equipment responds to the fifth paging message and is in RRC-connected mode in the first network, for processing of the paging of the second network, refer to the method procedure shown in FIG. 8.

The user equipment may be provided with a plurality of SIM cards, for example, a first SIM card and a second SIM card.

A first identifier of the user equipment may be an identifier of the first SIM card of the user equipment in the second network, and a second identifier of the user equipment may be an identifier of the second SIM card of the user equipment in the first network. Alternatively, a first identifier of the user equipment may be an identifier of the second SIM card of the user equipment in the second network, and a second identifier of the user equipment may be an identifier of the first SIM card of the user equipment in the first network. Alternatively, a first identifier of the user equipment may be an identifier of the first SIM card of the user equipment in the second network, and a second identifier of the user equipment may be an identifier of the first SIM card of the user equipment in the first network. Alternatively, a first identifier of the user equipment may be an identifier of the second SIM card of the user equipment in the second network, and a second identifier of the user equipment may be an identifier of the second SIM card of the user equipment in the first network.

User equipment with a plurality of SIM cards may access the first network by using a first SIM card, and access the second network by using a second SIM card. In this case, the first network and the second network may be the same. For example, after the first SIM card is already in connected mode, the first SIM card assists the second SIM card in responding to the paging of the network.

Specifically, the first network pages the first SIM card of the user equipment by using the second paging message shown in S1020, and the second network pages the second SIM card of the user equipment by using the first paging message shown in S1010.

The access apparatus notifies, by using the fourth paging message shown in S1030, the user equipment that the first network is paging the first SIM card of the user equipment, and the access apparatus notifies, by using the fifth paging message shown in S1040, the user equipment that the second network is paging the second SIM card of the user equipment.

A possible implementation is as follows:

The user equipment responds to the fifth paging message, so that the user equipment accesses the first network by using the first SIM card. That is, the method procedure shown in FIG. 10 further includes S1050: The user equipment responds to the fifth paging message.

After the user equipment accesses the first network by using the first SIM card, the first SIM card may assist, over the first network, the second SIM card in accessing the second network. The following several possibilities are included:

Possibility 1: The second SIM card of the user equipment randomly accesses a third cell in the second network. That is, the method procedure shown in FIG. 10 further includes S1060: The user equipment initiates random access.

Possibility 2: The user equipment sends a first response message to the access apparatus, to notify the access apparatus that the user equipment accesses the first network by using the first SIM card, and the access apparatus sends a second message to the user equipment over the first network. In the second message, the first network sends a first parameter, a second parameter, a third parameter, a fourth parameter, or a fifth parameter of the second SIM card of the user equipment in the second network to the user equipment by using the first SIM card of the user equipment. The user equipment transmits a corresponding parameter to the second SIM card, and the second SIM card configures a resource based on the corresponding parameter.

Specifically, the second message is similar to the second message described above, and details are not described herein again. That is, the method procedure shown in FIG. 10 further includes S1070: The user equipment sends the first response message to the access apparatus. In addition, the method procedure further includes S1080: The access apparatus sends the second message to the user equipment over the first network. The user equipment receives the second message from the access apparatus over the first network.

Possibility 3: The fifth paging message includes a sixth parameter, a seventh parameter, an eighth parameter, a ninth parameter, or a tenth parameter of the second SIM card of the user equipment in the second network.

Specifically, a corresponding parameter included in the fifth paging message is similar to that included in the first message shown in the case 3 in FIG. 8. Details are not described herein again.

It should be understood that, in this embodiment of this application, the first network may be any one of a PLMN, a PNI-NPN, or an SNPN, and the second network may be any one of a PLMN, a PNI-NPN, or an SNPN. In addition, in a multi-SIM card scenario, the first network and the second network may be a same PLMN, PNI-NPN, or SNPN. For example, the first network and the second network page different SIM cards of a same terminal device for a same PLMN.

Figure 11:
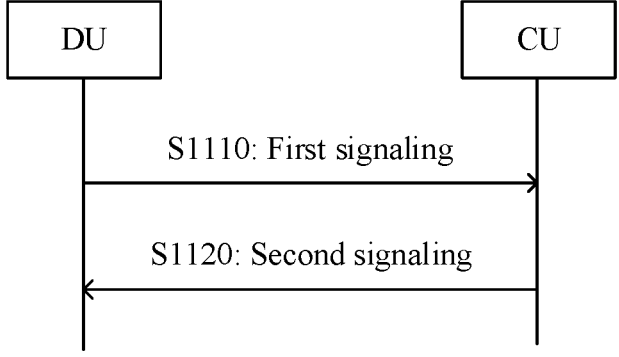
FIG. 11 is a schematic flowchart of a communications method according to an embodiment of this application.

With reference to FIG. 11, the following describes in detail signaling interaction between a CU and a DU when an access apparatus includes the CU and the DU. FIG. 11 is a schematic flowchart of a communications method according to an embodiment of this application. This procedure is performed by a CU and a DU.

The communications method includes the following steps.

S1110. The DU sends first signaling to the CU. The CU receives the first signaling from the DU.

The first signaling is used to indicate a network that can be accessed by the DU.

In a possible implementation, if the network that can be accessed by the DU is a PLMN, the first signaling includes an identifier of the PLMN. For example, if the network that can be accessed by the DU is a first PLMN to a third PLMN, the first signaling includes an identifier of the first PLMN, an identifier of the second PLMN, and an identifier of the third PLMN. If the identifier of the first PLMN, the identifier of the second PLMN, and the identifier of the third PLMN are a PLMN ID #1 to a PLMN ID #3, the first signaling includes the PLMN ID #1 to the PLMN ID #3.

In another possible implementation, if the network that can be accessed by the DU is a PNI-NPN, the first signaling includes an identifier of the PNI-NPN. For example, if the network that can be accessed by the DU is a first PNI-NPN to a third PNI-NPN, the first signaling includes an identifier of the first PNI-NPN, an identifier of the second PNI-NPN, and an identifier of the third PNI-NPN. If the identifier of the first PNI-NPN, the identifier of the second PNI-NPN, and the identifier of the third PNI-NPN are a PLMN ID #1 and a CAG ID #1 to a PLMN ID #3 and a CAG ID #3, the first signaling includes the PLMN ID #1 and the CAG ID #1 to the PLMN ID #3 and the CAG ID #3.

In still another possible implementation, if the network that can be accessed by the DU is an SNPN, the first signaling includes an identifier of the SNPN. For example, if the network that can be accessed by the DU is a first SNPN to a third NPN, the first signaling includes an identifier of the first SNPN, an identifier of the second SNPN, and an identifier of the third SNPN. If the identifier of the first SNPN, the identifier of the second SNPN, and the identifier of the third SNPN are a PLMN ID #1 and a NID #1 to a PLMN ID #3 and a NID #3, the first signaling includes the PLMN ID #1 and the NID #1 to the PLMN ID #3 and the NID #3.

Optionally, the first signaling is F1 setup request (F1 setup request) signaling.

Specifically, the DU may add, to the F1 setup signaling, information about an NPN supported by the DU. For an NG-RAN, the CU may add, to the F1 setup response signaling, information about an NPN supported by the CU. When the information about the NPN includes a CAG ID, if a CAG ID included in the NPN supported by the CU is different from a CAG ID included in the NPN supported by the DU, the DU needs to consider the difference. When system information is broadcast, the CAG IDs supported by both the CU and the DU may be broadcast. When the information about the NPN includes a NID, if a NID included in the NPN supported by the CU is different from a NID included in the NPN supported by the DU, the DU needs to consider the difference. When system information is broadcast, the NIDs supported by both the CU and the DU may be broadcast.

Optionally, the first signaling is DU configuration update request signaling, and the DU configuration update request signaling is used to indicate to update the network that can be accessed by the DU. In this implementation, the CU has received the F1 setup request signaling before receiving the DU configuration update request signaling, and has learned of the network that can be accessed by the DU. After receiving the DU configuration update request signaling, the CU updates the network that is learned of and that can be accessed by the DU.

Specifically, if the information about the NPN supported by the DU is included in the DU configuration update request signaling, the CU may store the information about the NPN supported by the DU, and replace an NPN previously provided by the DU and supported by the DU with the NPN supported by the DU and included in the DU configuration update request signaling. If the information about the NPN supported by the CU is included in the DU configuration update request acknowledge signaling, the DU may store the NPN supported by the CU, and overwrite the information about the NPN supported by the CU and maintained by the DU. Correspondingly, the DU may further update corresponding system information. If the information about the NPN supported by the CU is included in CU configuration update request signaling, the DU may store the information about the NPN supported by the CU, and replace previously received information about an NPN supported by the CU with the information that is about the NPN supported by the CU and that is included in the CU configuration update request signaling. If the information about the NPN supported by the DU is included in the CU configuration update request acknowledge signaling, the CU may store the information about the NPN supported by the DU, and replace previously received information about an NPN supported by the DU with the information that is about the NPN supported by the DU and that is included in the CU configuration update request acknowledge signaling.

For example, the DU sends an F1 setup request to the CU, to notify the DU that the network that can be accessed by the DU is a first network, a second network, and a third network, and after a period of time, the DU determines that the network that can be accessed by the DU is the first network, the second network, and a fourth network. In other words, the DU sends the DU configuration update request signaling to the CU, to notify the CU that the network that can be accessed by the DU is the first network, the second network, and the fourth network, or the DU sends the DU configuration update request signaling to the CU, to notify the CU that the DU cannot access the third network, but can access the fourth network.

Optionally, the first signaling includes a DU serving cell message, and the DU serving cell message includes a cell identifier and a network identifier of a network that can be accessed by a cell. For example, the first signaling includes the foregoing PLMN ID, the foregoing NID, and a cell ID. The DU served cell message may also be referred to as DU served cell information (served cell information).

For example, the network identifier in the first signaling may be included in a cell information list supported by the DU, and a specific representation form includes a form shown in Table 1.

TABLE 1

| Information element name (IE/group name) | Semantics description (semantics description) |
| --- | --- |
| NR cell global identifier (NR CGI) | The cell global identifier is used to identify a cell. |
| NR physical cell identifier (NR PCI) | Physical cell identifier |
| 5G system tracking area code (SGS TAC) | 5G system tracking area code |
| Configured EPS tracking area code (configured EPS TAC) | Tracking area code |
| Served PLMN served PLMENs) | Broadcast PLMN |
| >PLMN identifier (PLMN identity) | PLMN identifier |
| >TAI slice support list (TAI slice support list) | Slice supported by each tracking area |
| >NPN support list (NPN support list) | NPN list supported by each PLMN |
| . . . | . . . |
| Extended served PLMN list (extended served PLMNs list) | |
| >Extended served PLMN item list (extended served PLMNs item) | Extended served PLMN item |
| >>PLMN identifier (PLMN identity) | PLMN identifier |
| >>TAI slice support list (TAI slice support list) | |
| >>NPN support list (NPN support list) | NPN list supported by each PLMN |
| . . . | . . . |
| Broadcast PLMN identifier information list (broadcast PLMN identity Info list) | |
| >PLMN identifier list (PLMN identity List) | PLMN identifier list |
| >Extended PLMN identifier list (extended PLMN identity list) | |
| >5G system tracking area code (5GS-TAC) | Tracking area code |
| >NR cell identifier (NR cell identity) | The cell identifier is used to identify a cell. |
| >RAN area code (RANAC) | Access network area code |
| >NPN support list (NPN support list) | NPN list supported by each PLMN |

Text descriptions in the semantics description (semantics description) column in this application do not necessarily need to be reflected in a protocol, and the semantics description (semantics description) provided in this application is only added for ease of understanding of an information element.

A specific representation form of the NPN supported list in Table 1 includes a form shown in Table 2:

TABLE 2

| Information element name (IE/group name) | Semantics description (semantics description) |
| --- | --- |
| NPN support item information element (NPN support item IEs) | Supported NPN |
| >CAG identifier list (CAG ID list) | CAG identifier list |
| >>CAG identifier (CAG ID) | CAG identifier |
| >Network identifier list (MD list) | NID list |
| >>Network identifier (MD) | NID |

S1120: The CU sends second signaling to the DU. The DU receives the second signaling from the CU.

In a possible implementation, the second signaling is used to indicate a network that can be accessed by both the CU and the DU.

For example, if the CU learns, after receiving the first signaling, that the network that can be accessed by the DU is a first PLMN corresponding to a first PLMN ID, and a first SNPN corresponding to the first PLMN ID, a first NID, and a first cell ID, and a network that can be accessed by the CU is the first SNPN corresponding to the first PLMN ID, the first NID, and the first cell ID, the second signaling includes an identifier of the first SNPN: the first PLMN ID, the first NID, and the first cell ID, to indicate that the network that can be accessed by both the CU and the DU is the first SNPN.

In another possible implementation, the second signaling is used to indicate a network that can be accessed by the CU.

For example, if the network that can be accessed by the CU is a PLMN, the second signaling includes an identifier of the PLMN. If the network that can be accessed by the CU is a PNI-NPN, the second signaling includes an identifier of the PNI-NPN. If the network that can be accessed by the CU is an SNPN, the second signaling includes an identifier of the SNPN.

For example, a specific representation form of the information about the NPN that can be supported by the CU in the second signaling includes a form shown in Table 3:

TABLE 3

| Information element name (IE/group name) | Semantics description (semantics description) |
| --- | --- |
| Available PLMN item information element (available PLMN item IEs) | Available PLMN |
| >PLMN identifier (PLMN identity) | PLMN identifier |
| >NPN support list (NPN support list) | NPN list supported by each PLMN |

Alternatively, a specific representation form of information about an NPN that can be supported by the CU includes a form shown in Table 4:

TABLE 4

| Information element name (IE/group name) | Semantics description (semantics description) |
| --- | --- |
| Extended available PLMN item information element (extended available PLMN item IEs) | Extended available PLMN |
| >PLMN identifier (PLMN identity) | PLMN identifier |
| >NPN support list (NPN support list) | NPN list supported by each PLMN |

A specific representation form of the NPN supported list in Table 3 and Table 4 includes a form shown in Table 5:

TABLE 5

| Information element name (IE/group name) | Semantics description (semantics description) |
| --- | --- |
| NPN support item information element (NPN support item Es) | Supported NPN |
| >CAG identifier list (CAG ID list) | CAG identifier list |
| >>CAG identifier (CAG ID) | CAG identifier |
| >Network identifier list (NID list) | NID list |
| >>Network identifier (NID) | NID |

In still another possible implementation, the second signaling is used to indicate that the CU fails to respond to the first signaling. For example, there is no network that can be accessed by both the CU and the DU. For example, when the first signaling is an F1 setup request, the second signaling may be an F1 setup failure. In this case, the second signaling may include a failure cause.

For example, if the CU learns, after receiving the first signaling, that the network that can be accessed by the DU is a first PLMN corresponding to a first PLMN ID, and a first SNPN corresponding to the first PLMN ID, a first NID, and a first cell ID, and a network that can be accessed by the CU is a second SNPN corresponding to a second PLMN ID, a second NID, and a second cell ID, the CU determines that there is no network that can be accessed by both the CU and the DU, and the CU sends the second signaling to indicate that there is no network that can be accessed by both the CU and the DU. The second signaling may include a failure cause, and the failure cause may be the first PLMN ID and the first NID, indicating that the CU does not support (not supported) the first PLMN ID and the first NID.

In still another possible implementation, the second signaling is used to send an auxiliary configuration parameter of the CU for the DU, and the auxiliary configuration parameter is used to assist the DU in configuring a related parameter of a supported network. For example, the CU sends network access rate reduction signaling to the DU, to assist the DU in configuring a UAC parameter of a network cell of the DU.

The second signaling is used to send the auxiliary configuration parameter of the CU for the DU, but this does not limit the CU to receiving the first signaling. The CU may actively send the second signaling to the CU, to assist the DU in configuring the related parameter of the supported network.

For example, a specific representation form of the UAC auxiliary parameter in the second signaling includes a form shown in Table 6:

TABLE 6

| Information element name (IE/group name) | Semantics description (semantics description) |
| --- | --- |
| UAC PLMN list (UAC PLMN list) | UAC PLMN list |
| >UAC PLMN item information element (UAC PLMN item) | UAC PLMN |
| >>PLMN identifier (PLMN identity) | The PLMN identifier is used to identify a network. |
| >>Network identifier (NID) | NID |
| >>UAC type list (UAC type list) | UAC type list |
| >>>UA type item information element (UAC type item) | UA type |
| >>>>UAC reduction indication (UAC reduction indication) | UAC reduction indication |
| >>>>Choice UAC category type (CHOICE UAC category type) | Choice UAC category |
| >>>>>UAC standardized (UAC standardized) | UAC standardized |
| >>>>>>UAC action (UAC action) | UAC action |
| >>>>>UAC operator defined (UAC operator defined) | UAC operator defined |
| >>>>>>Access category (access category) | |
| >>>>>>Access identifier (access identity) | |

A NID, a CAG ID, an SNPN ID, a PNI-NPN ID, or the like added in the foregoing table may be at a same level as another parameter, for example, at a same level as the UAC reduction indication, the UAC action, the access category, or the access identifier, or may be included in the foregoing parameter to further refine an NPN.

In still another possible implementation, for an NPN, the second signaling may be used to notify the DU that interface setup or configuration update fails because an error occurs, and a failure cause may be "CAG ID not supported (CAG ID(s) not supported)", "NID not supported (NID(s) not supported)", "SNPN not supported (SNPN(s) not supported)", "PNI-NPN not supported (PNI-NPN(s) not supported)", an invalid CAG ID, an invalid NID, an invalid SNPN, an invalid PNI-NPN, CAG access only, or the like. In other words, because the CAG ID, the NID, the SNPN, or the PNI-NPN provided by the DU is not supported by the CU, and there is no CAG or SNPN supported by both the CU and the DU, interface setup, DU configuration update, or CU configuration update fails. In addition, the cause value is further applicable to a process of NG or Xn interface setup and a process of network node configuration update. An applicable interface is not specifically limited in this application. Moreover, the cause value is also applicable to a process such as a failure of initial access of user equipment, a failure of context setup of user equipment, a failure of context modification of user equipment, or a failure of handover of user equipment on an interface such as a Uu interface, an F1 interface, an E1 interface, an NG interface, or an Xn interface. An applicable process is not specifically limited in this application either. For example, in an initial UE access process, the user equipment reports, to the DU by using RRC setup complete information in a random access procedure, a network identifier of a network to be accessed by the user equipment. The DU further reports, to the CU, the network identifier of the network to be accessed by the user equipment, and the CU further reports, to a core network device AMF, the identifier of the network to be accessed by the user equipment. For example, the network identifier is a NID, a CAG ID, a PLMN ID, an SNPN ID, or a PNI-NPN ID. The AMF verifies, based on locally stored UE subscription information, whether to allow access of the user equipment. For example, the UE subscription information locally stored in the AMF may be information such as CAG ID list information or NID list information that allows UE access in a mobility restriction (mobility restriction) list, whether the user equipment can access a 5CG only by using a CAG cell (CAG access only), or whether the user equipment can access a 5CG only by using a NID cell (NID access only). If the verification fails, the AMF rejects UE access, and notifies, by using error indication (error indication) information of the NG interface, the CU that access of the user equipment fails because an error occurs. The notification information includes an error cause or a failure cause. The error cause or the failure cause may be the foregoing cause value. Because UE access fails, the CU may further send a UE CONTEXT RELEASE COMMAND to the DU through the F1 interface, to release a resource that has been configured for the user equipment at the DU, for example, an SRB resource or a DRB resource. The UE CONTEXT RELEASE COMMAND may include a release cause, and the release cause may be the foregoing cause value. The CU and the DU may further send an RRC release message to the user equipment, to indicate the user equipment to release a configured air interface resource. The RRC release message may include a release cause value, and the release cause may be the foregoing cause value.

A specific representation form of the cause value in the second signaling includes a form shown in Table 7:

the NPN to the DU. The auxiliary configuration parameter is used to assist the DU in configuring a related parameter of the supported NPN. For example, the CU sends network access rate reduction Network access rate reduction signaling to the DU, where the signaling includes the NPN identifier, to assist the DU in configuring a UAC parameter of an NPN cell of the DU. For example, the NPN identifier may be a PLMN ID, a NID, a CAG ID, a PLMN ID and a NID, a PLMN ID and a CAG ID, an SNPN ID, or a PNI-NPN ID. The NID, the CAG ID, the SNPN ID, the PNI-NPN ID, or the like may be added to UAC assistance information (UAC assistance information) as a parameter at a same level as the PLMN ID, to assist the DU in configuring an NPN parameter, or the added NID, CAG ID, SNPN ID, PNI-NPN ID, or the like may be at a same level as another parameter in UAC assistance information, for example, at a same level as a UAC reduction indication (UAC reduction indication), a UAC action (UAC action), an access category (access category), or an access identifier (access identity), or may be included in the foregoing parameter to further refine and restrict the NPN. For example, a new access category (access category) or a new access identifier (access identity) is defined based on the NID, the CAG ID, the SNPN ID, or the PNI-NPN ID.

TABLE 7

| Cause value | Semantics description |
|---|---|
| Invalid NID (valid NID) | Because a NID provided for the AMF or CU is not in an allowed NID list of the UE, a signaling failure or UE context release is triggered. |
| Invalid CAG ID (invalid CAG ID) | Because a CAG ID provided for the AMF or CU is not in an allowed CAG ID list of the UE, a signaling failure or UE context release is triggered. |
| CAG access only (CAG-access only) | Because the UE is allowed to access only a CAG cell, a signaling failure or UE context release is triggered. |
| SNPN not supported (SNPN(s) not supported) | Because the CU node does not support an SNPN reported by the DU, interface setup, interface update, or the like fails. |
| PNI-NPN not supported (PNI-NPN(s) not supported) | Because the CU node does not support a PNI-NPN reported by the DU, interface setup, interface update, or the like fails. |

It should be understood that "SNPN not supported (SNPN not supported)" may be replaced with an invalid NID (invalid NID), an invalid PLMN (invalid PLMN), "NID not supported by the CU (NID not served by the gNB-CU)", "PLMN not supported by the CU (PLMN not served by the gNB-CU)", or a combination of the foregoing two or more elements. "PNI-NPN not supported (PNI-NPN not supported)" may be replaced with an invalid CAG ID (invalid CAG ID), an invalid PLMN (invalid PLMN), "CAG not supported by the CU (CAG not served by the gNB-CU)", "PLMN not supported by the CU (PLMN not served by the gNB-CU)", or a combination of the foregoing two or more elements. An invalid NID (invalid NID) may be replaced with "NID not supported by the CU (NID not served by the gNB-CU)", an invalid PLMN (invalid PLMN), "PLMN not supported by the CU (PLMN not served by the gNB-CU)", or a combination of the foregoing two or more elements. An invalid CAG ID (invalid CAG ID) may be replaced with "CAG not supported by the CU (CAG not served by the gNB-CU)", an invalid PLMN (invalid PLMN), "PLMN not supported by the CU (PLMN not served by the gNB-CU)", or a combination of the foregoing two or more elements.

In still another possible implementation, for an NPN, the second signaling includes an NPN identifier, and is used by the CU to indicate an auxiliary configuration parameter of Optionally, the second signaling is F1 setup response (F1 setup response) signaling.

Optionally, the second signaling is DU configuration update response signaling.

Optionally, the second signaling is CU configuration update request signaling.

Optionally, the second signaling is F1 setup failure (F1 setup failure) signaling.

Optionally, the second signaling is DU configuration update failure signaling.

Optionally, the second signaling is network access rate reduction signaling.

Optionally, the second signaling is information about a network that can be accessed by the CU, and the information about the network that can be accessed by the CU includes a network identifier of the network that can be accessed by the CU. For example, the second signaling includes the foregoing PLMN ID, the foregoing NID, and a cell ID.

Optionally, when the first signaling is F1 setup request signaling, the second signaling is F1 setup response signaling. Optionally, when the first signaling is DU configuration update signaling, the second signaling is DU configuration update response signaling.

For an NPN, the DU sends the first signaling to the CU, the signaling includes a network identifier list of the NPN, and an NPN identifier in the network identifier list of the NPN is used to indicate an NPN supported by the DU. For example, the NPN identifier may be a PLMN ID, a NID, a CAG ID, a PLMN ID and a NID, a PLMN ID and a CAG ID, an SNPN ID, or a PNI-NPN ID.

Optionally, each CAG ID may correspond to one human-readable network name (human-readable network name), and each NID may correspond to one human-readable network name (human-readable network name). The human-readable network name may help a user to manually select an NPN. The first signaling may also carry the human-readable network name corresponding to each CAG ID or the human-readable network name corresponding to each NID, so that the terminal device displays an NPN name to the user, thereby helping the user manually select a corresponding NPN.

The CU sends the second signaling to the DU, the signaling includes a network identifier list of the NPN, an NPN identifier in the network identifier list of the NPN is used to indicate an NPN supported by the CU or an NPN supported by both the CU and the DU, and the NPN identifier may be the foregoing identifier.

Optionally, the second signaling may also include the human-readable network name corresponding to each CAG ID or the human-readable network name corresponding to each NID, so that the terminal device displays an NPN name to the user, thereby helping the user manually select a corresponding NPN.

Optionally, the information included in the first signaling and the information included in the second signaling are also applicable to a process of NG or Xn interface setup and a process of network node configuration update. A specific applicable interface is not specifically limited in this application. For example, the information included in the first signaling and the information included in the second signaling are applicable to a process such as initial access of user equipment, context setup of user equipment, context modification of user equipment, or handover of user equipment on an interface such as a Uu interface, an F1 interface, an E1 interface, an NG interface, or an Xn interface. An applicable process is not specifically limited in this application either.

Further, the first signaling may be used to not only notify the CU of the NPN supported by the DU, but also notify the CU of an NPN supported by a DU adjacent to the DU. Likewise, the second signaling may be used to not only notify the DU of the NPN supported by the CU or the RAN, but also notify the DU of an NPN supported by a CU adjacent to the CU or a RAN adjacent to the RAN. For example, a first CU or a first RAN notifies, by using an Xn setup request (Xn setup request) process or an update request process (NG-RAN node configuration update request), a second CU of an NPN supported by the first CU or the first RAN or an NPN supported by a CU adjacent to the first CU or a RAN adjacent to the first RAN. The NPN may be identified by using a PLMN ID, and/or a CAG ID, and/or a human-readable network name corresponding to a CAG ID, or by using a PLMN ID, and/or a NID, and/or a human-readable network name corresponding to a NID. The second CU notifies the DU of the foregoing information by using F1 setup response (F1 setup response) signaling. The DU notifies, in a manner such as broadcast or RRC information, the terminal device of a network identifier of an NPN supported by the DU, a DU adjacent to the DU, or a RAN adjacent to the DU, so that the terminal device performs automatic network selection and access, manual network selection and access, and the like. For another example, in a UE handover process, a target CU or a target RAN may notify, through an NG interface by using a handover request acknowledge (handover request acknowledge) process, the core network device AMF of a network identifier of an NPN supported by the target CU, the target RAN, a CU adjacent to the target CU, or a RAN adjacent to the target RAN. The AMF sends the network identifier to a source CU or a source RAN by using a handover command (handover command) process on the NG interface. The source CU sends the network identifier to the DU by using a UE context modification (UE context modification) process, and then the source DU or the source RAN sends the network identifier to the terminal device in a manner such as broadcast or RRC reconfiguration (RRC reconfiguration) signaling, so that the terminal device performs automatic network selection and access, manual network selection and access, automatic handover, manual handover, and the like. For another example, in a UE handover process, a target CU or a target RAN may notify, through an Xn interface by using a handover request acknowledge (handover request acknowledge) process, a source CU or a source RAN of a network identifier of an NPN supported by the target CU, the target RAN, a CU adjacent to the target CU, or a RAN adjacent to the target RAN. The source CU sends the network identifier to the DU by using a UE context modification request (UE context modification request) process. The source DU or the source RAN sends the network identifier to the terminal device in a manner such as broadcast or RRC reconfiguration (RRC reconfiguration) signaling, so that the terminal device performs automatic network selection and access, manual network selection and access, automatic handover, manual handover, and the like. For another example, in a UE handover process, a target DU may notify, through an F1 interface by using a UE context modification response (UE context modification response) process, a source CU of a network identifier of an NPN supported by the target DU, a DU adjacent to the target DU, or a RAN adjacent to the target DU. The source CU sends the network identifier to a source DU by using a UE context modification request (UE context modification request) process. The source DU sends the network identifier to the terminal device in a manner such as broadcast or RRC reconfiguration (RRC reconfiguration) signaling, so that the terminal device performs automatic network selection and access, manual network selection and access, automatic handover, manual handover, and the like.

An example in which the DU supports SNPNs (a first SNPN to a third NPN) and the CU supports SNPNs (the first SNPN, the second SNPN, and a fourth NPN) is used below for description, and the DU and the CU interact with each other about networks supported by the DU and the CU. Cell identifiers corresponding to the first SNPN to the fourth NPN are a first cell ID to a fourth cell ID, and network identifiers corresponding to the first SNPN to the fourth NPN are a first PLMN ID and a first NID to a fourth PLMN ID and a fourth NID.

In this case, the first signaling may include content shown in Table 8:

TABLE 8

| Cell ID | PLMN ID | NID |
|---------|---------|-----|
| 1 | 1 | 1 |
| 2 | 2 | 2 |
| 3 | 3 | 3 |

In this case, the second signaling may include content shown in Table 9:

TABLE 9

| Cell ID | PLMN ID | NID |
|---------|---------|-----|
| I | 1 | 1 |
| 2 | 2 | 2 |

Alternatively, the second signaling may include content shown in Table 10:

TABLE 10

| Cell ID | PLMN ID | NID |
|---------|---------|-----|
| 1 | 1 | 1 |
| 2 | 2 | 2 |
| 4 | 4 | 4 |

When the access apparatus includes a CU and a DU, there may be a plurality of CUs. For example, the access apparatus includes one DU and two CUs. In this case, the second signaling includes second signaling #1 and second signaling #2, which are respectively sent by a first CU and a second CU to the DU. Possible forms of the second signaling #1 and the second signaling #2 are similar to those of the foregoing second signaling, and details are not described herein again.

Figure 12:
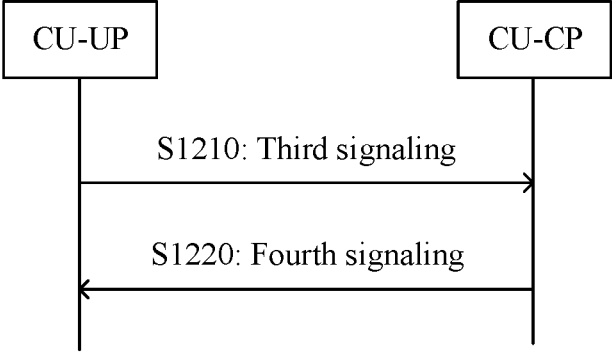
FIG. 12 is a schematic flowchart of another communications method according to an embodiment of this application.

Further, when the CU includes a control plane CU-CP and a user plane CU-UP, signaling interaction between the CU-CP and the CU-UP is shown in FIG. 12. FIG. 12 is a schematic flowchart of another communications method according to an embodiment of this application. This procedure is performed by a CU-CP and a CU-UP.

The communications method includes the following steps.

S1210: The CU-UP sends third signaling to the CU-CP. The CU-CP receives the third signaling from the CU-UP.

The third signaling may be used to indicate a network that can be accessed by the CU-UP.

A specific representation form of the third signaling includes a form shown in Table 11:

TABLE 11

| Information name (IE/group name) | Semantics description (semantics description) |
|----------------------------------|-----------------------------------------------|
| Signaling type (message type) | Type of information |
| Transmission ID (transaction ID) | Transmission identifier |
| gNB-CU-UP identifier (gNB-CU-UP ID) | The CU-UP identifier is used to indicate a CU-UP |
| gNB-CU-UP name (gNB-CU-UP name) | The CU-UP name is used to indicate a CU-UP |
| CN support (CN support) | Used to indicate a supported core network type |
| Supported PLMN (supported PLMNs) | Used to indicate a PLMN that can be accessed |
| >PLMN identifier (PLMN identity) | The PLMN identifier is used to identify a network. |
| >Slice support list (slice support list) | Used to indicate a list of supported slices |
| >NR cell global identifier support list (NR CGI support list) | The cell global identifier is used to identify a cell. |
| >QoS parameter support list (QoS parameters support list) | QoS-related parameter |
| >NPN support list (NPN support list) | NPN supported by each PLMN |
| gNB-CU-UP capacity gNB-CU-UP capacity) | Used to indicate a capacity of the CU-UP |

A specific representation form of the NPN supported list in Table 11 includes a form shown in Table 12:

TABLE 12

| Information element name (IE/group name) | Semantics description (semantics description) |
|------------------------------------------|-----------------------------------------------|
| NPN support item information element (NPN support item IEs) | Used to indicate a supported NPN |
| >CAG identifier list (CAG ID list) | Used to indicate a plurality of CAG identifiers of a plurality of supported NPNs |
| >>CAG identifier (CAG ID) | Used to indicate a CAG identifier of a supported NPN |
| >Network identifier list (NID list) | Used to indicate a plurality of NIDs of a plurality of supported NPNs |
| >>Network identifier (NID) | Used to indicate a NID of a supported NPN |

In a possible implementation, if the network that can be accessed by the CU-UP is a PLMN, the third signaling includes an identifier of the PLMN. For example, if the network that can be accessed by the CU-UP is a first PLMN to a third PLMN, and identifiers of the first PLMN to the third PLMN are a first PLMN ID to a third PLMN ID, the third signaling includes the first PLMN ID to the third PLMN ID.

In another possible implementation, if the network that can be accessed by the CU-UP is a PNI-NPN, the third signaling includes an identifier of the PNI-NPN. For example, if the network that can be accessed by the CU-UP is a first PNI-NPN to a third PNI-NPN, and identifiers of the first PNI-NPN to the third PNI-NPN are a first PLMN ID, a first CAG ID, and a first cell ID to a third PLMN ID, a third CAG ID, and a third cell ID, the third signaling includes the first PLMN ID, the first CAG ID, and the first cell ID to the third PLMN ID, the third CAG ID, and the third cell ID.

In still another possible implementation, if the network that can be accessed by the CU-UP is an SNPN, the third signaling includes an identifier of the SNPN. For example, if the network that can be accessed by the CU-UP is a first SNPN to a third NPN, and identifiers of the first SNPN to the third NPN are a first PLMN ID, a first NID, and a first cell ID to a third PLMN ID, a third NID, and a third cell ID, the third signaling includes the first PLMN ID, the first NID, and the first cell ID to the third PLMN ID, the third NID, and the third cell ID.

In still another possible implementation, for an NPN, the CU-UP sends the third signaling to the CU-CP, the signaling includes a network identifier list of the NPN, and an NPN identifier in the network identifier list of the NPN is used to indicate an NPN supported by the CU-UP. For example, the NPN identifier may be a PLMN ID, a NID, a CAG ID, a PLMN ID and a NID, a PLMN ID and a CAG ID, an SNPN ID, or a PNI-NPN ID. The CU-CP sends fourth signaling to the CU-UP, the signaling includes a network identifier list of the NPN, an NPN identifier in the network identifier list of the NPN is used to indicate an NPN supported by the CU-CP or an NPN supported by both the CU-CP and the CU-UP, and the NPN identifier may be the foregoing identifier.

Optionally, the third signaling is E1 setup request (E1 setup request) signaling.

Optionally, the third signaling is CU-UP configuration update request signaling, and the CU-UP configuration update request signaling is used to indicate to update the network that can be accessed by the CU-UP. In this implementation, the CU-CP has received the E1 setup request signaling before receiving the CU-UP configuration update request signaling, and has learned of the network that can be accessed by the CU-UP. After receiving the CU-UP configuration update request signaling, the CU-CP updates the network that is learned of and that can be accessed by the CU-UP.

For example, the CU-UP sends an E1 setup request to the CU-CP, to notify the CU-UP that the network that can be accessed by the CU-UP is a first network, a second network, and a third network, and after a period of time, the CU-UP determines that the network that can be accessed by the CU-UP is the first network, the second network, and a fourth network. In other words, the CU-UP sends the CU-UP configuration update request signaling to the CU-CP, to notify the CU-CP that the network that can be accessed by the CU-UP is the first network, the second network, and the fourth network, or the CU-UP sends the CU-UP configuration update request signaling to the CU-CP, to notify the CU-CP that the CU-UP cannot access the third network, but can access the fourth network.

Optionally, the third signaling is CU-CP configuration update response signaling.

S1220: The CU-CP sends the fourth signaling to the CU-UP. The CU-UP receives the fourth signaling from the CU-CP.

In a possible implementation, the fourth signaling is used to indicate a network that can be accessed by both the CU-CP and the CU-UP.

For example, if the CU-CP learns, after receiving the third signaling, that the network that can be accessed by the CU-UP is a first PLMN corresponding to a first PLMN ID, and a first SNPN corresponding to the first PLMN ID, a first NID, and a first cell ID, and a network that can be accessed by the CU-CP is the first SNPN corresponding to the first PLMN ID, the first NID, and the first cell ID, the second signaling includes an identifier of the first SNPN: the first PLMN ID, the first NID, and the first cell ID, to indicate that the network that can be accessed by both the CU-CP and the CU-UP is the first SNPN.

In another possible implementation, the fourth signaling is used to indicate a network that can be accessed by the CU-CP.

For example, if the network that can be accessed by the CU-CP is a PLMN, the second signaling includes an identifier of the PLMN, and/or if the network that can be accessed by the CU-CP is a PNI-NPN, the second signaling includes an identifier of the PNI-NPN, and/or if the network that can be accessed by the CU-CP is an SNPN, the second signaling includes an identifier of the SNPN.

In still another possible implementation, the fourth signaling is used to indicate that the CU-CP fails to respond to the third signaling. For example, there is no network that can be accessed by both the CU-CP and the CU-UP, and the CU-CP fails to respond to the third signaling sent by the CU-UP. The fourth signaling includes a response failure cause.

A specific representation form of the cause value in the fourth signaling includes a form shown in Table 13;

TABLE 13

| Cause value | Semantics description |
| --- | --- |
| CAG ID not supported | A request is rejected because a CAG ID is not supported. |
| NID not supported | A request is rejected because a NID is not supported. |

The CAG ID and the NID in Table 13 are shown in Table 12, and details are not described herein again.

For example, if the CU-CP learns, after receiving the third signaling, that the network that can be accessed by the CU-UP is a first PLMN corresponding to a first PLMN ID, and a first SNPN corresponding to the first PLMN ID, a first NID, and a first cell ID, and a network that can be accessed by the CU-CP is a second SNPN corresponding to a second PLMN ID, a second NID, and a second cell ID, the CU-CP determines that there is no network that can be accessed by both the CU-CP and the CU-UP, and the CU-CP sends the fourth signaling to indicate that there is no network that can be accessed by both the CU-CP and the CU-UP. It may be understood that the CU-CP fails to respond to the third signaling sent by the CU-UP. In this case, the fourth signaling may include a failure cause for the CU-CP to respond to the third signaling sent by the DU. The failure cause may be the first PLMN ID and the first NID, indicating that the CU-CP does not support (not supported) the first PLMN ID and the first NID.

In another possible implementation, the fourth signaling is used to indicate the CU-CP to notify the CU-UP to set up a bearer context for corresponding UE. For example, the CU-CP sends bearer context request signaling to the CU-UP, and the signaling includes the network identifier information. A representation form of the network identifier in the bearer context request signaling includes a form shown in Table 14:

TABLE 14

| Information element name (IE/group name) | Semantics description (semantics description) |
| --- | --- |
| Signaling type (message type) | Type of signaling |
| gNB-CU-CP user E1 control plane identifier (gNB-CU-CP LTE E1 AP ID) | CU-CP user E1 control plane identifier |
| Serving PLMN (serving PLMN) | Serving PLMN |
| Network identifier (NID) | NID |
| Activity notification level (activity notification level) | Used to identify an activity notification level |
| Bearer context status change (bearer context status change) | Used to determine a bearer context status change |
| Choice system (choice system) | Choice system |
| >E-UTRAN | Radio access network |
| >>DRB to setup list (DRB to setup list) | List of DRBs to be set up |
| >NG-RAN | |
| >>PDU session to setup list (PDU session resource to setup list) | Used to identify a PDU session to be set up |
| Access network UE identifier (RAN UE ID) | Used to identify an access network |
| gNB-DU identifier (gNB-DU ID) | DU identifier |

In still another possible implementation, for an NPN, the CU-CP sends the fourth signaling to the CU-UP, and the fourth signaling may be used to notify the CU-UP that interface setup or configuration update fails because an error occurs, and a failure cause may be "CAG ID not supported (CAG ID(s) not supported)", "NID not supported (NID(s) not supported)", "PNI-NPN not supported (PNI-NPN(s) not supported)", an invalid CAG ID (invalid CAG ID(s)), an invalid NID (invalid NID(s)), an invalid SNPN (invalid SNPN), an invalid PNI-NPN (invalid PNI-NPN), CAG access only (CAG access only), or the like. In other words, because the CAG ID, the NID, the SNPN, or the PNI-NPN provided by the CU-UP is not supported by the CU-CP, and there is no CAG or SNPN supported by both the CU-CP and the CU-UP, interface setup, CU-UP configuration update, or CU-CP configuration update fails. In addition, the cause value is further applicable to a process of NG or Xn interface setup and a process of network node configuration update. An applicable interface is not specifically limited in this application.

Moreover, the cause value is also applicable to a process such as a failure of initial access of user equipment, a failure of context setup of user equipment, a failure of context modification of user equipment, or a failure of handover of user equipment on an interface such as a Uu interface, an F1 interface, an E1 interface, an NG interface, or an Xn interface. An applicable process is not specifically limited in this application either.

Optionally, the fourth signaling is E1 setup response (E1 setup response) signaling.

Optionally, the fourth signaling is CU-UP configuration update response signaling.

Optionally, the fourth signaling is CU-CP configuration update request signaling.

Optionally, the fourth signaling is E1 setup failure (E1 setup failure) signaling.

Optionally, the fourth signaling is CU-UP configuration update failure signaling.

Optionally, when the third signaling is E1 setup request signaling, the fourth signaling is E1 setup response signaling. Optionally, when the third signaling is CU-UP configuration update signaling, the fourth signaling is CU-UP configuration update response signaling.

An example in which the CU-UP supports SNPNs (a first SNPN to a third NPN) and the CU-CP supports SNPNs (the first SNPN, the second SNPN, and a fourth NPN) is used below for description, and the CU-UP and the CU-CP interact with each other about networks supported by the CU-UP and the CU-CP. Cell identifiers corresponding to the first SNPN to the fourth NPN are a cell ID #1 to a fourth cell ID, and network identifiers corresponding to the first SNPN to the fourth NPN are a first PLMN ID and a first NID to a fourth PLMN ID and a fourth NID.

In this case, the third signaling may include content shown in Table 15:

TABLE 15

| Cell ID | PLMN ID | NID |
| --- | --- | --- |
| 1 | 1 | 1 |
| 2 | 2 | 2 |
| 3 | 3 | 3 |

In this case, the fourth signaling may include content shown in Table 16:

TABLE 16

| Cell ID | PLMN ID | NID |
| --- | --- | --- |
| 1 | 1 | 1 |
| 2 | 2 | 2 |

Alternatively, the fourth signaling may include content shown in Table 17:

TABLE 17

| Cell ID | PLMN ID | NID |
| --- | --- | --- |
| 1 | 1 | 1 |
| 2 | 2 | 2 |
| 4 | 4 | 4 |

In a possible implementation, the access apparatus shown in FIG. 8 to FIG. 10 may be an access network device. The access network device may support the user equipment in accessing both the first network and the second network described above. For example, a PLMN cell and an SNPN cell are configured in the access network device, a PLMN cell and a PNI-NPN cell are configured in the access network device, or a PNI-NPN cell and an SNPN cell are configured in the access network device. That is, the user equipment may access two different networks by using one access network device.

In another possible implementation, the access apparatus shown in FIG. 8 to FIG. 10 may include a DU and a CU. The DU may perform a function of sending signaling to the user equipment by the access apparatus, and the CU is configured to: receive signaling of the first core network device and signaling of the second core network device, and send a fourth message to the DU.

Optionally, the DU is connected to two different CUs, and the two different CUs respectively access the first network and the second network. For example, the DU is connected to a first CU and a second CU. The first CU supports the user equipment in accessing a PLMN cell, and the second CU supports the user equipment in accessing an SNPN cell. Alternatively, the first CU supports the user equipment in accessing a PLMN cell, and the second CU supports the user equipment in accessing a PNI-NPN cell. Alternatively, the first CU supports the user equipment in accessing an SNPN cell, and the second CU supports the user equipment in accessing a PNI-NPN cell. As an intermediate device, the CU is configured to forward signaling between the DU and the core network device. For example, in S910, when the access apparatus includes the DU and the two CUs, it may be understood that the second core network device sends a first paging message to the second CU, and the second CU forwards the first paging message to the DU. For another example, in S920, when the access apparatus includes the DU and the two CUs, it may be understood that the first core network device sends a second paging message to the first CU, and the first CU forwards the second paging message to the DU.

Figure 13A:
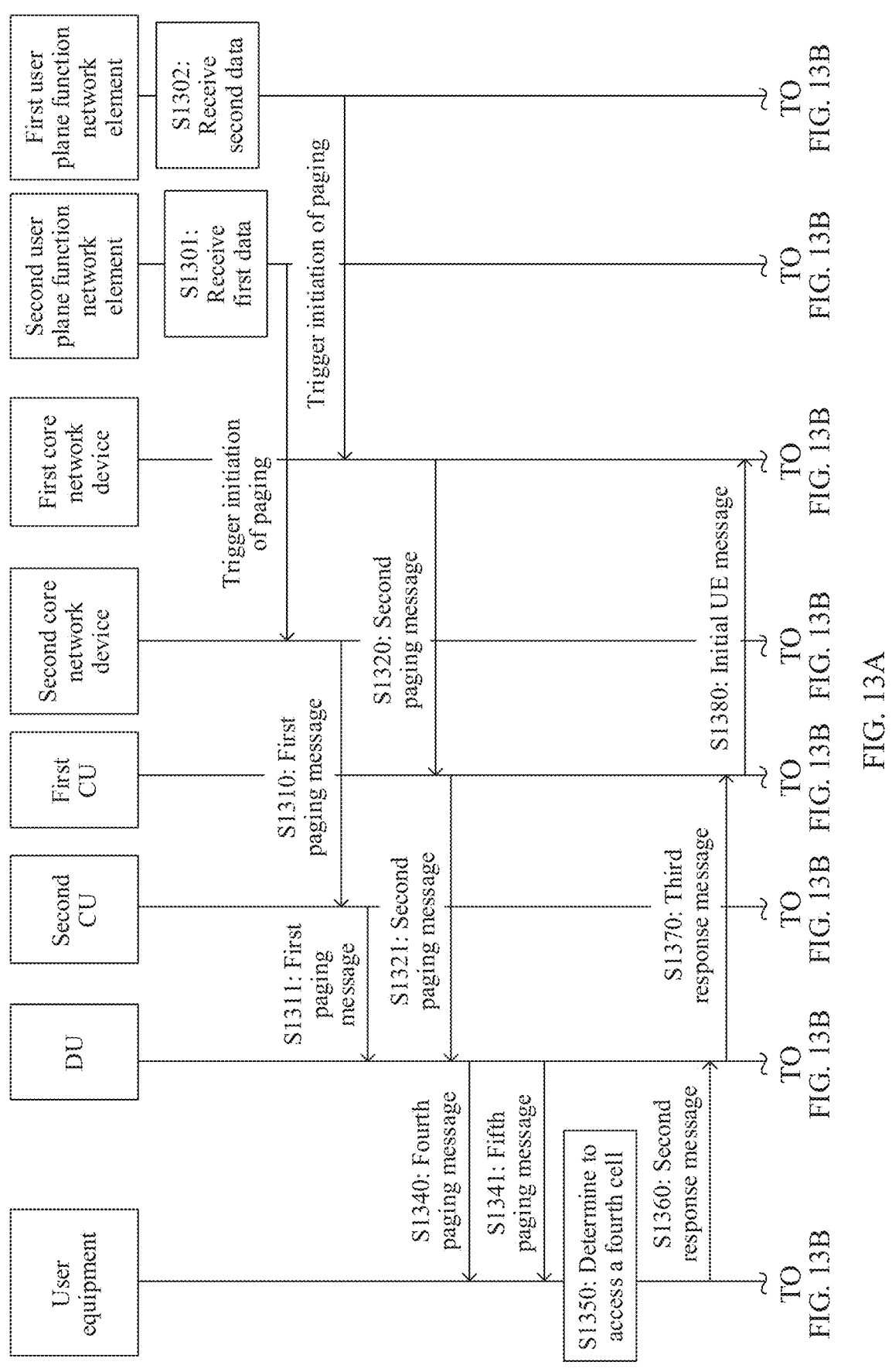
FIG. 13A to FIG. 13C are a schematic flowchart of still another paging method according to an embodiment of this application.
Figure 13B:
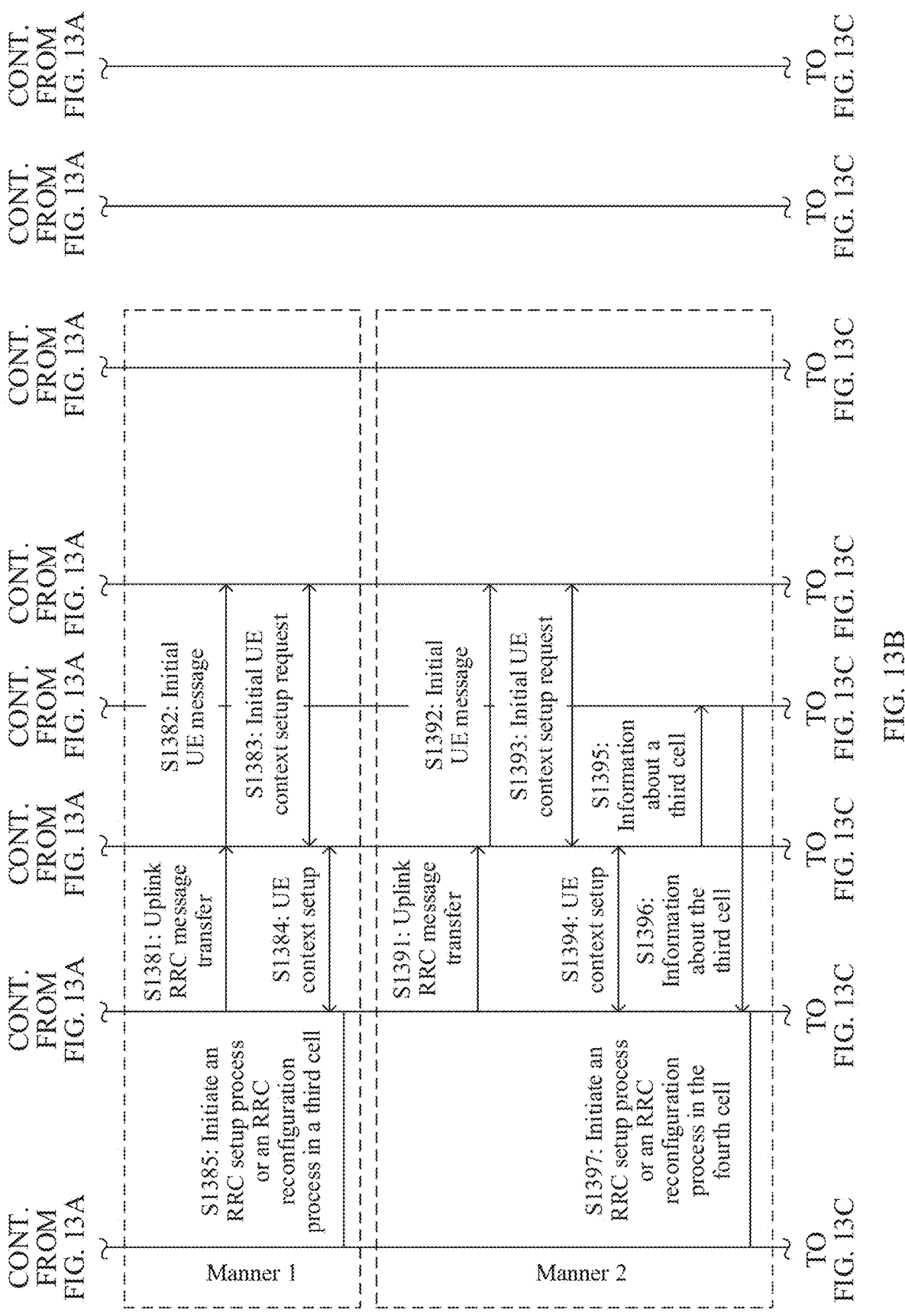
Figure 13C:
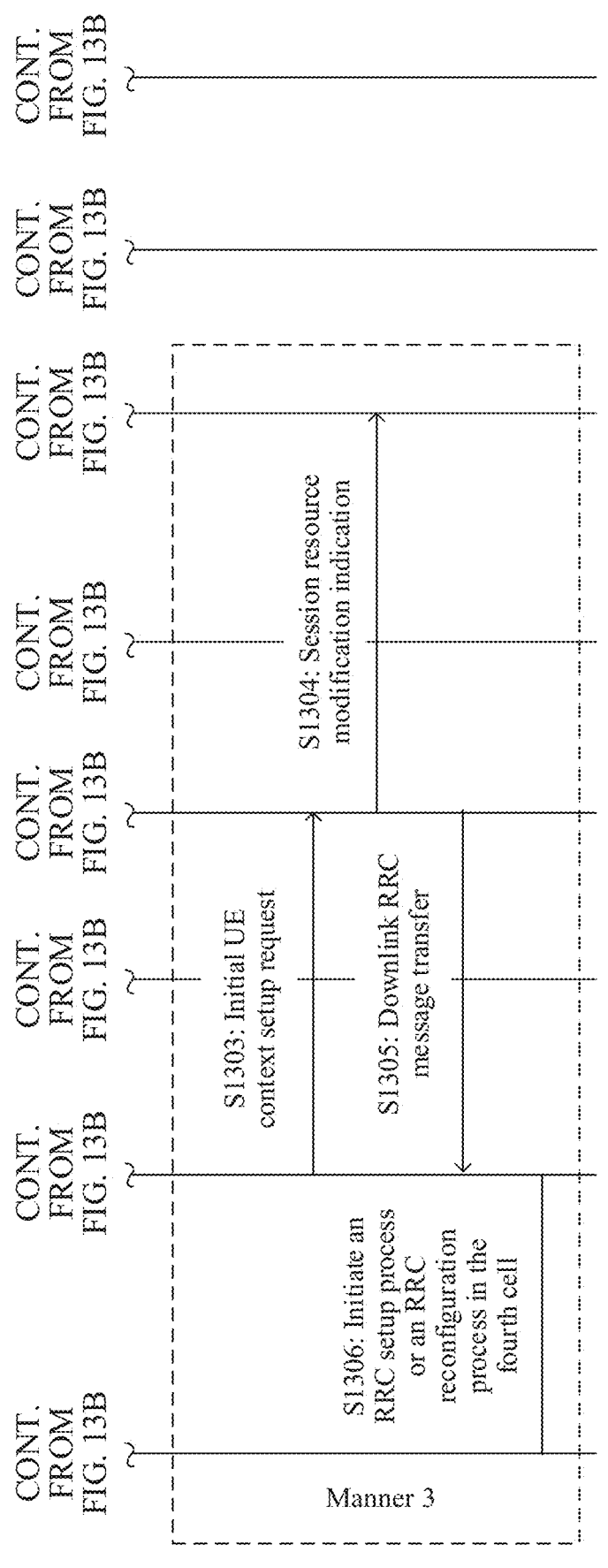

When the access apparatus includes the DU and the two CUs, the DU and each of the two CUs need to interact with each other about networks that can be accessed by the DU and each of the two CUs. This is shown in FIG. 11 and FIG. 12, and details are not described herein again. With reference to FIG. 13A to FIG. 13C, the following describes, by using an example, a method for responding to paging of different networks by the user equipment when the access apparatus in FIG. 8 to FIG. 10 includes a CU and a DU, and the CU and the DU perform signaling interaction shown in FIG. 11 and FIG. 12 and learn of networks that can be accessed by the CU and the DU.

FIG. 13A to FIG. 13C are a schematic flowchart of still another paging method according to an embodiment of this application. This procedure is performed by a first user plane function network element, a first core network device, a second user plane function network element, a second core network device, a first CU, a second CU, a DU, and user equipment. To distinguish from the user equipment, the first user plane function network element, the first core network device, the first CU, and the DU may be collectively referred to as a network device, and the second user plane function network element, the second core network device, the second CU, and the DU may also be collectively referred to as a network device.

The user equipment is in RRC-idle mode in a first network and a second network, the DU is shared by the first CU and the second CU, and the DU is configured with a cell in the first network and a cell in the second network.

The paging method includes the following steps.

S1310: The second core network device sends a first paging message to the second CU. The second CU receives the first paging message from the second core network device.

S1311: The second CU sends the first paging message to the DU. The DU receives the first paging message from the second CU.

The first paging message is similar to the first paging message in S910 in FIG. 9, and details are not described herein again.

S1320: The first core network device sends a second paging message to the first CU. The first CU receives the second paging message from the first core network device.

S1321: The first CU sends the second paging message to the DU. The DU receives the second paging message from the first CU.

The second paging message is similar to the second paging message in S920 in FIG. 9, and details are not described herein again.

In a possible implementation, that the first CU sends the first paging message to the DU may be considered as a specific form of the fourth message described above. In this implementation, the fourth message is used by the first network to page the user equipment.

In another possible implementation, that the second CU sends the second paging message to the DU may be considered as another specific form of the fourth message described above. In this implementation, the fourth message is used by the second network to page the user equipment.

In still another possible implementation, when the first network and the second network share a core network, the first paging message and the second paging message are paging messages sent by a same core network device. In this implementation, that the second CU sends the first paging message to the DU and the second CU sends the second paging message to the DU may be considered as still another specific form of the fourth message described above. The fourth message is used to indicate that the second network and the first network are paging the user equipment. When the fourth message is used to indicate that the second network and the first network are paging the user equipment, the fourth message includes at least one of a second identifier of the user equipment, an identifier of the second network, or an identifier of a second cell, and at least one of a first identifier of the user equipment, an identifier of the first network, or an identifier of a first cell. The first identifier of the user equipment is used to indicate an identifier of the user equipment in the first network, the identifier of the first network is used to indicate the first network that the user equipment needs to access, and the identifier of the first cell is used to indicate a cell that is in the first network and that is to be accessed by the user equipment.

An NPN identifier includes a PLMN ID, a NID, a CAG ID, a PLMN ID and a NID, a PLMN ID and a CAG ID, an SNPN ID, a PNI-NPN ID, and the like.

A reason why the first core network device sends the second paging message to the first CU may be that the first user plane function network element receives data of the user equipment, that is, the method procedure shown in FIG. 13A to FIG. 13C further includes S1302: The first user plane function network element receives second data.

Likewise, a reason why the second core network device sends the first paging message to the second CU may be that the second user plane function network element receives data of the user equipment, that is, the method procedure shown in FIG. 13A to FIG. 13C further includes S1301: The second user plane function network element receives first data.

When the first network and the second network share a core network, the first core network device and the second core network device are a same core network device, and the first user plane function network element and the second user plane function network element are a same user plane function network element. In other words, the user plane function network element receives both the first data and the second data, and the first data and the second data belong to different networks.

Further, after receiving the first paging message and the second paging message, the DU needs to page the user equipment, that is, the method procedure shown in FIG. 13A to FIG. 13C further includes the following steps: S1340: The DU sends a fourth paging message to the user equipment. The user equipment receives the fourth paging message from the DU. S1341: The DU sends a fifth paging message to the user equipment. The user equipment receives the fifth paging message from the DU. The fourth paging message is similar to the fourth paging message shown in FIG. 10, and the fifth paging message is similar to the fifth paging message shown in FIG. 10. Details are not described herein again.

In a possible implementation, the fourth paging message and the fifth paging message are two paging messages. For example, the second identifier of the user equipment that is included in the first paging message and the first identifier of the user equipment that is included in the second paging message may be different, if the DU cannot learn, based on the second identifier of the user equipment that is included in the first paging message and the first identifier of the user equipment that is included in the second paging message, that the first network and the second network are paging the same user equipment, the DU separately sends the fourth paging message and the fifth paging message.

Further, the user equipment responds to the fourth paging message or the fifth paging message and accesses a corresponding cell.

For ease of description, in the embodiment shown in FIG. 13A to FIG. 13C, an example in which the user equipment first responds to the fifth paging message and accesses the first network is used for description, that is, the method procedure shown in FIG. 13A to FIG. 13C further includes S1350: The user equipment determines to access a fourth cell in the first network. In addition, the user equipment learns, based on the fifth paging message, that a third cell in the second network is also paging the user equipment. Specifically, after determining to access the first network, the user equipment sends, to the DU, information about the fourth cell that is in the first network and that is to be accessed by the user equipment. That is, the method procedure shown in FIG. 13A to FIG. 13C further includes S1360: The user equipment sends a second response message to the DU. The second response message includes the information about the fourth cell and information about the third cell in the second network. For an NPN, the information about the fourth cell includes a PLMN ID, a CAG ID, or a NID.

In a possible implementation, the user equipment determines to access the fourth cell in the first network, the DU needs to notify the first CU in the first network of the information about the cell to be accessed by the user equipment, that is, the paging method shown in FIG. 13A to FIG. 13C further includes S1370: The DU sends a third response message to the first CU.

Optionally, the third response message is a message including the information about the fourth cell. For an NPN, the information about the fourth cell includes a PLMN ID, a CAG ID, or a NID.

Further, the paging method shown in FIG. 13A to FIG. 13C further includes S1380: The first CU sends an initial UE message to the first core network device, for example, uplink RRC message transfer (uplink RRC message transfer) information.

The initial UE message is used to notify the first core network device that the user equipment that needs to be paged has been found, and the initial UE message includes a cell identifier of the fourth cell, and a network identifier, an access network device identifier, or a tracking area code corresponding to the cell.

For an NPN, the network identifier includes a PLMN ID, a CAG ID, or a NID.

Optionally, the initial UE message further includes a PDU session ID, and the user equipment requests to configure a PDU session resource of the fourth cell in the first network, to carry a PDU session of the third cell in the second network.

After learning that the user equipment is successfully found, the first core network device configures, for the user equipment according to a procedure specified in a current protocol, a bearer resource for accessing the fourth cell. Details are not described herein.

Further, after the user equipment is in RRC-connected mode in the first network, the user equipment processes the paging of the second network in the following possible manners:

Manner 1:

When the user equipment first accesses the fourth cell, the DU learns, based on networks that can be accessed by the first CU and the second CU and the information about the third cell in the second response message reported by the user equipment, that the DU needs to respond to paging of the second CU. Therefore, the DU sends the uplink RRC message transfer (uplink RRC message transfer) to the second CU.

The second CU sends the initial UE message to the second core network device, and the initial UE message includes a cell identifier of the third cell in which the user equipment is located and an identifier of the second network.

The second CU and the second core network device configure session resources for the user equipment.

The second CU and the DU interact with each other on an F1 interface to configure bearer resources for the user equipment.

The second CU sends, by using the DU, RRC setup information or RRC reconfiguration information to the user equipment in the third cell in which the user equipment is located.

That is, in the manner 1, the paging method shown in FIG. 13A to FIG. 13C further includes the following steps:

S1381; The DU sends the uplink RRC message transfer (uplink RRC message transfer) to the second CU. S1382: The second CU sends the initial UE message (Initial UE message) to the second core network device.

S1383: The first CU and the first core network device initiate an initial UE context setup request (Initial UE context setup request). For an NPN, the initial UE context signaling includes a network identifier, for example, a PLMN ID, a CAG ID, or a NID.

S1384: The DU and the second CU exchange configuration parameters of the user equipment by using information such as the UE context setup request, the uplink RRC message transfer (uplink RRC message transfer), downlink RRC message transfer (downlink RRC message transfer), and the UE context setup request (UE context setup request). For an NPN, the information may include a PLMN ID, a CAG ID, or a NID.

S1385: The DU and the user equipment initiate an RRC setup process or an RRC reconfiguration process in the third cell.

Manner 2:

When the user equipment first accesses the fourth cell, the DU learns, based on networks that can be accessed by the first CU and the second CU and the information about the third cell in the second response message reported by the user equipment, that the DU needs to respond to paging of the second CU. Therefore, the DU sends the uplink RRC message transfer (uplink RRC message transfer) to the second CU.

The second CU sends the initial UE message to the second core network device, and the initial UE message includes a cell identifier of the third cell in which the user equipment is located and an identifier of the second network.

The second CU and the second core network device configure session resources for the user equipment.

The second CU sends, to the first CU on an Xn interface by using RRC transfer signaling or other newly defined signaling (such as UE context transfer), information about a bearer resource that is in the third cell and that is configured for the user equipment. The information includes an identifier of the third cell and an identifier of the second network, and is used to notify the first CU of the information about the third cell that corresponds to the transmitted bearer configuration information. Alternatively, the information includes Indication indication information, and is used to indicate that an identifier of the third cell is the cell in the second network. Alternatively, the information includes Cause cause information, and is used to indicate that a cause for signaling initiation is configuring information about the user equipment in the cell in the second network over the first network.

The first CU sends downlink RRC message transfer (DL RRC message transfer) information to the DU, and forwards the information about the third cell to the DU.

For an NPN, the information may include a PLMN ID, a CAG ID, or a NID.

The DU sends RRC setup information or RRC reconfiguration information to the user equipment by using an established SRB bearer of the fourth cell. The information includes an identifier of the third cell and an identifier of the second network, and is used to notify the user equipment of cell information corresponding to the transmitted bearer configuration information. The user equipment performs configuration based on the bearer configuration information, and then may randomly access the third cell and receive data based on the configured bearer information of the third cell.

That is, in the manner 2, the paging method shown in FIG. 13A to FIG. 13C further includes the following steps:

S1391: The DU sends the uplink RRC message transfer to the second CU.

S1392. The second CU sends the initial UE message (Initial UE message) to the second core network device.

S1393: The second CU and the second core network device initiate an initial UE context setup request (Initial UE context setup request).

S1394: The DU and the second CU exchange configuration parameters of the user equipment by using information such as the UE context setup request, the uplink RRC message transfer (uplink RRC message transfer), and downlink RRC message transfer (downlink RRC message transfer).

For an NPN, the information may include a PLMN ID, a CAG ID, or a NID.

S1395: The second CU sends the information about the third cell to the first CU.

For an NPN, the information about the cell includes a PLMN ID, a CAG ID, or a NID.

S1396: The first CU sends the information about the third cell to the DU.

S1397: The DU and the user equipment initiate an RRC setup process or an RRC reconfiguration process in the fourth cell.

Manner 3:

When the second response message includes a session identifier, the user equipment requests to set up a session of the fourth cell, to carry a session of the third cell. The first core network device sends an initial context setup request/a PDU session resource setup message to the first CU, to notify the first CU to configure a corresponding bearer resource (a bearer is based on a PDU session ID and a QFI) of the fourth cell for the user equipment, and to notify the first CU of a corresponding bearer type Type, function, or cause (for example, an SNPN, a NID, a CAG ID, a character string PLMN for SNPN, or a character string PLMN for NPN for identifying that the bearer configured in the fourth cell is used to transmit SNPN data).

The first CU and the DU exchange SRB and DRB bearer configuration resource information, and the information includes a corresponding bearer type, function, or cause (for example, an SNPN, a NID, a CAG ID, a character string PLMN for SNPN, or a character string PLMN for NPN for identifying that the bearer configured in the fourth cell is used to transmit SNPN data).

The first CU sends RRC setup information or RRC reconfiguration information by using the DU, to notify the user equipment of a corresponding bearer configuration parameter. The parameter includes a corresponding bearer type, function, or cause (for example, an SNPN, a NID, a CAG ID, a character string PLMN for SNPN, or a character string PLMN for NPN for identifying that the bearer configured in the fourth cell is used to transmit SNPN data). Bearer configuration of the fourth cell is completed, so that the session of the third cell is carried subsequently. For example, an IPSec tunnel is established on a resource in the fourth cell, to transmit session data of the third cell.

That is, in the manner 3, the paging method shown in FIG. 13A to FIG. 13C further includes the following steps:

S1303: The DU sends the initial UE context setup request (Initial UE context setup request) to the first CU.

S1304: The first CU sends a session resource modification indication (PDU session resource modify indication) to the first core network device.

S1305. The first CU and the DU initiate a downlink RRC message transfer (downlink RRC message transfer) process.

S1306: The DU and the user equipment initiate an RRC setup process or an RRC reconfiguration process in the fourth cell.

Further, when the paging method provided in this embodiment of this application is applied to a non-share-RAN scenario (there are a first RAN and a second RAN in each of a first network and a second network, and there is an Xn interface between the first RAN and the second RAN), after the user equipment receives paging of the two RANs, the user equipment chooses to respond to paging of one of the two RANs. After accessing a corresponding cell, the user equipment notifies the cell that has been accessed of information for cell paging of the other network, and a RAN in which the cell that has been accessed is located pre-configures corresponding resources such as SRBs and DRBs of a cell that has not been accessed for the user equipment. Alternatively, if one RAN does not receive a paging response for a long time, the other RAN may actively seek assistance in paging from an adjacent RAN through the Xn interface, and send information about to-be-paged user equipment to the adjacent RAN.

Sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

The foregoing describes in detail the paging method and the communications method provided in the embodiments of this application with reference to FIG. 8 to FIG. 13A to FIG. 13C. The following describes in detail a paging apparatus and a communication apparatus provided in the embodiments of this application with reference to FIG. 14 to FIG. 19.

Figure 14:
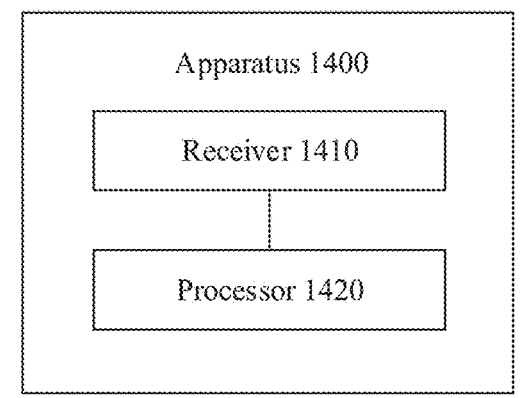
FIG. 14 is a schematic diagram of a paging apparatus 1400 according to this application.

FIG. 14 is a schematic diagram of a paging apparatus 1400 according to this application. As shown in FIG. 14, the apparatus 1400 includes a receiver 1410 and a processor 1420.

The receiver 1410 is configured to receive a first message from an access apparatus over a first network, where the first message is used to indicate that the user equipment is paged by at least the second network, or the first message is used to indicate a resource that is in the first network and that is used to transmit data of the second network.

The processor 1420 is configured to: access the second network by using the access apparatus, or determine, based on the first message, the resource that is in the first network and that is used to transmit the data of the second network.

The apparatus 1400 completely corresponds to the terminal device in the method embodiments. The apparatus 1400 may be the terminal device in the method embodiments, or may be a chip or a functional module inside the terminal device in the method embodiments. The corresponding units of the apparatus 1400 are configured to perform corresponding steps performed by the terminal device in the method embodiments shown in FIG. 8 to FIG. 13A to FIG. 13C.

The receiver 1410 of the apparatus 1400 performs a receiving step performed by the terminal device in the method embodiments. For example, the receiver 1410 performs step S820 in FIG. 8 of receiving the first message from the access apparatus, step S850 in FIG. 8 of receiving the second message from the access apparatus over the first network, step S940 in FIG. 9 of receiving a fourth paging message and/or a fifth paging message from the access apparatus, step S1030 in FIG. 10 of receiving the fourth paging message from the access apparatus, step S1040 in FIG. 10 of receiving the fifth paging message from the access apparatus, step S1080 in FIG. 10 of receiving the second message from the access apparatus over the first network, step S1340 in FIG. 13A to FIG. 13C of receiving the fourth paging message from the access apparatus, and step S1341 in FIG. 13A to FIG. 13C of receiving the fifth paging message from the access apparatus.

The processor 1420 performs steps implemented or processed inside the terminal device in the method embodiments. For example, the processor 1420 performs step S821 in FIG. 8 of determining to access the third cell, step S1050 in FIG. 10 of responding to the fifth paging message, and step S1350 in FIG. 13A to FIG. 13C of determining to access a fourth cell.

The apparatus 1400 may further include a transmitter, configured to perform a sending step performed by the terminal device, for example, send information to another device. The transmitter and the receiver 1410 may constitute a transceiver unit, which has both a receiving function and a sending function. The processor 1420 may be a processor. The transmitter may be a transmitter. The receiver 1410 may be a receiver. The receiver and the transmitter may be integrated to constitute a transceiver.

Figure 15:
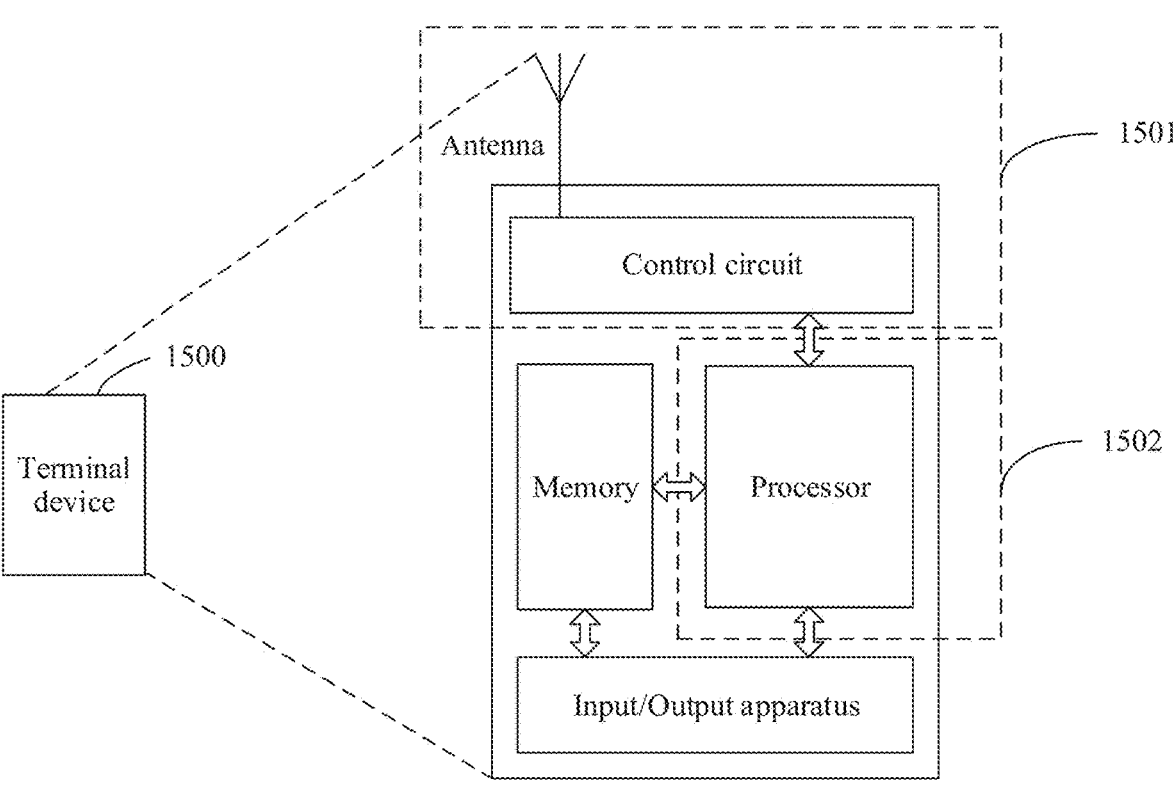
FIG. 15 is a schematic structural diagram of a terminal device 1500 applicable to an embodiment of this application.

FIG. 15 is a schematic structural diagram of a terminal device 1500 applicable to an embodiment of this application. The terminal device 1500 may be applied to the system shown in FIG. 1. For ease of description, FIG. 15 shows only main components of the terminal device. As shown in FIG. 15, the terminal device 1500 includes a processor (corresponding to the processor 1420 shown in FIG. 14), a memory, a control circuit, an antenna, and an input/output apparatus (corresponding to the receiver 1410 shown in FIG. 14). The processor is configured to control the antenna and the input/output apparatus to send and receive a signal. The memory is configured to store a computer program. The processor is configured to invoke the computer program from the memory and run the computer program, to perform a corresponding procedure and/or operation performed by the terminal device in the paging method provided in this application. Details are not described herein again.

A person skilled in the art may understand that for ease of description, FIG. 15 shows only one memory and one processor. An actual terminal device may have a plurality of processors and a plurality of memories. The memory may also be referred to as a storage medium, a storage device, or the like. This is not limited in the embodiments of this application.

Figure 16:
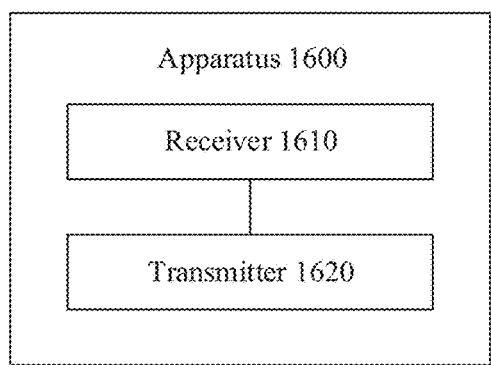
FIG. 16 is a schematic diagram of a paging apparatus 1600 according to this application.

FIG. 16 is a schematic diagram of a paging apparatus 1600 according to this application. As shown in FIG. 16, the apparatus 1600 includes a receiver 1610 and a transmitter 1620.

The receiver 1610 is configured to receive a first paging message from a second core network device, where the first paging message is used by at least a second network to page user equipment.

The transmitter 1620 is configured to send a first message to the user equipment over a first network, where the first message is used to indicate that the user equipment is paged by at least the second network, or the first message is used to indicate a resource that is in the first network and that is used to transmit data of the second network.

The apparatus 1600 completely corresponds to the access apparatus in the method embodiments. The apparatus 1600 may be the access apparatus in the method embodiments, or may be a chip or a functional module inside the access apparatus in the method embodiments. The corresponding units of the apparatus 1600 are configured to perform corresponding steps performed by the access apparatus in the method embodiments shown in FIG. 8 to FIG. 13A to FIG. 13C.

The receiver 1610 of the apparatus 1600 performs a receiving step performed by the access apparatus in the method embodiments. For example, the receiver 1610 performs step S810 in FIG. 8 of receiving the first paging message from the second core network device, step S823 in FIG. 8 of receiving the first response message from the user equipment, step S910 in FIG. 9 of receiving the first paging message from the second core network device, step S920 in FIG. 9 of receiving the second paging message from the first core network device, step S950 in FIG. 9 of receiving the second response message from the user equipment, step S1010 in FIG. 10 of receiving the first paging message from the second core network device, step S1020 in FIG. 10 of receiving the second paging message from the first core network device, and step S950 in FIG. 10 of receiving the first response message from the user equipment.

The transmitter 1620 of the apparatus 1600 performs a sending step performed by the access apparatus in the method embodiments. For example, the transmitter 1620 performs step S820 in FIG. 8 of sending a first message to the user equipment, step S830 in FIG. 8 of sending the information about the third cell to the second core network device, step S940 in FIG. 9 of sending the fourth paging message and/or the fifth paging message to the user equipment, step S960 in FIG. 9 of sending the information about the fourth cell to the first core network device, and step S1030 in FIG. 10 of sending a fourth paging message to the user equipment, and step S1040 in FIG. 10 of sending a fifth paging message to the user equipment.

The apparatus 1600 may further include a processor, configured to perform steps implemented or processed inside the access apparatus. The receiver 1610 and the transmitter 1620 may constitute a transceiver unit, which has both a receiving function and a sending function. The processor may be a processor. The transmitter 1620 may be a transmitter. The receiver 1610 may be a receiver. The receiver and the transmitter may be integrated to constitute a transceiver.

Figure 17:
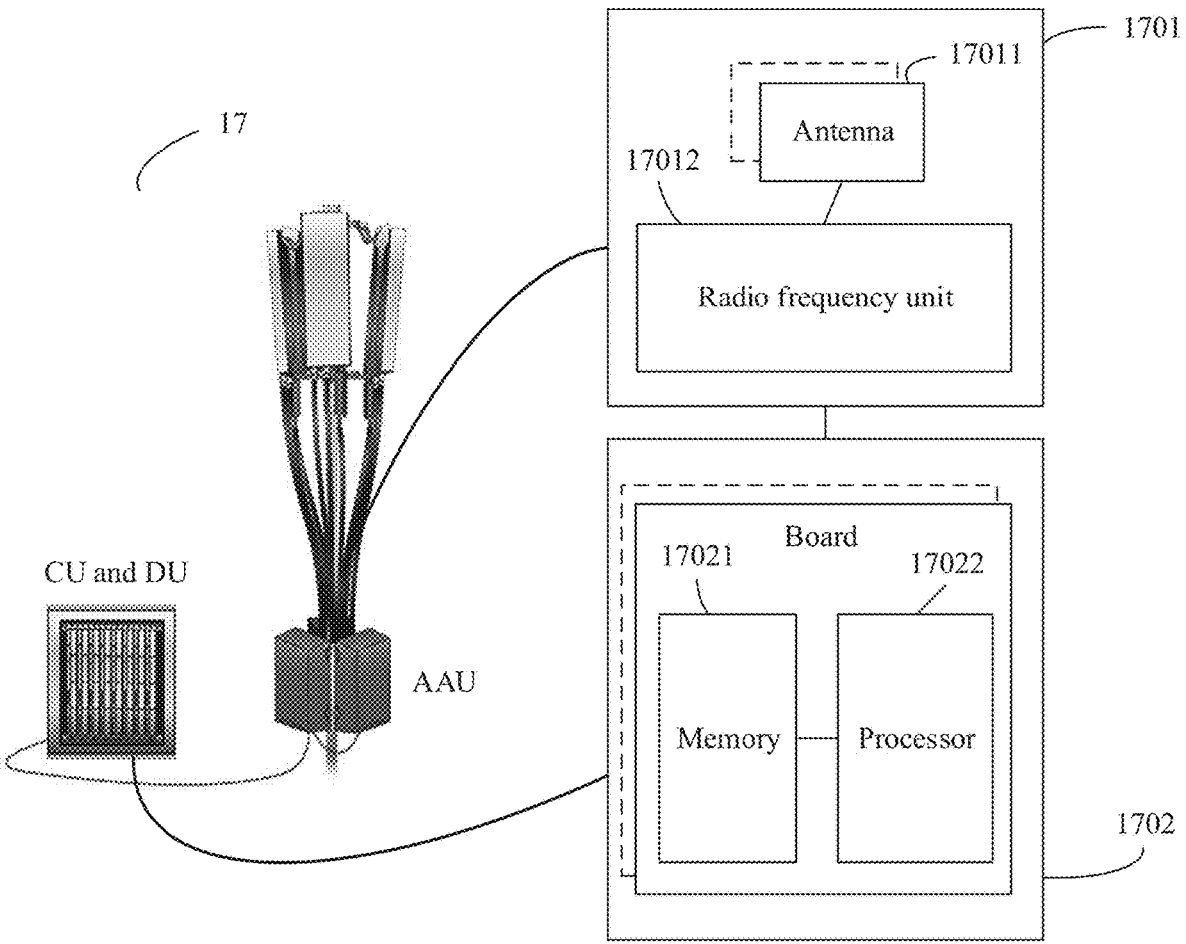
FIG. 17 is a schematic structural diagram of an access apparatus 1700 according to an embodiment of this application.

FIG. 17 is a schematic structural diagram of an access apparatus 1700 applicable to an embodiment of this application. The access apparatus 1700 may be configured to implement functions of the access apparatus in the foregoing paging method. FIG. 17 may be a schematic structural diagram of an access apparatus.

In a 5G communications system, the access apparatus 1700 may include a CU, a DU, and an AAU. In comparison with an access apparatus in an LTE communications system, the access apparatus includes one or more radio frequency units, for example, a remote radio unit (remote radio unit, RRU) 1701 and one or more baseband units (base band unit, BBU).

A non-real-time part of the original BBU is split and redefined as a CU, which is responsible for processing a non-real-time protocol and service. Some physical layer processing functions of the BBU are combined with the original RRU and passive antenna into an AAU, and the remaining functions of the BBU are redefined as a DU, which is responsible for processing a physical layer protocol and a real-time service. In short, a CU and a DU are distinguished between each other based on real-time performance of processed content, and an AAU is a combination of an RRU and an antenna.

The CU, the DU, and the AAU may be deployed separately or together. Therefore, there may be a plurality of network deployment forms. A possible deployment form is shown in FIG. 17, and is consistent with a conventional 4G access apparatus. The CU and the DU are deployed on same hardware. FIG. 17 is merely an example, and constitutes no limitation on the protection scope of this application. For example, a deployment form may alternatively be that DUs are deployed in a 5G BBU equipment room, CUs or DUs are deployed together, or CUs are centralized at a higher level.

The AAU 1701 may implement a transceiver function, is referred to as a transceiver unit 1701, and corresponds to the receiver 1610 in FIG. 16. Optionally, the transceiver unit 1701 may also be referred to as a transceiver, a transceiver circuit, a transceiver, or the like, and may include at least one antenna 17011 and a radio frequency unit 17012. Optionally, the transceiver unit 1701 may include a receiver and a transmitter. The receiver may correspond to a receiver (or referred to as a receiver or a receiver circuit), and the transmitter may correspond to a transmitter (or referred to as a transmitter or a transmitter circuit). The CU and a DU 1702 may implement an internal processing function, and may be referred to as a processor 1702. Optionally, the processor 1702 may control the access apparatus or the like, and may be referred to as a controller. The AAU 1701, the CU, and the DU 1702 may be physically disposed together, or may be physically disposed separately.

Signaling interaction may also be performed between the CU and the DU.

For example, the CU may include a processor and a transceiver unit. The processor is configured to perform steps implemented or processed inside the CU. The transceiver unit is configured to: perform a transceiver function of the CU, receive signaling from a core network device and/or the DU, and send signaling to a core network device and/or the DU. For example, the transceiver unit performs step S1110 in FIG. 11 of receiving the first signaling from the DU, step S1120 in FIG. 11 of sending second signaling to the DU, step S1210 in FIG. 12 of receiving the third signaling from the DU, and step S1220 in FIG. 12 of sending the fourth signaling to the DU.

The DU may include a processor and a transceiver unit. The processor is configured to perform steps implemented or processed inside the DU. The transceiver unit is configured to: perform a transceiver function of the DU, receive signaling from the CU and/or user equipment, and send signaling to the CU and/or user equipment. For example, the transceiver unit performs step S1110 in FIG. 11 of sending first signaling to the CU, step S1120 in FIG. 11 of receiving the second signaling from the CU, step S1210 in FIG. 12 of sending third signaling to the CU, and step S1220 in FIG. 12 of receiving the fourth signaling from the DU.

In addition, the access apparatus is not limited to the forms shown in FIG. 17, and may alternatively be in another form. For example, the access apparatus includes a BBU and an adaptive radio unit (adaptive radio unit, ARU), or includes a BBU and an active antenna unit (active antenna unit, AAU), or may be customer premises equipment (customer premises equipment, CPE), or may be in another form. This is not limited in this application.

The access apparatus 1700 shown in FIG. 17 can implement functions of the access apparatus in the method embodiments in FIG. 8 to FIG. 13A to FIG. 13C. Operations and/or functions of the units in the access apparatus 1700 are separately used to implement corresponding procedures performed by the access apparatus in the method embodiments of this application. To avoid repetition, detailed descriptions are appropriately omitted herein. The structure of the access apparatus shown in FIG. 17 is merely a possible form, but should not constitute any limitation on the embodiments of this application. According to this application, there may be an access apparatus structure in another form in the future.

Figure 18:
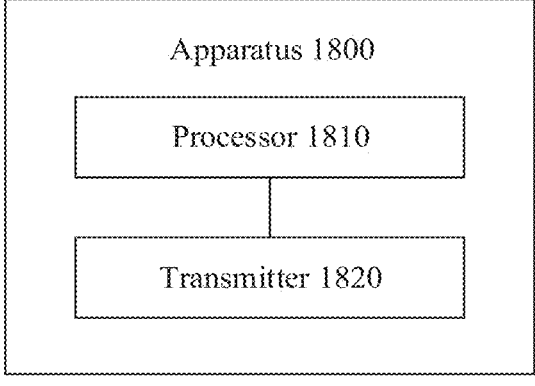
FIG. 18 is a schematic diagram of a paging apparatus 1800 according to this application.

FIG. 18 is a schematic diagram of a paging apparatus 1800 according to this application. As shown in FIG. 18, the apparatus 1800 includes a processor 1810 and a transmitter 1820.

The processor 1810 is configured to perform steps implemented or processed inside a second core network device.

The transmitter 1820 is configured to send a first paging message to an access apparatus, where the first paging message is used to indicate that user equipment is paged by at least the second network.

The apparatus 1800 completely corresponds to the second core network device in the method embodiments. The apparatus 1800 may be the second core network device in the method embodiments, or may be a chip or a functional module inside the second core network device in the method embodiments. The corresponding units of the apparatus 1800 are configured to perform corresponding steps performed by the access apparatus in the method embodiments shown in FIG. 8 to FIG. 13A to FIG. 13C.

Figure 19:
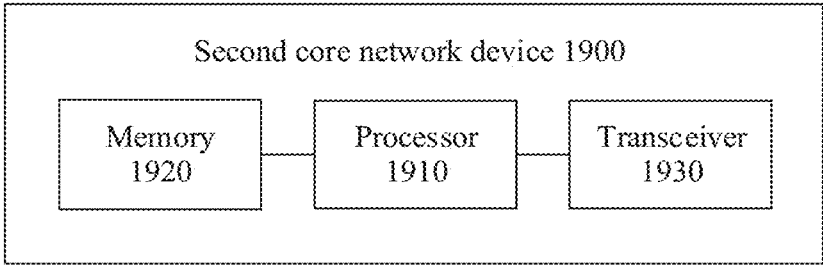
FIG. 19 is a schematic structural diagram of an access apparatus 1900 according to an embodiment of this application.

FIG. 19 is a schematic structural diagram of a second core network device 1900 applicable to an embodiment of this application. The second core network device 1900 may be configured to implement functions of the second core network device in the foregoing paging method. The second core network device 1900 includes a processor 1910, a memory 1920, and a transceiver 1930. The memory 1920 stores instructions or a program, and the processor 1910 is configured to execute the instructions or the program stored in the memory 1920. When the instructions or the program stored in the memory 1920 are/is executed, the transceiver 1930 is configured to perform an operation performed by the transmitter 1820 in the apparatus 1800 shown in FIG. 18.

An embodiment of this application further provides a communications system, including the foregoing terminal device and the foregoing access apparatus.

This application further provides a computer-readable storage medium. The computer-readable storage medium stores instructions. When the instructions are run on a computer, the computer is enabled to perform the steps performed by the terminal device in the methods shown in FIG. 8 to FIG. 13A to FIG. 13C.

This application further provides a computer-readable storage medium. The computer-readable storage medium stores instructions. When the instructions are run on a computer, the computer is enabled to perform the steps performed by the access apparatus in the methods shown in FIG. 8 to FIG. 13A to FIG. 13C.

This application further provides a computer program product including instructions. When the computer program product is run on a computer, the computer is enabled to perform the steps performed by the terminal device in the methods shown in FIG. 8 to FIG. 13A to FIG. 13C.

This application further provides a computer program product including instructions. When the computer program product is run on a computer, the computer is enabled to perform the steps performed by the access apparatus in the methods shown in FIG. 8 to FIG. 13A to FIG. 13C.

This application further provides a chip, including a processor. The processor is configured to read and run a computer program stored in a memory, to perform a corresponding operation and/or procedure performed by the terminal device in the paging method provided in this application. Optionally, the chip further includes the memory. The memory is connected to the processor through a circuit or a cable. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface, an interface circuit, an output circuit, an input circuit, a pin, a related circuit, or the like on the chip. The processor may alternatively be embodied as a processing circuit or a logic circuit.

This application further provides a chip, including a processor. The processor is configured to read and run a computer program stored in a memory, to perform a corresponding operation and/or procedure performed by the access apparatus in the paging method provided in this application. Optionally, the chip further includes the memory. The memory is connected to the processor through a circuit or a cable. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface, an interface circuit, an output circuit, an input circuit, a pin, a related circuit, or the like on the chip. The processor may alternatively be embodied as a processing circuit or a logic circuit.

The foregoing chip may be replaced with a chip system, and details are not described herein.

The terms "first", "second", "third", "fourth", and the like (if any) in this application are intended to distinguish between similar objects but do not necessarily indicate a specific order or sequence. It should be understood that the data termed in such a way are interchangeable in appropriate circumstances so that the embodiments of this application described herein can be implemented in other orders than the order illustrated or described herein. In addition, the terms "include", "contain", and any other variants mean to cover the non-exclusive inclusion. For example, a process, method, system, product, or device that includes a list of steps or units is not necessarily limited to the expressly listed steps or units, but may include other steps or units not expressly listed or inherent to such a process, method, product, or device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by the person skilled in the art that, for a purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processor, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

In addition, the term "and/or" in this application describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, comprising:
   sending, by a distributed unit (DU), first signaling to a centralized unit (CU), wherein the first signaling is used to indicate a network that can be accessed by the DU; and
   receiving, by the DU, second signaling from the CU, wherein the second signaling comprises a non-public networks (NPN) identifier, wherein the second signaling is network access rate reduction signaling, wherein the second signaling includes user access control (UAC) assistance information, and wherein the NPN identifier is included in the UAC assistance information.

2. The method according to claim 1, wherein the NPN identifier comprises a public land mobile network identify (PLMN ID) and a network identifier (NID).

3. The method according to claim 1, further comprising:
   configuring, by the DU, a user access control parameter of a network cell of the DU.

4. The method according to claim 1, wherein the first signaling is F1 setup request signaling or DU configuration update request signaling.

5. The method according to claim 1, wherein the second signaling is used to send an auxiliary configuration parameter of the CU for the DU.

6. The method according to claim 1, wherein the UAC assistance information comprises at least one of UAC reduction indication, UAC action, UAC category, or UAC identity.

7. A communications apparatus, wherein the communications apparatus is a distributed unit (DU), and the DU comprises at least one processor coupled to at least one memory storing instructions, which when executed by the at least one processor, cause the communication apparatus to:
   send first signaling to a centralized unit (CU), wherein the first signaling is used to indicate a network that can be accessed by the DU; and
   receive second signaling from the CU, wherein the second signaling comprises a non-public networks (NPN) identifier, wherein the second signaling is network access rate reduction, wherein the second signaling includes user access control (UAC) assistance information, and wherein the NPN identifier is included in UAC assistance information.

8. The apparatus according to claim 7, wherein the NPN identifier comprises a public land mobile network identify (PLMN ID) and a network identifier (NID).

9. The apparatus according to claim 7, wherein the instructions, when executed by the at least one processor, further cause the apparatus to configure a user access control parameter of a network cell of the DU.

10. The apparatus according to claim 7, wherein the first signaling is F1 setup request signaling or DU configuration update request signaling.

11. The apparatus according to claim 7, wherein the second signaling is used to send an auxiliary configuration parameter of the CU for the DU.

12. The apparatus according to claim 7, wherein the UAC assistance information comprises at least one of UAC reduction indication, UAC action, UAC category, or UAC identity.

13. A communications method, comprising:
   receiving, by a centralized unit (CU), first signaling from a distributed unit (DU), wherein the first signaling is used to indicate a network that can be accessed by the DU; and
   sending, by the CU, second signaling to the DU, wherein the second signaling comprises a non-public networks (NPN) identifier, wherein the second signaling is network access rate reduction signaling, wherein the second signaling includes user access control (UAC) assistance information, and wherein the NPN identifier is included in the UAC assistance information.

14. The method according to claim 13, wherein the NPN identifier comprises a public land mobile network identify (PLMN ID) and a network identifier (NID).

15. The method according to claim 13, wherein the first signaling is F1 setup request signaling or DU configuration update request signaling.

16. The method according to claim 13, wherein the second signaling is used to send an auxiliary configuration parameter of the CU for the DU.

17. A communications apparatus, wherein the communications apparatus is centralized unit (CU), and the CU comprises at least one processor coupled to at least one memory storing instructions, which when executed by the at least one processor, cause the communication apparatus to:

receive first signaling to a distributed unit (DU), wherein the first signaling is used to indicate a network that can be accessed by the DU; and send second signaling to the DU, wherein the second signaling comprises a non-public networks (NPN) identifier, wherein the second signaling is network access rate reduction, wherein the second signaling includes user access control (UAC) assistance information, and wherein the NPN identifier is included in UAC assistance information.

18. The apparatus according to claim 17, wherein the NPN identifier comprises a public land mobile network identify (PLMN ID) and a network identifier (NID).

19. The apparatus according to claim 17, wherein the first signaling is F1 setup request signaling or DU configuration update request signaling.

20. The apparatus according to claim 17, wherein the second signaling is used to send an auxiliary configuration parameter of the CU for the DU.

\* \* \* \* \*